US011757897B2

(12) United States Patent
Simons

(10) Patent No.: US 11,757,897 B2
(45) Date of Patent: Sep. 12, 2023

(54) BLOCKCHAIN-BASED COMMERCIAL INVENTORY SYSTEMS AND METHODS

(71) Applicant: AMERICORP INVESTMENTS LLC, Denver, CO (US)

(72) Inventor: Jordan Simons, Denver, CO (US)

(73) Assignee: Americorp Investments LLC, Denver, CO (US)

( * ) Notice: Subject to any disclaimer, the term of this patent is extended or adjusted under 35 U.S.C. 154(b) by 43 days.

(21) Appl. No.: 17/576,224

(22) Filed: Jan. 14, 2022

(65) Prior Publication Data

US 2022/0141231 A1     May 5, 2022

Related U.S. Application Data

(63) Continuation of application No. 17/199,533, filed on Mar. 12, 2021, which is a continuation of application
(Continued)

(51) Int. Cl.
*H04L 9/40*     (2022.01)
*H04L 9/32*     (2006.01)
(Continued)

(52) U.S. Cl.
CPC ........ *H04L 63/105* (2013.01); *G06F 21/6254* (2013.01); *G06N 20/00* (2019.01);
(Continued)

(58) Field of Classification Search
CPC ... H04L 63/105; H04L 9/0618; H04L 9/3226; H04L 9/50; H04L 9/3297; H04L 2209/56;
(Continued)

(56) References Cited

U.S. PATENT DOCUMENTS 10,425,426 B1 *   9/2019   Simons .................. G06F 21/64
10,528,776 B1 *   1/2020   Levy .................. G06K 7/10297
(Continued)

FOREIGN PATENT DOCUMENTS

EP            3761203 A1 *   1/2021   ............. G06F 21/60
EP            3507732 B1 *   2/2021   ............. G06F 21/10
WO     WO 2020/050390 A1 *  3/2020   ............... H04L 9/32

*Primary Examiner* — Christopher A Revak
(74) *Attorney, Agent, or Firm* — Ortiz & Lopez, PLLC; Luis M. Ortiz; Kermit D. Lopez

(57) ABSTRACT

A blockchain of block entries that can be requested by users from user devices is maintained in a distributed network of nodes. Block entries include a plurality of data portions that are each associated with an access level. A request from an auditor to view one or more data portions of a block entry can includes an access code associated with at least one access level can be evaluated to identify one or more data portions associated with the access level. A customized view of the block entry which includes the one or more data portions associated with the access level can be generated. An artificial intelligence engine can review entries within the distributed ledger, identify earnings information associated with the sales of the commercial inventory, determine tax based on earning information, and pay the tax via fiat or cryptocurrency to government authorities based on earnings information.

20 Claims, 29 Drawing Sheets

Related U.S. Application Data

No. 16/812,200, filed on Mar. 6, 2020, now Pat. No. 10,951,626, which is a continuation-in-part of application No. 16/806,646, filed on Mar. 2, 2020, now Pat. No. 10,958,663, which is a continuation of application No. 16/579,697, filed on Sep. 23, 2019, now Pat. No. 10,581,869, which is a continuation of application No. 16/294,745, filed on Mar. 6, 2019, now Pat. No. 10,425,426.

(60) Provisional application No. 62/701,947, filed on Jul. 23, 2018, provisional application No. 62/639,393, filed on Mar. 6, 2018.

(51) Int. Cl.
  G06F 21/62 (2013.01)
  H04L 9/06 (2006.01)
  G06N 20/00 (2019.01)
  H04L 9/00 (2022.01)

(52) U.S. Cl.
  CPC .......... *H04L 9/0618* (2013.01); *H04L 9/3226* (2013.01); *H04L 9/50* (2022.05)

(58) Field of Classification Search
  CPC ... H04L 9/3239; G06F 21/6254; G06F 21/33; G06F 21/62; G06N 20/00; G06N 3/08; G06N 7/01; G06N 20/10; H04W 12/08; H04W 4/40
  See application file for complete search history.

(56) References Cited

U.S. PATENT DOCUMENTS

| | | | |
|---|---|---|---|
| 10,581,869 B2* | 3/2020 | Simons | H04L 9/3226 |
| 10,951,626 B2* | 3/2021 | Simons | H04W 12/08 |
| 10,958,663 B2* | 3/2021 | Simons | H04L 9/3226 |
| 2017/0244721 A1* | 8/2017 | Kurian | H04L 63/08 |
| 2019/0238550 A1* | 8/2019 | Zhang | H04L 63/105 |
| 2020/0344233 A1* | 10/2020 | Lai | G06Q 20/4014 |
| 2021/0352080 A1* | 11/2021 | Simons | H04L 9/3226 |
| 2022/0150257 A1* | 5/2022 | Simons | G06F 21/62 |

* cited by examiner

BLOCKCHAIN-BASED COMMERCIAL INVENTORY SYSTEMS AND METHODS

CROSS-REFERENCE TO RELATED APPLICATIONS

This application is a continuation-in-part of U.S. patent application Ser. No. 17/199,533 filed Mar. 12, 2021, entitled "Blockchain-Based Commercial Inventory Systems And Methods"; which is a continuation of U.S. patent application Ser. No. 16/812,200 filed Mar. 6, 2020, entitled "Blockchain-Based Commercial Inventory Systems And Methods," which will issue on Mar. 16, 2021 as U.S. Pat. No. 10,951,626; which is a continuation-in-part of U.S. patent application Ser. No. 16/806,646 filed Mar. 2, 2020, entitled "Customized View Of Restricted Information Recorded Into A Blockchain"; which is a continuation of U.S. patent application Ser. No. 16/579,697 filed Sep. 23, 2019, entitled "Customized View Of Restricted Information Recorded Into A Blockchain," and issued on Mar. 3, 2020 as U.S. Pat. No. 10,581,869; which is a continuation of U.S. patent application Ser. No. 16/294,745 filed Mar. 6, 2019, entitled "Customized View Of Restricted Information Recorded Into A Blockchain," and issued on Sep. 24, 2019 as U.S. Pat. No. 10,425,426; which claims priority to U.S. Provisional Patent Application No. 62/639,393 filed Mar. 6, 2018, entitled "Customized View of Restricted Transactions Recorded into a Blockchain," and U.S. Provisional Patent Application No. 62/701,947 filed Jul. 23, 2018, entitled "Customized View of Restricted Information Recorded into a Blockchain," each of which are incorporated herein by reference in their entirety for all purposes.

TECHNICAL FIELD

Various embodiments of the present technology generally relate to inventory transaction systems. More specifically, some embodiments, relate to blockchain-based inventory tracking systems wherein the inventory can include at least one of parking spaces in a parking facility, rooms in a hotel, package deliveries, game results, payments on gaming results, autonomous vehicles for hire, and retail sales. Embodiments also relate to the auditing and taxation of revenue generated from the commercial sales of inventory and services.

TECHNICAL BACKGROUND

Blockchains allow a network of users to make a digital ledger of data and share the data among the other users in the network. Unlike previous database structures, the blockchain database is maintained by a multitude of independent nodes spread across a large distributed network. When a transaction is recorded into the blockchain database, it is very difficult, if not impossible, to change or remove that data from the database since the data is stored in more than one node in the distributed network. Therefore, data is added into the blockchain database by multiple users and changing the recorded data would require each of these users (or a majority of the users) to agree to the change. This distribution of control to add, edit, and remove data from the blockchain database creates trust amongst users in the network, especially when users are not familiar with one another.

Overview

Various embodiments of the present technology generally relate to inventory transaction systems. Inventory can include at least one of parking spaces in a parking facility, rooms in a hotel, package deliveries, game results, payments on gaming results, autonomous vehicles for hire, and a retail sale. These system can provide an enhanced architecture, methods, and software applications that can generate a customized view of a blockchain transaction. In some embodiments, a blockchain of block entries requested by a plurality of users from user devices is maintained in a distributed network of nodes. The block entries each comprise a plurality of data portions that are each associated with an access level. A request to view one or more data portions of a block entry can be received which includes an access code associated with at least one access level. The access code in the request can be evaluated with the blockchain of block entries to identify one or more data portions associated with the access level. A customized view of the block entry can be generated which includes the one or more data portions associated with the access level.

Some embodiments provide for a system for tracking, management, and fulfillment of parking space transactions in a parking facility. The system can maintain a blockchain (or distributed ledger) of block entries requested by a plurality of users from user devices in a distributed network of nodes. Examples of users may include customers of the parking facility, and/or an operator of the parking facility. The block entries may include entries from the customers relating to at least one parking space offered by the operator of the parking facility, and entries from the operator of the parking facility regarding an availability status of the at least one parking space. The block entries can each include a plurality of data portions that are each associated with an access level. The system can receive a request to view one or more data portions of a block entry. In some embodiments, the request may include an access code associated with at least one access level. The system can then evaluate the access code in the request with the blockchain of block entries to identify one or more data portions associated with the access level. A customized view of the block entry can be generated including the one or more data portions associated with the access level.

In some embodiments, a customized view of blockchain data for parking facility transactions can be generated. The method can include receiving a request to view one or more data portions of a block entry maintained in a blockchain, where the one or more data portions of the block entry include restricted information. The one or more data portions of the block entry can each associated with an access level assigned to: customers of the parking facility, and users associated with an operator of the parking facility. The method can includes evaluating an access code in the request with the blockchain of block entries to identify one or more data portions associated with the access level. The method can include generating a customized view of the block entry including any of the one or more data portions associated with the access level while applying redactions to any of the restricted information not authorized by the access code.

As an example, in the parking industry, identification information of customers and their vehicles such as vehicle identification numbers (VINs), license plate numbers, access card numbers, subscription plan details, usage history and preferences, addresses, known electronic wallets, mobile phones, electronic keys, digital fingerprint, credit/debit cards used, cryptocurrency wallets used and the like can all be kept on a blockchain with other customer information. Cryptocurrency as described herein can include non fungible tokens (NFTs) as well as fungible tokens (e.g., bitcoin, Ethereum, etc.) when used for transactions such as payment for goods and services. The customer would not want any of this information viewable in a public format and public access may create legal liabilities for the operators or owners of parking facilities. Various embodiments use various encryption and hashing techniques to securely store the data on the blockchain and only allow authorized users to view the data. As an example, a driver may enter a parking garage and the year, make, and model of his vehicle may be used to identify him in a public forum but none of the other private information would be available for anyone to see other than users with the correct access which would include the user, proper parking garage staff, auditors, regulators, or the like.

In some embodiments, parking facilities for which the present technology are applicable may include commercial parking structures such as parking lots and garages having numerous parking spaces in a defined spatial area, as well as parking spaces that may be distributed over a specified area like a sector of a city or town, a neighborhood, a block, or a portion of a parking lot, garage, or other parking structure. In an example, customers of parking facilities may be charged once they and their vehicle enter a parking facility and that charge is blockchain based. For instance, some people would be charged for all day rates up front when they pull into garage or lot. Some people would be charged a fraction of an all-day rate based on time spent in the lot or garage. Some people are able to pay for unrestricted 24 hour/365 access or whenever the parking facility is open. Some people will not be able to park with month passes on blackout dates or excess charges would apply. The embodiments of the present technology enable blockchain-based parking transaction management and customized views to handle these and other pay-per-use or subscription-based parking use cases for heighted convenience and efficiencies in parking business operations.

In the parking examples, supply chain efficiency can be improved by real time tokenization from customer interaction to a dynamic blockchain. The perception of purity on a consumer product of where the seed came from, grain fed to animals, weather and climate, traceability from consumer perspective is the same thing for parking. Cost efficiency on supply chain to consumer scales with know-how and actionable intelligence, all of which and more may be collected and analyzed faster and with greater granularity using the disclosed systems and methods. The real time tokenized of data shared via user interfaces on the customer and parking facility operator endpoints provides not only for collecting and customized viewing of the data, but also facilitates timely updates to the information that is most pertinent to parking businesses and their customers.

In parking yield management, capabilities can be improved by knowing parking reservation load, credit card processing, bundled packaging through channels (e.g., selling out of parking at a stadium, what percent showing up that is not reserved versus percent of people coming to an event without a reservation). Payment processing for parking may be performed using the various embodiments of the disclosure by taking reservations with or without payment, or by charging a user in real time only when a respective parking space is taken by their vehicle.

People are making last minute decisions and the technology needed to deliver parking to them will charge customers faster, open parking gates based on geolocation of car (can be authenticated many different ways such as VIN#, license plate, cell phone info with credit card payment putting car/use in the space and transacting a credit card or payment method much like toll road transponder). The device can be a transponder or transmitter. An app can verify when someone arrives in their vehicle to a parking facility and, if GPS or other geo-locating technology on car/phone/user, the customer can be charged when they arrive to an area much like the arrow geolocation. There may be rewards built into the app, as well as violations which can be paid thru the app, as well as a mapping calculator for what the price of a parking space is. For example, one lot charges an early bird of $8 at 2-5 pm, $15 at 6 pm and that same lot charges $25 an hour later as the event starts at 7 pm. All of this information may be recorded into a blockchain. Also, different parking lots, or certain spaces within one parking facility, can have different prices. The ones closest to a pedestrian exit, up can charge $50 at 7 pm and the ones furthest away could be $5. All of this information can be shown on a map with directions for a user of an app finding parking. All of this information may allow user to see what is going on in an area in the future, in real time, or the past.

Logistics provides another direct application of the technology. For example, tracking of packages or cargo, movement of commodities from one place to another is important. All information can be included in what is being transported from where the cargo came from and is going to. At various points, the cargo may be scanned so the precise location is known for the cargo at specific times. This can be entered into the blockchain record. In addition, the cargo can be associated with specific vessels, trucks, vans, or other delivery mechanisms (e.g., delivery drones) and the GPS location of that delivery mechanism can be tracked in real-time, upon request, or at certain time intervals. Additional information, such as the buyer, the seller, the owner insurance information, and the like can be reported as well as demurrage tied to GPS recorded on a blockchain. Companies and/or governments do not want everyone to know their business for a variety of reasons but need the ability to audit and prove to inspectors, controllers or regulators what they are or were doing at a certain time/place. The ability of keeping things private is mandatory. As such, various embodiments can use a combination of private, public, and hybrid blockchains to store the information. Moreover, various encryption schemes and access levels can be associated with individual portions of the data to ensure privacy where needed or wanted while granting access when necessary.

In some embodiments, the technology can provide specific applications to the defense industry. For example, the US government needs the ability to audit and control purchasing, logistics, supply, troop movement, and the like. This information if it falls into the wrong hands could have deadly consequences. Obfuscation of certain aspects of information in keeping them private is imperative to the success of a mission. Having the ability to classify the data and allow access is imperative to make sure only the people required have the ability to access the data (e.g., to see, monitor, work on, or audit, etc.) while anyone that does not have access is not able to see the data portions. In some embodiments, the system may automatically review documents relevant to a query and automatically apply one or more redaction filters based on the user's clearance status.

Still another direct application of the technology is operation of parking facilities. For example, an owner or operator of a parking garage or lot may provide drivers with parking spaces on as-needed (e.g., hourly or daily) basis or as part of a subscription plan (e.g., monthly parking). Beyond this basic provision of parking spaces for a fee, parking facility owners/operators may provide various ancillary services to drivers to enhance the convenience, safety and comfort during the course of using the facility. Provision of such ancillary service may distinguish a particular parking facility from others located nearby so as to provide the owner or operator of the particular facility a competitive edge in the marketplace and attract and retain loyal parking customers. In doing so, the parking facility may experience increased revenues, decreased liability risk, and more efficient business operations. Use of the blockchain and associated user interfaces to acquire, transmit, record and track parking transaction-related data facilitates the aforementioned benefits to parking customers and facility owners and operators as explained in greater detail, below, by way of examples.

In some embodiments, units of inventory in a physical structure that may be managed using the present technology include travel-related contexts other than parking facilities. For example, transactions like reservations, payment, and reviews for hotel rooms in one or more buildings, and even distributed across numerous locations of a chain hotel brand, may be managed via the disclosed customized views in like manner as for parking spaces, and similar units of defined inventory. In an example, customers of hotels may be charged once they arrive at the hotel or first enter their room after having successfully made a reservation. The customized view and blockchain transaction recordation ensure both privacy and security in customers enjoying their hotel stay and operators being assured of the marriage between reservation and payment. Charges and reservations, as well as provision of related services and business operations of the hotel are blockchain based and may utilize the customized view according to the disclosure. Convenience and business efficiencies are realized according to the present technology in such use cases as automatic crediting or debiting of rewards points of travelers. The benefits of such automation provided by the disclosed blockchain based technology and customized views are apparent in the hotel context, but may also be enjoyed for airline and other ground transportation services.

Autonomous vehicle fleet management is yet another direct application of the technology. For example, an owner or operator of one or more autonomous vehicles may experience peaks of usage on weekdays in specific time frames (e.g., rush hour commuting times) and have less usage during off-peak times and on weekends. Certain passengers of the autonomous vehicles may use them in particular ways, as in hailing the autonomous vehicles from specific locations and at certain times. Tracking usage patterns of the autonomous vehicles by passengers may enable the owners or operators of the fleet to realize economic efficiencies and enhance users' experiences. All information can be included in who is being transported from where and to what destination, the locations of the autonomous vehicles upon being hailed, and the routes taken by the autonomous vehicle to and from the destination. These and other useful data can be entered into the blockchain record. In addition, the locations of the autonomous vehicles can be associated with specific passengers and their GPS locations can be tracked in real-time, upon request, or at certain time intervals. The data recorded in the blockchain may be used to facilitate autonomous billing and auditing.

Additional information, such as electric battery energy usage, charging history, vehicle maintenance records, liability insurance information, and the like can be reported, tracked, and recorded on a blockchain along with vehicle and passenger identifiers. For at least some fleet operators and passengers, maintaining the privacy of these records is important for business and/or personal reasons. However, in some cases such as a court order or warrant, such information recorded in the blockchain may need to be disclosed to inspectors, controllers, police or regulators. As such, various embodiments can use a combination of private, public, and hybrid blockchains to store the information. Moreover, various encryption schemes and access levels can be associated with individual portions of the data to ensure privacy where needed or wanted while granting access when necessary.

As another example, in the ground transportation industry, the present technology may be employed to track the locations of autonomous or human-driven buses, shuttles, and taxis, enabling real-time views of these data by operators and current or potential passengers. For instance, a customer may call for a shuttle at the airport from an off-airport parking facility and wants to be picked up. Using the customized views of the present technology, the customer may see where the shuttle is presently located, determine an accurate estimate of a time of arrival, and see if they missed the shuttle at the desired stop. This may be of great benefit to customers in cases where, for example, they wish to minimize wasted time waiting for a shuttle or other means of ground transportation. Similarly, hotel shuttles and event-specific shuttle operators and their customers may benefit in an analogous manner for added operational efficiencies and convenience.

Recording tracking data in the blockchain for either autonomous or human-driven vehicles used for ground transportation of passengers in a wide variety of contexts further enables real-time updates and tracking of bus, shuttle and/or car states in a single fleet, or across two or more vehicle fleets. These data can be paired with passenger pick up locations recorded in, and tracked using, the blockchain, where both operators and passengers may utilize the disclosed customized views to conveniently assess operational status, as perform other useful functions like changing pickup locations, providing status updates, and rerouting fleet vehicles according to changing demand or other factors such as traffic conditions and weather.

Additional technical benefits flowing from application and use of the present technology in the ground transportation include providing passengers a means to make payment for rides and possibly also tip their drivers using private and secure blockchain-based transactions. The disclosed customized view may be advantageously used by passengers not only for arranging ground transportation and seeing where and when their rides will arrive, they may also prepay for rides, schedule rides for later dates and times, and, in some embodiments, alter their pick up and destination points to better suit their needs. The present technology may seamlessly adjust either human-driven or autonomous vehicle directions, navigation and scheduling according to the needs of the passengers and according to the availability of fleet assets able to serve passengers. With passenger updates, along with any changes in asset and/or driver availability to meet customer needs, ride rates may be adjusted in real time according to changes in operational and environmental conditions. These value-added technical benefits are bolstered by practice of the present technology in the ground transportation industry by enabling passengers to pay via the disclosed customized view (e.g., through a Smartphone app) using any form of payment, including cryptocurrency. For the operators of ground transportation fleets and other services, the performance and efficiency of their vehicles and personnel are readily quantifiable to define and analytically assess meaningful metrics using the location, timing, and other data recorded, and updated continually in, the blockchain.

As yet another example, in the gaming industry, customers social security numbers, biometrics, addresses, photos, driver's license, prior game play, IRS tax notices, win/loss, comps, loyalty card/player card number information, birth dates, known associates, spouse/girlfriend, favorite teams, liked/disliked activities, tipping amounts, ATM use while on property, known electronic wallets, credit/debit cards used, cryptocurrency wallets used and the like can all be kept on a blockchain with other customer information. The customer would not want any of this information viewable in a public format and public access may create legal liabilities for the casinos. Various embodiments use various encryption and hashing techniques to securely store the data on the blockchain and only allow authorized user to view the data. As an example, the customer may enter into a tournament and his name or player number may be used to identify him in a public forum but none of the other private information would be available for anyone to see other than users with the correct access which would include the user, proper casino staff, auditors, regulators, or the like.

Various embodiments provide techniques to store and provide access to information an owner intends to keep private but in public ledger that can be seen and audited by authorized entities or individuals. There are privacy laws world-wide that require information to be kept private. Various embodiments can ensure compliance with those privacy laws by ensuring the data is stored in correct formats and only accessible in compliant manners. As another example, there are businesses and governments that do not want their private information, knowledge or trade secrets to become known. While these groups do not have anything to hide, having all of their information in an open forum where anyone has viewability or knowledge of how people, businesses, governments, or the like operate will bring on loss, theft and increased competition.

In some embodiments, betting transactions or inventory or parking- and other travel-related (e.g., hotel rooms) transactions may be carried out using any cryptocurrency carried in a user's digital wallet (e.g., Ethereal vs. Bitcoin, etc.). In such examples, the embodiments of the disclosure may enable shapeshifting or exchanging values between types of cryptocurrency, or between cryptocurrency and real currency based on an exchange rate maintained by an external data source in communication with the blockchain. For instance, if a first player only has Bitcoin and bets 2 Bitcoins against a second player who has 300 Ethereum, and the first player wins the bet, the appropriate amount of Bitcoin is automatically deducted from the second player's digital wallet and credited in the converted amount of Ethereum to the first player's digital wallet. Such automatic currency conversion for payment processing may be applied to the several examples described herein, including the inventory (e.g., parking, retail, etc.) transaction tracking, management, and fulfillment scenarios. Such a decentralized and automatic currency exchange may operate continuously and without human intervention being required. The same may equally apply in the disclosed embodiments to artificial intelligence systems and user interfaces for making and taking bets, and for making decisions such as game play, event betting, types of bets and risk/odds and payouts without human intervention.

In some embodiments, inventory transaction management, processing and tracking according to the present technology enables businesses and their customers to integrate multiple payment methods and seamless account for any value available for payments for various goods or services. For example, customer payment accounts that are made available for inventory transactions may be pre-paid or they may be linked to one or more other accounts. In a use case, an account may be credited or debited with currency due to the account being prepaid (e.g., charged with money by the customer) or the account having received a refund for either a similar or unrelated transaction. For instance, a cancelled parking or hotel reservation that complies with a policy of the provider of such inventory (e.g., cancelled before an expiration date/time) may be credited to a customer account as currency for use in another inventory transaction, and the related transaction information recorded in the blockchain and made available to both the customer and the business via the customized view.

In some embodiments, inventory transaction management, processing and tracking according to the present technology enables businesses to fulfill tax audit and payment obligation to government entities (i.e., federal, state, local governments) based on earnings. An artificial intelligence engine can review entries within the distributed ledger, identify earnings information associated with the sales of the commercial inventory, determine tax based on earning information, and pay tax to government authorities based on earnings information. A blockchain can be programmed to automatically or periodically (e.g., daily, weekly, monthly, quarterly) pay taxes to government entities entitled to receive tax (e.g., federal, state, local government) based on an entity's income/earnings. Payment of taxes based on earnings can be provided via fiat, or by cryptocurrency such as a stable token designed for the payment of taxes. Payments of tax onto the government tax departments or authorities can be via a batch payment daily, bi-weekly, weekly or monthly. The desired payments schedule can depend on real time earning and tax determinations by a server and/or artificial intelligence engine that is then recorded into the blockchain. Real time earnings and tax determinations can also enable government entities with real time auditability of the financial aspects of transactions. Tax information can be segregated on the blockchain for auditing purposes. Once tax information is known, businesses/operators or a system programmed to operate autonomously can make tax payments to government entities in real time, or in batches daily, weekly, bi-weekly, monthly, quarterly. This can be enable on the blockchain via smart contracts.

Some embodiments allow a data platform to connect to electronic voting machines. These machines can directly report information about voters, the ballots, and cast votes to the data platform for storage in a blockchain. The data platform can encrypt and set access levels for access to the voting records. For example, the voting machines may collect a person's information, social security number, address, party, biometrics, driver's license number, photo, or the like. As such, keeping much of this information used in an election there needs to be kept private from the public, some information may be public (e.g., that a person did vote in a particular election, their party affiliation, or the like). Moreover, some embodiments provide for the use of automated techniques for identifying and/or eliminating voter fraud. For example, some embodiments, may use an artificial intelligence or machine learning engine to review the voter data stored in the blockchain and identify voters voting twice, illegal voters, or the like.

In addition, the examples provided above, the technology may be used in banking, jury voting, court proceedings, healthcare, fire arm sales, retail sales, pharmaceuticals, pensions, financial transactions, insurance, tax payments and many other applications where auditing, public viewing of data, private viewing of data, tax payment fulfillment and the like are needed.

Some embodiments of the present technology may use optional markers under the hybrid format. For example, in some embodiment the system may have the ability of setting things to private (not viewable by people without access), public (viewable by everyone), or a hybrid of the two (some information is public and some information is private). There are circumstances that a public blockchain should be used and can be totally transparent for everyone to see. There are also some cases where some privacy from some of the information is required in order to meet privacy laws or fore the mere fact that people do not want others to know that they are the person or organization who is responsible for doing something which would be the hybrid format. The ability to obfuscate or keep private certain information is imperative for the above industries.

In accordance with various embodiments that use the private or hybrid format, there are at least two options for securing the data. For example, in some embodiments, a total obfuscation of information can be done by applying encryption to unlock. Some embodiments may use multiple layers of encryption so that portions of the data can be limited and accessible to various individuals. In a hybrid mode of operation, some of the information can be public or transparently seen while other information will be kept obfuscated or private. In some cases, a marker can be used to designate the data access level. A marker could be something which shows who the user is to an auditor, election official, controller, or the like and could be a number like citizen 1, or customer 200. In some embodiments, a codex may be used which could be controlled by the system which would scramble the identity of the user so no one would know who the user is thus keeping the identity private. Only the persons responsible for the auditing or administering the blockchain would be able to figure out who the accountable party is. In some embodiments, the codex would never provide this information unless it needed to be audited and accounted for.

In some embodiments, an auditing functionality can be integrated into a user interface that would give a user (e.g., the with the click of a virtual button) the ability to allow all information or some information (e.g., column, format, section, etc.) private, public, and limited access. Some embodiments provide for real-time monitoring/auditing function which will show and allow a user to double or triple check what is kept private. In some embodiments, a password, password with two-party authenticator, three-party authenticator, multiple signature, or the like would be a part of a decentralized application (DApp) powered by the blockchain that would enable a user to submit, add or attach information going into a blockchain. In some embodiments, this information can be set up in a decentralized manner so information can automatically be inserted and tested and monitored on a decentralized network in real-time so that information is not leaked out or hacked or seen by parties that are not permitted.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

DETAILED DESCRIPTION

Figure 1:
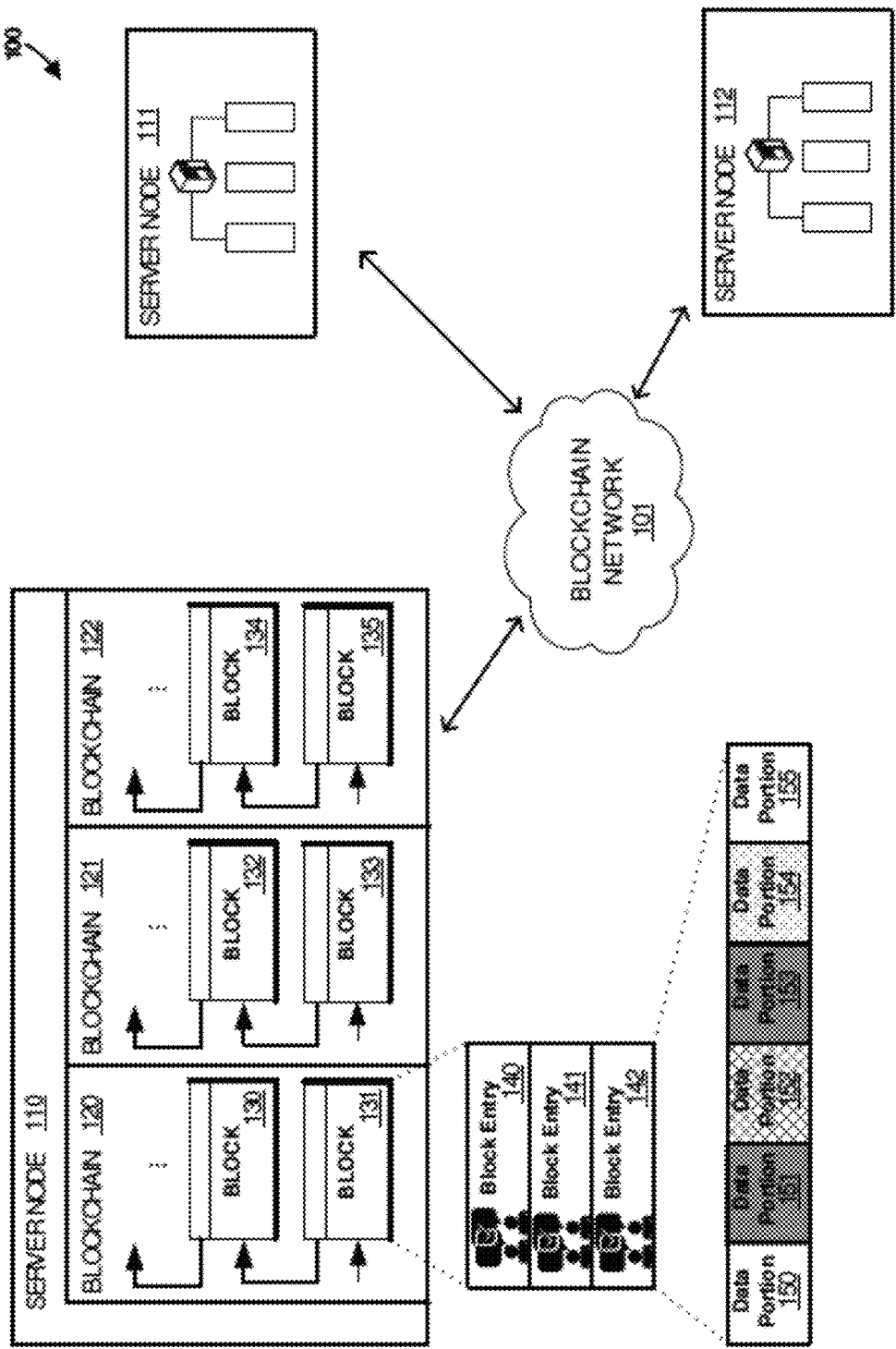
FIG. 1 illustrates an operational architecture for implementing an enhanced application to generate a customized view of restricted transactions recorded into a blockchain.

Blockchains have become a commonplace in generating a blockchain of data and sharing the data among users in a distributed network. Unlike previous database structures, the blockchain database is maintained by a multitude of independent nodes spread across a large distributed network of nodes. A public blockchain is a digital ledger that is open to any user to enter and record data (also referred to herein as transactions or block entries) into a block of the blockchain. When a transaction is recorded into the blockchain database, it is very difficult, if not impossible, to change or remove the transaction data from the database since the data is stored in more than one node in the distributed network. Therefore, data is added into the blockchain database by multiple users and changing the recorded data by adding, editing, or removing data would require a majority of the users or a master controller supervising changes and a cosigner (e.g., manager and employee, auditor and pit boss, etc.) to agree to the change.

Additionally, each block contains the data, the hash of the current block, and the hash of the previous block. The blockchain may also store additional details about the transaction in the block, such as the username initiating the transaction, other usernames of parties associated with the transaction, a timestamp, executable code, among other information that relates to the transaction. The hash identifies the block and the transaction data stored within the block. The hash is unique from all other hashes and changes whenever a change is made to the block. Since each block contains the hash of the previous block, the blocks form what is known as a blockchain. Any tampering with a block will cause a change in the hash of that block. Therefore, all other blocks in the blockchain will become invalid since they no longer contain a valid hash of the previous block.

While it may be possible to change the hash of each subsequent block in the blockchain, it would be nearly impossible to change each blockchain stored on each node in the distributed network, for both private and public networks. This combination of storing previous hashes to form the blockchain and distributing a full copy of the blockchain to each node in the distributed network (private, permissive, and public) creates a system of trust amongst users and the stored transactions in the network, especially when users are not familiar with one another (i.e., public network).

Examples of the present disclosure describe a system, process, and application for generating a customized view of a blockchain transaction. A blockchain of block entries requested by a plurality of users from user devices is maintained in a distributed network of nodes. The block entries each comprise a plurality of data portions that are each associated with an access level. A request to view one or more data portions of a block entry is received which includes an access code (e.g., hash, private key, biometric, password, PIN, etc.) associated with at least one access level. The access code in the request is evaluated with the blockchain of block entries to identify one or more data portions associated with the access level. A customized view of the block entry is generated which includes the one or more data portions associated with the access level. In some embodiments, the portions of the data stored in the blockchain may be individually encrypted. As such, depending on the level of access associated with the access code, decryption of only a portion of the data may be authorized or available while other portions would remain secure.

A technical effect that may be appreciated from the present discussion is the increased efficiency in identifying entry data that a user is authorized to access (e.g., financial records in a banking institution, parking facility customer and associated transaction data, a customer/supplier tracking inventory, vehicle fleet passenger usage, route and location information, compliance data for a gaming regulation committee, classified documents from a governmental or semi-governmental agency, health records for a medical institution, Protected Critical Infrastructure Information (PCII), data needed for a government auditor/inspector, and the like) and providing a customized view of the data that was recorded in the blockchain transaction. Some of the embodiments described herein also improve security by only allowing access to the user if the user has authorization to access the portion of data from the blockchain entry. In addition, some embodiments can provide an immutable log showing when and who accessed various data. In addition, in some embodiments, automatic review (e.g., by an artificial intelligence or machine learning engine) can occur to detect specific events (e.g., theft of user account access credentials or facility access devices, insider trading, money laundering, cheating, voter fraud, etc.).

For PCII in particular, the present technology addresses issues affecting protecting of customer information, along with customer's respective credit card or payment information. The present technology utilizes the blockchain for payment transactions via a blockchain, while obfuscating user information to maintain the privacy of the transaction. Application of the present technology enables some of the respective transaction information to be made available in either a hybridly private, or even public, form may, as the case may be, while still allowing for some information of the transaction stored in the blockchain to be sent about a user via the disclosed customized view. This enables customers to keep their information private while getting the benefit of transparent payment/pricing based on their usage or purchase a unit of commercial inventory. In the parking facility context, for instance, electric vehicle charging stations are made available in some of the parking spaces as added convenience and commercial service. The efficiency and convenience of such services that are ancillary to the main inventory transaction is improved for the customers and the operator where all information (e.g., pricing, rates and availability) related to both the main inventory (parking) and all available ancillary services are stored and updated on the blockchain and made available to all interested parties via the customized view.

More specifically, one implementation may provide a non-routine process of generating a customized view of a banking transaction that limits user sensitive information (e.g., Anti-Money Laundering (AML) or Know Your Customer (KYC) policy documents, (ADD) account numbers, account balances, account statements), but allows an external banking institution or user to verify that an account has available funds for a transaction. Another scenario provides a non-routine process of auditing a transaction in the blockchain while not enabling an auditor to view a full version of the transaction. For example, the Internal Revenue Service (IRS) may require an audit of all monetary transactions performed within the previous tax year. However, the company being audited may not be required to provide a full list of customer names and addresses for each transaction. By providing a customized view of the transaction, the IRS may have confidence in the accuracy of the transaction amounts and the company may maintain anonymity of its customers.

An additional technical effect of the present discussion may be appreciated in the gaming regulation industry. For example, one implementation described herein provides a non-routine process of viewing the outcome of a gaming bet while concealing a betting amount. This may be useful when monitoring a gaming community for advantage players (e.g., card counters, etc.) while allowing the players to maintain privacy of their money pot. In another example, a gaming committee may require a customized view of a transaction to view some personal information about each player (e.g., verification that each player is of a legal age to gamble, verification that each player has not been blacklisted, player handles/nicknames) but not enable other personal information to be viewable (e.g., credit card numbers used to buy into the game, legal names of each player, etc.).

In some embodiments, third parties may view a game, associated statistics of the game, and the winner or loser of the game. In an example, users may select the game to watch from a selection of viewable games and then place their bets (e.g., micro bets or paramutual bets) based on what they are watching. In another example, a game engine for is hosted and operated entirely using the disclosed blockchain-based systems and methods. For instance, a random number generator (RNG) may dictate the outcome of games of chance instead of real world games with bet winners dictated by an external validation source. Games functions including the RNG may be held on the blockchain, or on a shard in cases where the blockchain is partitioned for spreading out the computational and storage workload for running the game. In another example, in the event that a bet is cancelled, then all the bets may be voided. The disclosed systems and method may also be utilized with the blockchain to facilitate people betting on events that may occur in the future. In such cases, given a date that an event may occur, if the event never occurs on any of the dates comprising players' wagers, the bets may be cancelled as it was a prerequisite in the bet that the event may never happen. In that instance, the bettor would lose their money to the bookmaker, bot or person taking the bet.

Another example may include the Nevada Gaming Commission requiring disclosure documents of previous business relationships, employment history, criminal records, and financial stability from an applicant seeking a license for a gaming establishment. However, the applicant may not be required to provide expunged records of criminal behavior. Therefore, the view of the documents would be customized to display only those portions of the documents required by the Nevada Gaming Commission and omit, redact, or otherwise obfuscate data that is not deemed relevant or needed for seeking the license. In some embodiments, taxation of betting transactions and winnings may be carried out online automatically at the appropriate rate based on a bettor's location, as determined by the IP address or GPS location of the bettor's device. In an example, the blockchain according to the disclosure provides interoperability to the blockchain to communicate on the platform or between bets.

In some embodiments, the system may ingest the private information and generate a publicly viewable score, rating, or other indicator that may be used in making a decision without disclosing the underlying confidential information. In some embodiments, the system can connect to additional public and private data sources to collected additional information. For example, public information like FBI reports, credit reports, background reports, and the like. This additional information can be stored in the blockchain as part of the record or profile of an individual. This could be done off of a social security number, driver's license, facial recognition or fingerprint as a second factor for verification. As such, once a person enters the casino and registers a card to play it is possible that big data would be collected on who the person really is and that information would only be available to the casino, auditor and regulator to make sure the person is who the person says he is, is legal and allowed on property or able to play. It is possible that commercial and government buildings like office buildings and airports are able to have camera systems which read the license plates for cars coming into a parking facility or monitoring facial recognition of the driver and passengers. This information can be compared and scored to see if the car or the person is safe to enter a facility. Cameras can also be used to capture images of a vehicle begore it enters a parking facility to ascertain if there is any pre-existing damage on the vehicle, which would enable facility operators/owners to avoid liability for property damage claims where there was pre-existing damage to the vehicle.

In an example, a casino may host or maintain one node on a distributed network of nodes. This gives the casino their own irrefutable record of events that they can access and control. If the network goes down, the casino would still be able to manage all of its activities from bets, game play, stakes, rewards, etc. Once the network comes back on line, any necessary updates may be made with ease by the casino's node to the distributed network of nodes. This backup functionality and independent node scenario provides a casino with continuity of business operations, and such benefits may be enjoyed in an analogous fashion in the retail and parking space examples.

In yet another embodiment, a technical effect may be recognized for a non-routine process of tracking package deliveries and inventory transit. For example, one or more packages may be scanned at origin, then once again as the packages begin transit in one cargo unit. The transit company may want to allow a recipient of one of the packages to view data associated with their box but not allow the recipient to view all other data stored in the transaction associated with the other packages in the cargo unit. Therefore, a customized view of the transaction for the recipient user describing the location, departure time, and estimated arrival time for their package only would be enabled. Additional information associated with the product may also be collected and stored in a blockchain detailing product logistics, such as manufacturer, vendor, checkpoint location, checkpoint employee, quality control manager, testing center, as well as a chain of custody through the shipping process as well as individuals that accessed the cargo unit during its shipment. At any time or upon receipt, the receiving party may be enabled to see parts of this information but not all depending on the status of the recipient. For example, a gambling establishment or regulator may be able to view selective product information regarding manufactured dice along with a chain of custody to verify that the dice have not been tainted with while routed from the trusted dice manufacturer. This data may be displayed in a customized view.

Further, examples herein describe that the access code in the request with the blockchain of block entries may be evaluated by processing an encryption code to validate access to view the one or more data portions associated with the access level. In other examples, a pointer is also maintained for each of the plurality of data portions in the block entries indicating at least one published location for each of the plurality of data portions in the block entries. Further in this example, the customized view is generated by retrieving the one or more data portions associated with the access level using the pointer for each of the plurality of data portions in the block entries. The access of the portions of data require the use of a pin code, password, fingerprint, barcode, retinal scan, token, questionnaire, or any other type of access determination method including two-factor, multi-factor, or additional security authenticators.

In still other embodiments, additional technical effects may be recognized for a non-routine process of tracking and recording activities, preferences and transactions in parking facilities. For example, entry and exit times may be collected and recorded in the blockchain and associated with vehicle identities. Additional identity information of vehicle drivers or passengers (e.g., biometrics, facial recognition or mobile phone) using the parking facility may be collected contemporaneously with vehicle identities, and used to validate parking payment transactions. Electronic wallets, including for real or cryptocurrency, and credit or debit card account information received via a user interface either prior to or proximate in time to the parking visit may be securely associated with parking customers and utilized for fast and secure payment transactions using real time tokenization. Additional information associated with periodic or recurrent parking facility customers (e.g., multiple vehicle identifiers owned or otherwise used by a particular customer) may also be collected and stored in a blockchain and utilized to facilitate efficient parking business operations and enhanced convenience for customers. In addition to manual data entry of information for recording in the blockchain, various devices positioned in or near parking facilities may be utilized to facilitate improved parking business operations and customer experiences as described in greater detail, below, by way of examples. These data may be displayed to parking facility staff and customers in a customized view.

In a further example, the blockchain of block entries requested by the plurality of users from the user devices is maintained by maintaining a separate block entry for the one or more data portions associated with each of the access levels. Further in this scenario, the access code in the request is validated to view the one or more block entry for the more or more data portions associated with each of the access levels. In some implementations, the blockchain of block entries requested by the plurality of users from the user devices is maintained by maintaining a separate blockchain for the one or more data portions associated with each of the access levels. Further in this implementation, the access code in the request is validated to view the one or more block entry for the more or more data portions associated with each of the access levels.

In some examples, the received request to view the one or more data portions of the block entry comprises an inventory tracking request pertaining to products or packages, or to available parking spaces at any given time in a parking facility. In the parking industry context, such requests may be received by either an owner or operator of the parking facility, or by a current or potential parking customer. In other examples, the received request to view the one or more data portions of the block entry comprises a financial auditing request. In some scenarios, the received request to view the one or more data portions of the block entry comprises a gaming regulation request or a request pertaining to an investigation involving a vehicle parked in a parking facility presently or at some past time or when it entered or left the facility. In other scenarios, the access level associated with the one or more data portions of the block entry comprises at least one of a private access level, a permissive access level, and a public access level. However, in even further examples, the access level associated with the block entry comprises at least one of a private access level, a permissive access level, and a public access level.

While the present disclosure describes various embodiments, it should be appreciated that additional examples may be included for technical improvement in additional industries. Example industries may include defense and security, finance and insurance, retail (e.g., firearms), sales and licensing, medical records, accounting, shipping and logistics, drugs and pharmaceuticals, cannabis and CBD, oil and gas, energy and commodities, national security, and the like.

Figure 28:
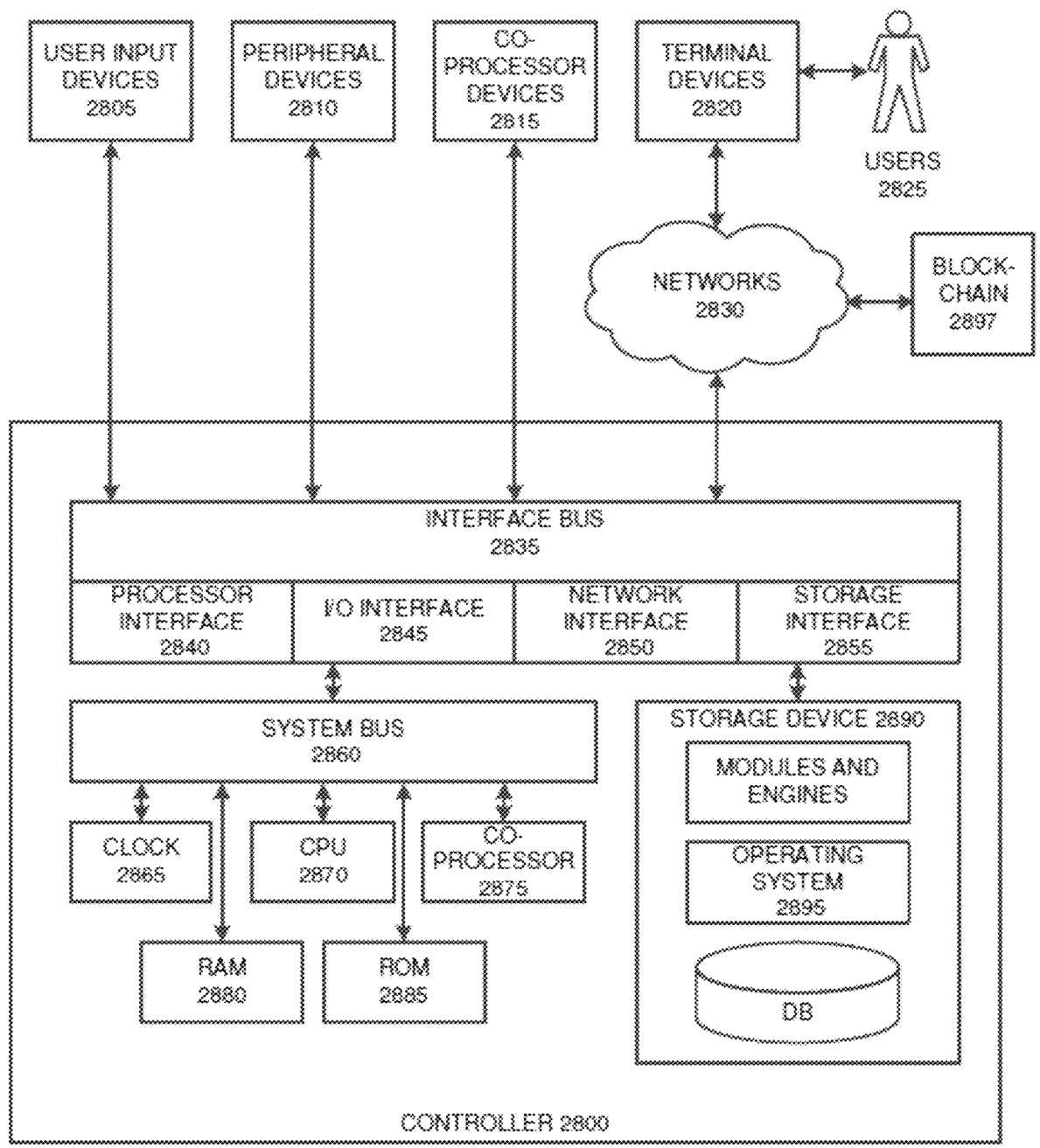
FIG. 28 illustrates a computing system suitable for implementing the technology disclosed herein, including any of the architectures, processes, operational scenarios, and operational sequences illustrated in the Figures and discussed below in the Technical Description.

Referring to the drawings, FIG. 1 illustrates an exemplary operational architecture 100 related to processing operations for management of an exemplary enhanced system with which aspects of the present disclosure may be practiced. Operational environment 100 includes blockchain network 101. Blockchain network 101 employs a view customization process 200 in the context of authorizing a user to view a portion of data in a blockchain entry based on the user's approved access level. Blockchain network 101 may include various hardware and software elements in a supporting architecture suitable for performing view customization process 200. One such representative architecture is illustrated in FIG. 28 with respect to controller 2800.

Server nodes 110-112 comprise one or more servers and devices capable of running a blockchain application. User devices interacting with server nodes 110-112 may include, but are not limited to, personal computers, mobile phones, handheld device, tablet computers, desktop computers, laptop computers, wearable computing devices, voting machines, gaming machines, electronic financial exchanges, security systems, transponder, cameras or other imaging devices, key fobs, sensors, access cards, and the like capable of transmitting or receiving wireless data signals encoding information for accessing parking facilities for parking and providing payment for the same, or any other form factor, including any combination of computers or variations thereof.

Figure 2:
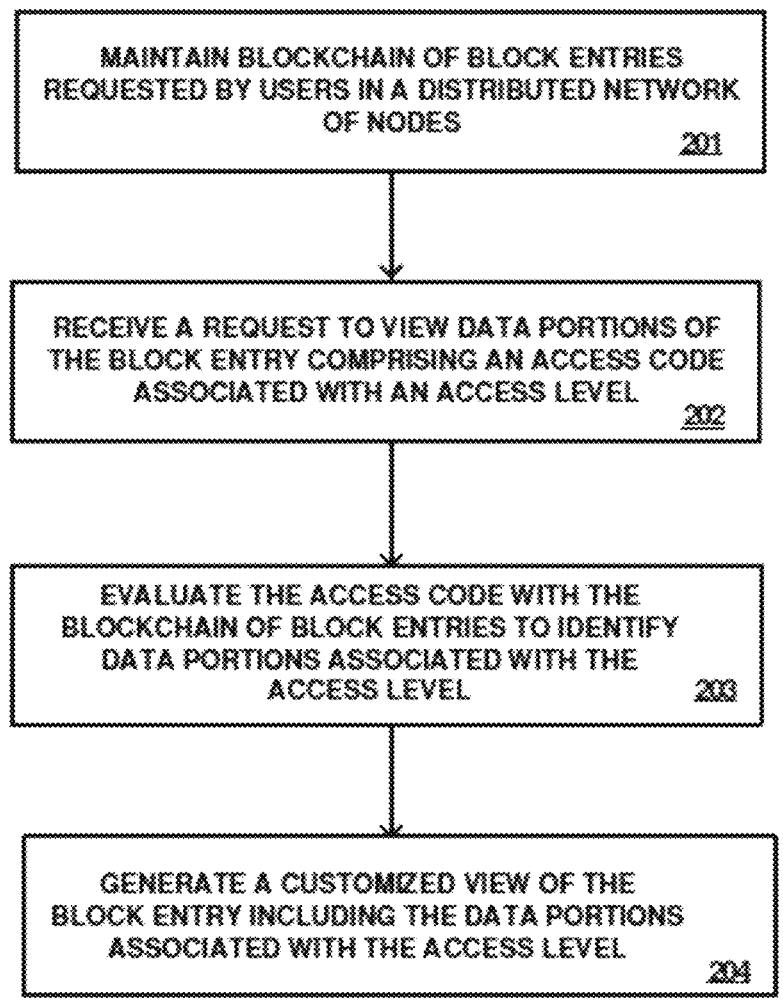
FIG. 2 illustrates a view customization process employed in implementations of an enhanced application to generate a customized view of restricted transactions recorded into a blockchain.

More particularly, FIG. 2 illustrates view customization process 200 which, as mentioned, may be employed by blockchain network 101 to generate a customized view of restricted transactions recorded into a blockchain as described herein. Some or all of the steps of view customization process 200 may be implemented in program instructions in the context of a component or components of the application used to carry out the customized view feature. The program instructions direct blockchain network 101 to operate as follows, referring parenthetically to the steps in FIG. 2 in the context of FIG. 1.

In operation, blockchain network 101 maintains blockchain 120 of block entries requested by a plurality of users from user devices, wherein the block entries each comprise a plurality of portions that are each associated with an access level (step 201). The blockchain database is maintained by a multitude of independent users spread across blockchain network 101 of server nodes 110-112. Blockchain 120 is a digital ledger that is open to any user (e.g., a public blockchain), a specific set of users (e.g., a private blockchain), or combination of private and public users (e.g., a hybrid blockchain) to enter and record data into block 130 of the blockchain. Blockchain 120 may be added by multiple users and recorded by multiple nodes 110-112 in the distributed network.

In the parking industry context, parking facility operators may maintain certain records on the blockchain such as GPS locations of parking facility entrances, identifiers (e.g., alphanumeric) of available parking spaces, rates, and parking sales, specials, or promotions as publicly accessible. In some embodiments, such records are publicly accessible for users who first do one of the following actions: access a website, subscribe to an email list, download a smartphone app, park at a parking facility for the first time, and the like. Other records, such as customers' digital wallets, credit/debit card account information, usage history, vehicle identification information, portrait images, and the like may be maintained on the blockchain as private records accessible only by the respective customers and the parking facility operator. In some embodiments, blockchain records such as a present parking location, vehicle identifier, and the associated customer name may be made available on a limited basis to a vehicle recovery or repair service provider, including on a subscription basis. In this case, a parking facility experiencing a need for vehicle service (e.g., windshield replacement, dry cleaning, pet boarding) may schedule and receive the service with the provider even during such times when the vehicle owner is not co-located with the vehicle in the parking facility. The customer of the parking facility may optionally grant permission to the parking facility via the user interface to have the parking facility process a payment to the service provider using the customer's payment account information recorded on the blockchain. In such cases, the parking facility may, instead of or in addition to a subscriber fee paid to the facility operator by the vehicle servicer, collect a commission from the vehicle service payment for facilitating the service and the payment processing. Related ancillary services in parking facilities utilizing the blockchain in the same or similar manner may include, for example, car washing or detailing, refueling, electric vehicle charging, arranging carpools or rideshares, valet parking, vending machines, coffee bars, newspapers and the like.

Parking reservations can be made via a customer's mobile phone. With this feature, a parking facility knows that a customer is coming. Payment information or payment can be stored and paid in advance or upon arrival at the facility and can be based on the duration of parking that can be determined upon exiting of the facilities. Once a customer shows up to the facility entry, their vehicle license plate, their mobile phone number, or a barcode/hashtag displayed on their mobile device screen can be used to identify them to any of a camera, a kiosk, valet or a facility operator. A customer may have already chosen to pay for valet service or self parking service. A customer can change their mind and chose valet parking upon arrival, which could change the service charge. A customer could also choose to self park and save money so the service charge to the customer could also change. Lot attendants, valets can access the system and amend the booking/reservation and charge for the change in services.

Block 130 includes block entries 140-142. Block entries 140-142 may include various types of data including parking facility customer usage and transaction records, number and locations of available spaces in a parking facility, self-park or valet, gaming bets, inventory records, medical records, banking and financial records, smart contracts, and any other type of combination or variation thereof. For instance, the user (e.g., parking customer) may create block entry 140 by entering into a contract with another user (e.g., parking facility operator) and then storing the contract as block entry 140 in blockchain 120 on nodes 110-112 in the distributed network environment. As another example, electronic devices (e.g., parking facility access control and payment processing devices and systems, sensors, beacons or other devices for detecting an availability status of parking spaces in a parking facility, electronic voting machines, gambling machines, auditing software running on one or more servers, end-user devices, and the like) may connect automatically to blockchain network and request data be added in block entries.

In order to add a new block entry with data portions, blockchain may use consensus protocols like proof of stake (PoS), or proof of work (PoW), delegated proof of stake (DPoS), or the like. For example, in PoW, in order for server node 110-112 to be elected as a leader to select the next block entry 140 to be added to the blockchain, a particular server node has to find a solution (typically by brute force) to a particular puzzle or mathematical problem. Once the solution is found, the server node publishes the solution to the other nodes for validation. When a consensus of the nodes agrees the solution is correct, the new block entry can be added to the blockchain. Examples of proof of work are SHA-256, Blake-256, CryptoNight, Quark, SHA-256, SHA-3, 4crypt, scrypt-jane, HEFTY1 or others or combinations thereof. In contrast, PoS is based on the involvement and value at risk (e.g., the stake) of the server node. DPoS is efficient variation of PoS that provides a high level of scalability by limiting the number of validators on the network to set of delegates (e.g., voters) to vote on whether to add an entry to the blockchain.

Block entries 140-142 also each include data portions 150-155. Data portions 150-155 comprise the components which make up each of block entries 140-142 and may be broken into segments based on a user request or a transaction format (both standardized and customized). For example, a portion of data from a transaction may be allocated as private if a user flags the portion of data as confidential. The portion of data may also be allocated as private if the data is of a category which was previously allocated as private. For example, a user may categorize all credit card numbers as private. Conversely, a portion of data may also be allocated as public or permissive by the user. In some implementations, the portion of data may only be designated as accessible to a receiving user if the originating or controlling user provides permission (e.g., originating party of a transaction allocates the block entry and all data portions as private and ability to view a portion of data requires consent via signature terms and condition form). This user consent feature may be included in an access platform allowing users to provide consent through a user consent section.

Some embodiments of the present technology modify the traditional protocols and workflow for adding data to the blockchain. For example, in some embodiments, the server node 110-112 is required to identify or classify portions of the data into one or more categories. This can be done, for example, using artificial intelligence or machine learning to classify the data into one or more categories (e.g., e-mail address, VIN, license plate number, social security number, full or partial images of human faces for facial recognition algorithms, serial numbers or customer account numbers associated with decoded radio frequency identification (RFID) or near field communication (NFC) signals, etc.). In some embodiments, a decentralized application (DApp) may be responsible for the initial sorting and categorization of the data. When a block entry 140-142 is added, the initial line of the entry that typically includes the hash of previous blocks and a time stamp may be amended to include information regarding the data categories within the entry, access level for each data portion, access restrictions, or the like. For example, some embodiments may create an index and/or access level information that stored within the block entry. As such, when the data is later retrieved it can easily be identified or associated with an appropriate access level. Still yet, in some embodiments, the server node responsible for adding the data may organize the data and set different encryption levels for the different data portions 150-155. In other embodiments, a middleware may be used (e.g., on a data platform sitting between the blockchain network and the connecting devices) to decrypt encrypted data stored on the blockchain, classify information, and enforce access level permissions thereby creating the customized view.

In some scenarios, the user may set a default setting allocating all of the data in the transaction as public and selectively allocate individual segments of data as private, and vice versa. Likewise, a portion of the data may also be allocated as permissive where the data is not available to the general public but may be accessible to users of various groups, such as auditing committee members, law enforcement officers, government regulation personnel, medical staff, and the like. In other examples, blockchain 120 may include default rules to allocate portions of data as private, permissive, or public.

For example, blockchain 120 may determine that any driver's license number, RFID, Bluetooth® or NFC of parker, parking facility reserved parking space identifier, license plate number, VIN or social security number should be automatically set to private access. While several examples and embodiments included herein describe the main access levels to be categorized as private, permissive, or public, it should be understood that any number of access level categories may be recognized within the scope of the present disclosure. Moreover, the status of the access levels may automatically change or be updated based on detection of certain events. For example, all data regarding a deal may remain private for a period of time at which point the system may change the access level to public for some or all of the related data.

In a next operation, blockchain network 101 receives a request to view one or more data portions 150-155 of block entry 140 from a user which includes an access code associated with at least one access level (step 202). The request to view may be initiated by a user who is a party to the transaction stored in block entry 140, such as an operator of a parking facility receiving a data request from a customer or one participant in a gaming bet. The user may also be a user merely having interest in the business operations or transaction but not directly involved with the transaction, such as a driver looking for a convenient place to park, a tax auditor verifying income data, a transfer agent or third party financial custodian holdings stocks and bonds, a servicer that collects debt payments on behalf of a lender or a stockholder viewing recent company dividend transactions.

In a next operation, the access code is evaluated with the blockchain of block entries to identify one or more data portions associated with the access level (step 203). The access code may be designated to the user based on a user status, such as a government employee, package delivery employee, bank manager, parking garage customers and operators, etc. The access code may be determined based on an encrypted code (e.g., a private key or hash) given to user which is associated with an access level or data portion. The access code may further be validated based on a password, signature, fingerprint, barcode, processing chip, questionnaire, biometric, token, and any other method which may enable a user to verify authorization to access data portions 150-155 associated with an access level. In some example scenarios, data portions 150-155 may be separated into different blockchains or block entries based on their associated access level. In this scenario, access code 150 may be required to access the blockchain or block entry to view the portion of data associated with the access level.

In a final operation, a customized view of the block entry is generated which includes one or more data portions 150-155 associated with the access level (step 204). The customized view may be generated by a data access platform. The customized view may be modified to incorporate only those data portions associated with the validated access level or may include all data portions 150-155 with unauthorized data portions blacked out from the record view. The customized view may be surfaced in a blockchain application (e.g., a DApp) on a user device, transferred to a user in the form of a record message, or displayed in any other manner to a user or user group.

In accordance with various embodiments, the addition of data to the blockchain, security level screening, data categorization, access level assignments, auditing and/or other functionality may all be done autonomously. For example, as a vehicle enters a parking facility, sensors including receivers for Bluetooth® or other wireless signals, cameras or other imaging devices, and access control systems such as gates and access device readers collect data used for identifying the vehicle, a vehicle's condition, its driver, and possibly also its passengers. Meanwhile, sensors such as motion, weight, distance or proximity sensing devices collect data for monitoring an availability status (e.g., occupied vs. unoccupied) of parking spaces in the parking facility.

As another example, as a user enters a casino data can be collected added to the blockchain from various systems (e.g., surveillance cameras, parking garage cameras, loyalty card systems, room access systems, entertainment databases, and the like). Given the volume of data, artificial intelligence and/or machine learning engines (e.g., using support vector machines, artificial neural networks, Bayesian networks, supervised learning, unsupervised learning, and/or other techniques) can be used to identify, associate and classify relevant data that can be added to a blockchain. The data itself may be indexed for searching and/or future ingestion. In other embodiments, the data may be segmented and added to a profile of a player. Since various portions of the data can be assigned different access levels, the person requesting the data may be automatically served only the portions of data that are appropriate for their access level. Similarly, the data may be automatically reviewed or audited to identify violations (e.g., security or safety concerns, unsafe driving or other disfavored customer behavior in the parking facility, gambling rule violations, cheating, collusion, people banned from gambling, vehicles or people who are not permitted to enter or otherwise use the parking facility, etc.).

Similar to parking facility business operations and casino monitoring, various embodiments of the present technology can be applied to verticals that may enjoy benefits of the disclosed systems and methods that can record, track, analyze and review data automatically without humans overseeing the review for performing transactions and gathering and utilizing actionable intelligence to improve business operations and customer experiences. For example, some embodiments may interface with secure data sets (possible stored on a private blockchain) to gain biometrics or data about an individual. As such, government agencies (e.g., ICE or Department of Homeland Security) can provide data that can be used to identify individuals and make determinations whether they should be granted to access to particular data, activities, and/or locations. For example, various embodiments of the system may be used to screen individuals for a trusted traveler program. As the individual enters the airport, for example, surveillance cameras can collect video data which can be ingested by artificial intelligence or machine learning engines. This data can be linked with license plates, travel records, biometric data, and the like to initially identify the individual and determine if a violation is in progress, prescreen the person (e.g., for faster screening), or determine whether the user can be denied entry to the airplane or other travel method. In some embodiments, each person may have their driver's license scanned and the system can automatically classify the identification as legitimate or a fraud and search for records in the blockchain to assist in making decisions.

Figure 3:
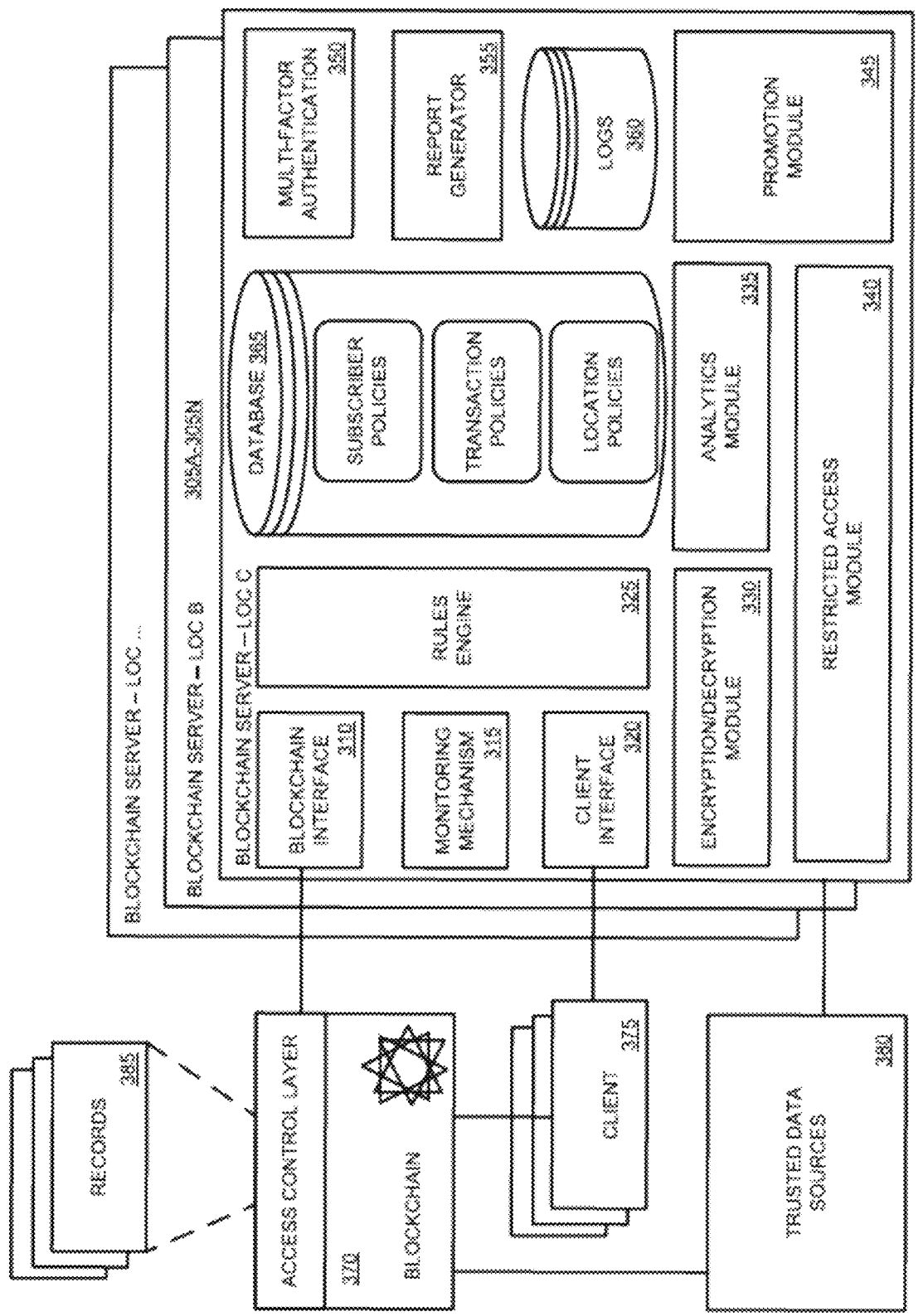
FIG. 3 illustrates various components of the distributed ledger architecture in an implementation to generate a customized view of restricted transactions recorded into a blockchain.

FIG. 3 illustrates various components of a blockchain data platform utilizing a distributed ledger architecture according to various embodiments of the present technology. As illustrated in FIG. 3, the blockchain data platform may use one or more servers 305A-305N. Each server can include blockchain interface 310, monitoring mechanism 315, client interface 320, rules engine 325, encryption/decryption module 330, analytics module 335, event module 340, multifactor authentication module 350, report generator 355, and/or databases 360 and/or 365 for storing logs, subscriber policies, transaction policies, location policies, and/or the like. In addition, blockchain servers 305A-205N can connect with blockchain 370, clients 375, trusted data sources 380, and/or records 385.

Each of these modules, components, or databases can be embodied as special-purpose hardware (e.g., one or more ASICS, PLDs, FPGAs, or the like), or as programmable circuitry (e.g., one or more microprocessors, microcontrollers, or the like) appropriately programmed with software and/or firmware, or as a combination of special purpose hardware and programmable circuitry. Other embodiments of the present technology may include some, all, or none of these modules and components along with other modules, applications, databases, and/or components. Still yet, some embodiments may incorporate two or more of these modules and components into a single module and/or associate a portion of the functionality of one or more of these modules with a different module. For example, in one embodiment, rules engine 325 and event module 340 can be combined into a single module for identifying and enforcing various rules and event policies on a user terminal.

Clients 375 may connect to one of blockchain servers 305A-305N using client interface 320. Clients 375 may be able to download (or have preinstalled) firmware or software from blockchain servers 305A-305N that allows clients 375 to enter and view block entries (or selected portions thereof). The block entries may comprise a variety of transactions (e.g., financial transactions, customer usage history and preferences of services in a parking garage, gaming bets, medical records, inventory tracking, etc.) and a variety of access levels (private, permissive, public, etc.). In some embodiments, blockchain servers 305A-305N process an encryption code to validate access to view the one or more portions of each transaction.

In some embodiments blockchain servers 305A-305N may maintain a pointer for each of the plurality of portions in the block entries indicating at least one published location for each of the plurality of portion in the block entries. The customized view of the block entry may then be generated by retrieving the portions associated with the access level using the pointer for each of the portions in the block entries. In other embodiments, blockchain servers 305A-305N may maintain a separate block entry for the data portions associated with each of the access levels. Blockchain servers 305A-305N may evaluate the access code in the request with the block entries of blockchain 370 to identify the data portions associated with the access level. In some scenarios, blockchain servers 305A-305N may maintain a separate blockchain for the data portions associated with each of the access levels. Blockchain servers 305A-305N may then evaluate the access code in the request with blockchain 370 to identify the data portions associated with the access level.

In some examples, information stored in blockchain 370 may be encrypted using encryption/decryption module 330. In some embodiments, encryption/decryption module 330 may use various non-homomorphic encryption and/or homomorphic encryption. While the non-homomorphic encryption may provide stronger security properties, the use of homomorphic encryption would allow computation on encoded data without decryption. As a result, various components of the parking facility and customers' vehicles, or of a gaming system, can interact and operate on portions of the data without exposure of sensitive data.

Monitoring mechanism 315 can monitor transactions and user activities. This can include receiving information from external sources. In the parking facility example, the external sources include people, devices, or systems, such as customers using smartphone apps for the parking facility, facility management and staff using various business information technology systems and client devices, receivers for Bluetooth® or other wireless signals, cameras or other imaging devices, and access control systems such as gates and access device readers collect data used for identifying the vehicle, its driver, and possibly also its driver and passengers. Additional external data sources in the parking facility case may include sensors such as motion, weight, distance or proximity sensing devices collect data for monitoring an availability status (e.g., occupied vs. unoccupied) of parking spaces in the parking facility. In the casino example, the external sources include people, device, or systems, such as, but not limited to, clients 375, video surveillance systems, loyalty card systems, key engines, biometric sensors, and other external systems. In some embodiments, multifactor authentication may be used before allowing a user to enter or to access a monetary transaction, parking reservations, payment methods for parking, parking history, vehicle, driver and passenger personally identifying information, medical record, gaming bet, inventory activity log, and the like.

For example, when a parking facility customer access a record of their credit/debit card, or checking, account for parking payments via a smartphone app, multifactor authentication module 350 may be used to required two different types of authentication (e.g., a password plus an alphanumeric code transmitted to the customer by text message or phone call to the phone number associated with their account registration data. As another example, when a patient accesses a medical record, multifactor authentication module 350 may be used to require various types of authentications (e.g., personal pin, biometric, token, etc.). Rules engine 325 can superimpose rules on the transaction interfaces being presented on clients 375. These rules can be based various policies (e.g., subscriber policies, transaction policies, location policies, etc.) stored in database 365. Analytics module 335 can generate various analytics about parking space usage trends, layers, clients, games, medical diagnosis, payrolls, package deliveries, payouts, accounts, and/or other system components or activity. This information can be used by report generator 355 to create customized view of the transactions.

Restricted access module 340 can be used to create customized access requirements for different portions of data in each transaction and for different users/user types. The rewards may be stored within blockchain 370 in records 385. The access requirements may be generated by a user entering the transaction, determined based on previously designated user preferences, or by policies required by other parties (e.g., permissive access for medical records required by the Health Insurance Portability and Accountability Act of 1996 (HIPAA), state laws for minimum age to gamble, etc.) and present customized view of records based on those access policies. Databases 360 and/or 365 can be used for storing logs, subscriber policies, transaction policies, location policies, and/or the like. These may be local stores of data retrieved from records 385 associated with blockchain 370. In addition, servers 305A-305N and blockchain 370 can connect with trusted data sources 380 for validation of external events (e.g., outcome of sporting events, reconciliation of vender/buyer journal entries, etc.) or information (e.g., an authorized driver other than the registered user of the parking facility who the registered user has authorized to use their parking account, or status of a security clearance) that are needed to determine data stored within records 385.

Figure 4:
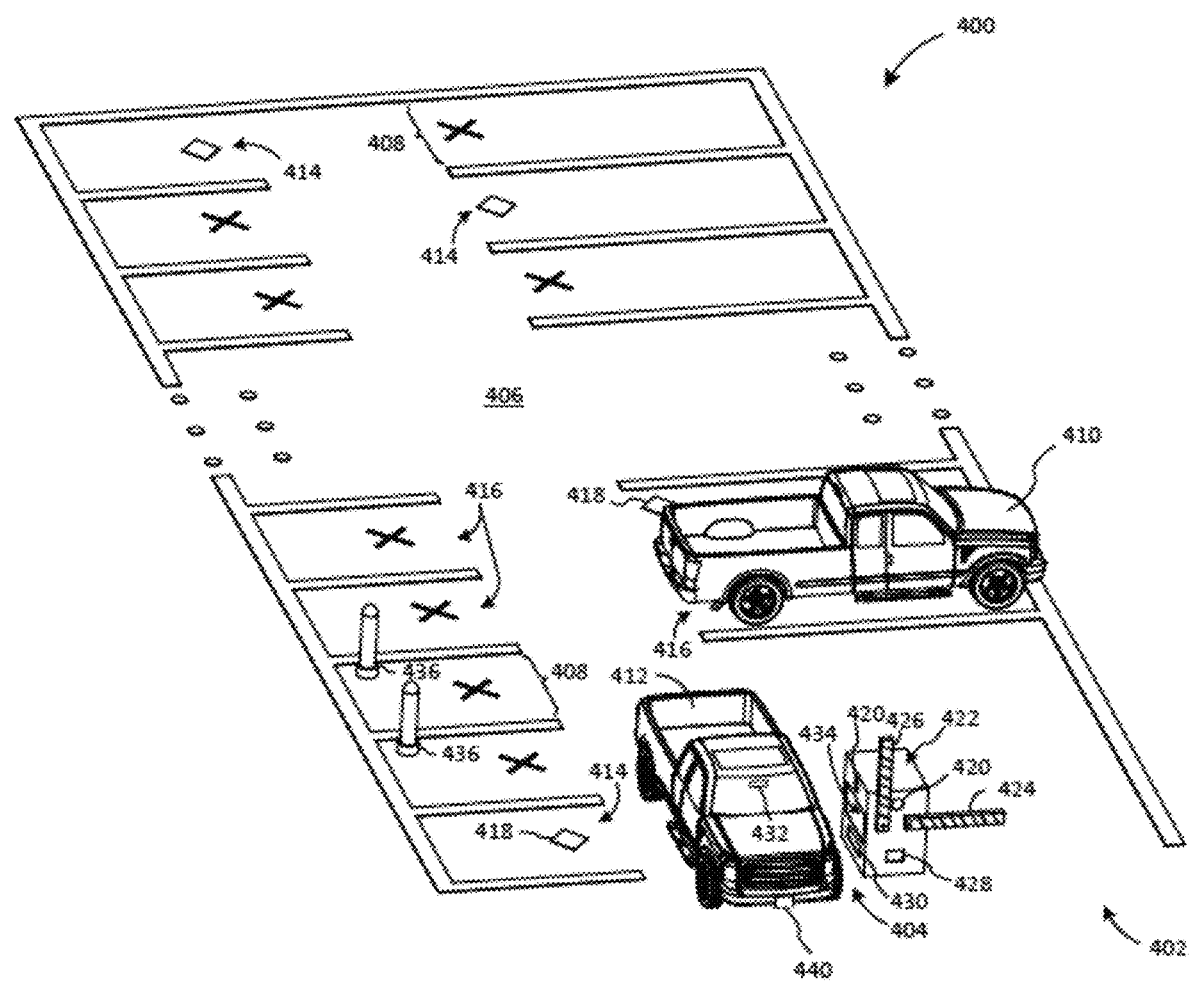
FIG. 4 illustrates a parking facility for which related business operations may be implemented at least in part using the disclosed systems and methods.

FIG. 4 illustrates a parking facility 400 for which related business operations may be implemented at least in part using the disclosed systems and methods. The parking facility 400 has at least one entrance 402 and at least one exit 404. An access control and payment portal console 422 is positioned at the entrance 402 and exit 404 of the parking facility 400. In some embodiments, the console 422 is divided into at least two separate and distinct structures. For example, a first console 422 for access control is positioned at the entrance 402 and a second console 422 for payment processing is positioned at the exit 404. In any event, the access control functionality of the console 422 may be accomplished, for instance, by automatically actuatable entry 424 and egress 426 gates.

Parking facility 400 contains a plurality of parking spaces 408 situated on a road surface 406. Each of the parking spaces 408 may be marked with a numerical, alphabetical or alphanumeric identifier, such as painted on the road surface 406 or marked on an adjacent wall, fence, or guardrail at or proximal the space 408. At any given time, at least a portion of the parking spaces 408 may be occupied by vehicles (e.g., a first vehicle 410). Spaces 408 that do not have a vehicle parked in them are naturally available for a customer to park their vehicle in. In an example, each space 408 of the plurality of spaces 408 includes a sensor 418 or other device for monitoring the status of each space 408 as either presently occupied or presently available in parking facility 400. In some embodiments, one of a plurality of such sensors 418 or other devices is positioned in facility 400 and configured to monitor the availability statuses of at least two spaces 408.

The sensors 418 may include proximity sensors positioned on the road surface 406 within the area defined by respective parking spaces 408 (e.g., in the center thereof). In some embodiments, the proximity sensors may be positioned on ramp, level, a ceiling, a wall, or other structure adjacent to a parking space 408. In any event, the sensors 418 or other devices for monitoring parking space 408 availability status are configured to continuously or periodically transmit data representative of whether or not a respective single space 408, or finite set (e.g., several) of spaces 408, are occupied by vehicle(s). As such, the data transmitted by the sensors 418 are further representative of and associated with the particular parking space 408 identifiers and their availability status. For instance, the first vehicle 410 is presently parked in a space 408, and at least several more vehicles are also parked in occupied spaces 416 (denoted by "X" in FIG. 4). Meanwhile, at least several spaces 408 are currently unoccupied by vehicles, as shown in FIG. 4 by the respective sensors 418 of available spaces 414 being visible on the road surface 406. Among these presently available spaces 414 is a space 408 from which a second vehicle 412 had recently departed to leave the parking facility 400.

A current or potential customer of the parking facility 400 may view an inventory of available parking spaces 414 prior to arriving at the parking facility 400. The data provided by the sensors 418 are recorded in the blockchain and may be communicated to users including customers, staff and management at or near real time so that informed decisions may be made in a timely manner. A customized view of the availability status of parking spaces 408 in the facility 400 may be provided to customers via a display of a personal computer, smartphone, or other suitable computing device. In some embodiments, the parking space 408 availability data may include statuses of one or more parking spaces regarding whether or not they may be reserved for use by customers at a later time on the same day as the inquiry, or at some later date. Thus, use of the disclosed systems and methods may be employed by parking system operators and their customers to facilitate related transactions and convenient experiences for hourly, daily, or monthly parking.

In addition to, or instead of, the parking space availability data provided by the sensors 418, customers may include their vehicle or personal identifying information with their account registration data for the smartphone app, for instance. Vehicle information may include license plate 440 number or vehicle identification number (VIN), while biometrics or personal information may include a portrait image of a driver or passenger associated with the parking account registration, or an ID number of a access device (e.g., key card or key fob) used for gaining entry to the parking facility 400.

The access control and payment console 422 may include one or more sensors or other devices for detecting or otherwise gathering one or both of the vehicle and personal identifying information. For example, the console 422 may include a radio frequency receiver 428 positioned in view of a portion of a vehicle upon which a corresponding radio frequency transmitter or transponder 432 is placed for use in the parking facility 400. The transmitter 432 is configured to transmit wireless signals encoding data that uniquely identifies the vehicle, or its owner or authorized user. The transmitter 432 may also take the form of a key fob or key card carried by a parking customer and manually positioned to be in view of the receiver 428 upon entering the parking facility 400. In either case, the receiver 428, like the aforementioned sensors 418, are external sources of parking business operations-related data that are recorded in the blockchain. The receiver 428 may relay these data to an intermediate transmitter or processor prior to their being recorded in the blockchain, or the receiver 428 may relay or otherwise transmit these data directly to computing and communication systems carrying out the recording of the data to the blockchain.

In another example, the console 422 includes a camera 420 or other imaging device positioned in view of a windshield or side window of a vehicle when the vehicle is positioned proximal the console 422. A still image or video stream acquired by the camera 420 may be transmitted to a local or remote computing system or server for image processing analysis. In cases where a parking customer has previously provider a portrait image as a part of the account registration data recorded on the blockchain, the image processing analysis may be used to determine the identity of an entering vehicle's driver or passenger by using one or more facial recognition techniques known to persons skilled in the art. Additionally, or instead, the camera 420 may be positioned on console 422 and configured to acquire an image of at least one of the entering vehicle's license plate 440, and VIN. Such image data may be transmitted to a local or remote computing system or server for image processing analysis by known letter and number character recognition techniques to determine the identity of the vehicle and the parking customer associated with it. In some embodiments, the image or video data acquired by camera 420 is used to determine the vehicle and customer identities using two or more of the portrait photographs, biometrics, mobile phone, the license plate 440 number, and the VIN. Basing the determination of vehicle and customer identities on sources other than, or in addition to, full or partial facial images may be advantageous to customers and parking facility 400 operators in cases where, for instance, the appearance of a customer's face changes over time as compared to the registration portrait image, as by natural aging, sun tanning or burning, wearing hats, wearing makeup, wearing wigs, wearing glasses, wearing colored contact lenses, wearing a scarf or mask, and growing facial hair.

To gain entry into the parking facility 400 by the vehicle, the data acquired by the receiver 428 and/or the camera 420 is validated against the customer account registration data recorded in the blockchain. Upon a successful validation process to verify that the customer and their vehicle area associated with a parking account in good standing, the entry gate 424 is automatically raised and any other access control device (e.g., a spiked rail capable of puncturing tires) is disengaged for a time sufficient to permit the vehicle to drive through the entrance 402 and onto the main parking area defined by the roadway surface 406. In a preferred implementation, the vehicle driver will receive a message while their vehicle is still stationary at the entrance 402 (e.g., just prior to the entry gate 424 being raised) informing them of the nearest available parking space 414, or another available parking space 414 determined according to their pre-recorded customer preference(s). In an example, a display or array of LED lamps on the console 420 positioned in view of the driver displays the respective identifier of the available space 414. In another example, the available space 414 identifier is read aloud from a speaker of the console 420 at a volume level sufficient to be heard by the driver through a closed glass window and accounting for typical background noise of the parking facility 400.

The time stamp including the time of day and the date of the entry of a vehicle may be recorded in the blockchain in association with the identity of the vehicle and/or the respective customer. The timestamp data facilitates determination of the parking rate to be charged and collected from the customer upon their exit from the parking facility. In use cases including subscription parking use of the parking facility 400 (e.g., weekly or monthly), recording the timestamp data in the blockchain facilitates trending and analysis of usage data by customers and operators, as desired.

The disclosed systems and methods likewise facilitate improved parking facility 400 business operations and customer experiences during the course of vehicles (e.g., second vehicle 412) exiting the facility 400. Receiver 428, transmitter 432, and camera 420 may each be used individually or any combination, as described above, to identify the vehicle or the customer at or on approach to the console 422 prior to reaching the exit 404 and leaving the parking facility 400. Upon determining the vehicle or customer identity, these data are recorded in the blockchain along with their associated timestamp. In the case of a prepaid subscription parking account plan, upon determining and validating the vehicle 412 or its associated customer, the egress gate 426 is automatically raised and any other access control device (e.g., a spiked rail capable of puncturing tires) is disengaged for a time sufficient to permit the vehicle to drive through the exit 402 and out of parking facility 400. In that case, no payment processing needs to be performed since the account is under a prepaid parking subscription. However, in the case of non-subscription accounts, the aforementioned identification and validation of the vehicle and customer identities must be performed prior to payment processing.

To improve business operations and customer experiences associated with exiting the parking facility 400 in cases requiring payment processing (e.g., hourly or daily parking) the data acquired by at least one of the receiver 428, and the camera 420, may be again recorded in the blockchain and used for automatic, fast and secure payment processing according to the parking rate, the entry and egress timestamps, and the customer payment information (e.g., credit/debit card account, digital wallet, or cryptocurrency wallet), each of which are also recorded in the blockchain. Thus, in such cases, the egress gate 426 is raised automatically and any other access control device is disengaged from a time sufficient to permit the vehicle to drive through the exit 402 and out of the parking facility 400 upon the identification and validation of the vehicle and the associated customer, along with successful completion of the payment due. In some embodiments, the console 422 may include devices and subsystems for accepting manual payments using cash, credit/debit cards, or digital wallets for real- or cryptocurrency via revenue control equipment or a mobile or Application or Dapp. In an example, console 422 includes a payment acceptance device 430 such as a credit/debit reader or a cash/coin counter and a display device 434 positioned in reach of a driver of vehicle 412 stopped before the egress gate 426. For instance, a customer without a pre-registered account with the parking facility 400 may still deliver payment for parking in order to exit the facility 400. Even for such non-registered customers, business operations and customer experiences may be improved by the disclosed systems and methods utilizing the blockchain by, for instance, enabling driver or vehicle identifications, automatically computing elapsed times for rate determination based on data acquired by cameras 420, and displaying the pertinent payment instructions and other useful information to the driver on the display device 434. Cameras 420 can also be used to capture images of a vehicle begore it enters a facility 400 to ascertain if there is any pre-existing damage on the vehicle, which would enable facility operators to avoid liability for property damage claims where there was preexisting damage on the vehicle.

Revenue control equipment in parking facility 400 may include the aforementioned console 422 and associated devices and subsystems such as camera(s) 420, receiver(s) 428 and sensors 418. Additionally, or instead, parking facility 400 revenue control equipment may include kiosks with credit card/bill accepters/mobile payment capability to run and allow people to enter/exit. Kiosk(s) may be integrated into console 422, or they may be standalone devices positioned at various other convenient locations in facility 400. Revenue control controls ticketing, access control, access cards, rates, taxes, statistics and analytics, performance, parking controls (access gates, e.g., 424, 426), auditing functions, web and mobile payment interfaces, printers, and the like.

In some embodiments, a customer of parking facility 400 embodied in, or including, an autonomous vehicle may be guided by additional facility 400 subsystems such that these vehicles may safely park themselves upon entry and likewise return to a designated location prior to or after exiting facility 400. In the illustrated embodiment of FIG. 4, the sensors 418 include beacons for transmitting a homing signal to a corresponding receiver in an autonomous vehicle. The beacon signal is paired to the receiver in the vehicle and is generated upon completion of the parking transaction that enabled the autonomous vehicle to enter facility 400 and have an available space 408 assigned to it. Autonomous vehicles may also include transponders or other devices providing vehicle identification that allows access control and is unique to that car, company, owner of vehicle etc. In the autonomous vehicle user case, the means for identifying the autonomous vehicle may be one or more of a transmitter, transponder, license plate 440 recognition, license plate 440 identity, and the like, enabling entry and exit without human involvement. In one example, in the case of non-subscription parking accounts, the aforementioned identification and validation of the vehicle and customer identities may be performed prior to payment processing.

In some embodiments, one or more spaces 408 of parking facility 400 includes an electric vehicle charging station 436. Charging station 436 may be configured for either or both of wired and wireless charging of electric vehicles. The charging station(s) 436 may include devices and subsystems for identifying the vehicle or customer utilizing the charging station 436 in the space 408 being occupied by the respective vehicle. In an example, a registered customer having a transmitter 432 in or on their vehicle may be used to associate charging usage statistics (e.g., time on/off or charging energy delivered to the electric vehicle) with the customer's account with the parking facility 400. These charging station 436-related data may be recorded in the blockchain and the payment due for use of the charging station 436 may be automatically determined and deducted from the customer's payment credentials recorded in the blockchain. This payment process for ancillary services like electric vehicle charging, and the like, may be initiated and completed upon completion of use of the charging station 436 or added to the above-described processes for completing payment prior to exiting the parking facility 400. A person of ordinary skill in the art may readily contemplate how ancillary services other than use of charging stations 436 (e.g., windshield and other vehicle maintenance/repair services, car washing, detailing, dry cleaner, pet boarding etc.) may similar benefit in terms of business operational efficiency and customer experience improvements according to the disclosed systems and methods.

Convenience and efficiency for parking operations, as well as for such ancillary services, is further enhanced by application of the disclosed systems and methods by way of associating vehicle and their owners with parking spaces and any selected other services and storing the information in association with transaction data on the blockchain. These data are readily available to customers and operators via the customized views. As described above, identity management is facilitated by collection and storage on the blockchain of data such as license plate 440 recognition, license plate 440 identity, and using cameras 420, sensors 418, transmitters 432, beacons, transponders, Bluetooth, NFC and the like.

In some embodiments, parking facilities 400 may provide their customers with a membership program for signing up to upon making parking reservations, conducting transactions, subscribing to a period parking program, and the like, according to the disclosed systems and methods. The blockchain and customized view of the present technology may be used to facilitate a rewards program for members. In the parking business context, rewards that may be provided to customers that attain certain milestones like time as members or dollars spent include for example, and without limitation, free carwashes, free days of parking or other perks. The rewards would also be associated with the respective customers and recorded and tracked on a blockchain. Rewards may be available for companies or individuals. Such rewards programs may function for the benefit of customers and parking facility operators in an analogous manner as with airline mileage programs.

Figure 5:
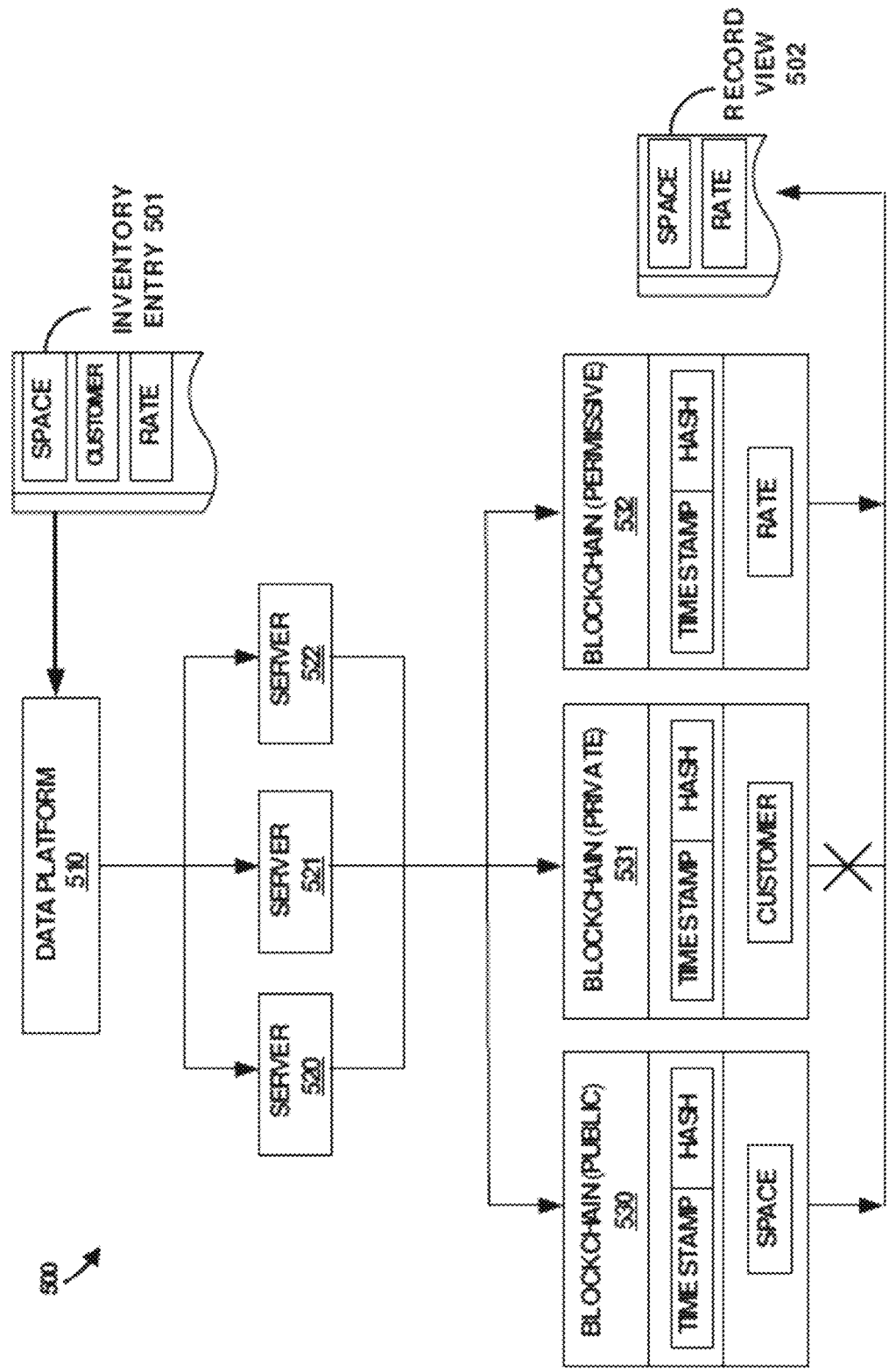
FIG. 5 illustrates a block diagram in an implementation of an enhanced application to generate a customized view of restricted transactions recorded into a blockchain.

FIG. 5 illustrates block diagram 500 in an implementation of an enhanced application to generate a customized view of restricted transactions recorded into a blockchain for parking facility business operations and transactions including payment processing. Block diagram 500 includes inventory block entry 501, data platform 510, servers 520-522, blockchains 530-532, and record 502.

Block entry 501 is representative of any data transaction that will be permanently recorded into the blockchain, such as those data received and recorded from customers, connected devices, parking facility 400, operators and staff, and external sources (e.g., sensors 418, receivers 428, and cameras 420). Block entry 501 is subsequently processed by miners and added to a block at the end of the blockchain by data platform 510. Block entry 501 further comprises portions of data which have been represented herein by Parking Space, Parking Facility Customer, and Parking Rate. Parking Space maintains the inventory, and availability status, of parking spaces 408 in parking facility 400. Parking Facility Customer includes data relating to the identifiers of the vehicle, driver(s) and possibly also passenger(s) associated with the customer, along with their account- and payment-related data. Parking Rate includes data specifying the cost to parking in the parking facility 400, including on an hourly, weekly, or monthly basis. It should be noted that while each of the data portions is represented separately, the portions of data are part of one transaction represented by block entry 501. Block entry 501 may comprise any transaction or contract which has been executed and recorded in a distributed ledger platform environment for purposes of conducting parking facility 400 operations. In this example, block entry 501 may comprise an order, reservation, or spontaneous purchase request by a customer for use of a parking space in the parking facility. In some embodiments, a token may alternatively or instead comprise one or more of an order, reservation, or spontaneous purchase request by a customer for use of a parking space in the parking facility.

Data platform 510 represents any computing system or systems capable of hosting a blockchain application, of which controller 2800 in FIG. 28 is representative. Data platform 510 provides a secure distributed ledger system for recording parking transactions and parking space availability statuses into the blockchains. Data platform 510 may be implemented across a multitude of distributed network nodes which may be accessed by a variety of users, such as tax auditors, financial institutions, regulatory authorities, customers, company employees, parking facility 400 owners, parking auditors, management and staff, marketing companies, advertisers and the like.

Data platform 510 can also include servers 520-522. Servers 520-522 may be representative of any computing system or systems with which the distributed network nodes may communicate. Examples include other devices having corresponding applications or services installed thereon, such that an operating user of a user device may be able to transfer a transaction to be added to a blockchain and distributed amongst the network nodes of the distributed network. Examples include media servers, web servers, and other types of end-points that may transmit transaction data to or receive transaction data from user devices and network nodes using communication protocols including for example, and without limitation, 5G, WIFI, NFC, miracast, among others. The aforementioned sensors and access control or payment processing devices and systems may automatically transfer transaction- or business operational data to the network nodes, as described above with reference to FIGS. 3 and 4. In some embodiments, data platform 510 can dynamically select which servers 520-522 are authorized to store the data. For example, companies or governments may have geographical restrictions, encryption standards, network security standards, or other restrictions on the server nodes on which the blockchain is stored. Data platform 510 can therefore manage the logistics of dynamically selected servers based on these restrictions. For example, if a particular server is deemed to be under attack or hacked, then data platform 510 can dynamically remove that server from the blockchain network and consider adding one or more additional servers if needed. As such, each owner of the data can set selection criteria for where the data should be stored and the minimum IT standards needed for that server group.

Block diagram 500 further includes blockchains 530-532. Blockchains 530-532 can contain a continuously growing list of records, called blocks, which are linked and secured using cryptography. Each of the block in blockchains 530-532 contains a timestamp and a hash. The hash includes both a cryptographic hash of the current block and a cryptographic hash of the previous block in the blockchain. Each block also contains data associated with a block entry. In this example scenario, each portion of data (Space, Customer, and Rate) have been separately recorded into a different block and in a separate blockchain 530-532.

Additionally, each of blockchains 530-532 is associated with a separate access level. For example, blockchain 530 is a public access blockchain which allows any user interacting with the distributed ledger to view the blocks and data portions stored within each block. A public user may be any user interested in viewing parking spaces in one or more parking facilities that are available for the transaction in blockchain 530 and no privacy exists for this portion of data. Conversely, blockchain 531 is a private blockchain which data portions may only be accessed and viewed by authorized users, such as internal company personnel. In this example scenario, Customer has been separately stored on blockchain 531 and is private from all users interacting in the blockchain network except those with exclusive access to the data, such as managers within a company initiating the transaction. Blockchain 532 is a permissive blockchain meaning that a limited set of parties may view the data portions recorded in the block but not all users. Rate has been stored within blockchain 532 and may be view by parties who are allowed access to the data, such as auditors or controllers.

Record 502 is illustrative of what a user may view when requesting to view the transaction data stored in block entry 501. Record 502 may contain all or none of the data portions originally entered in block entry 501 and is generated based on the authorization provided by the requesting user and access level each portion of data is associated with.

Figure 6:
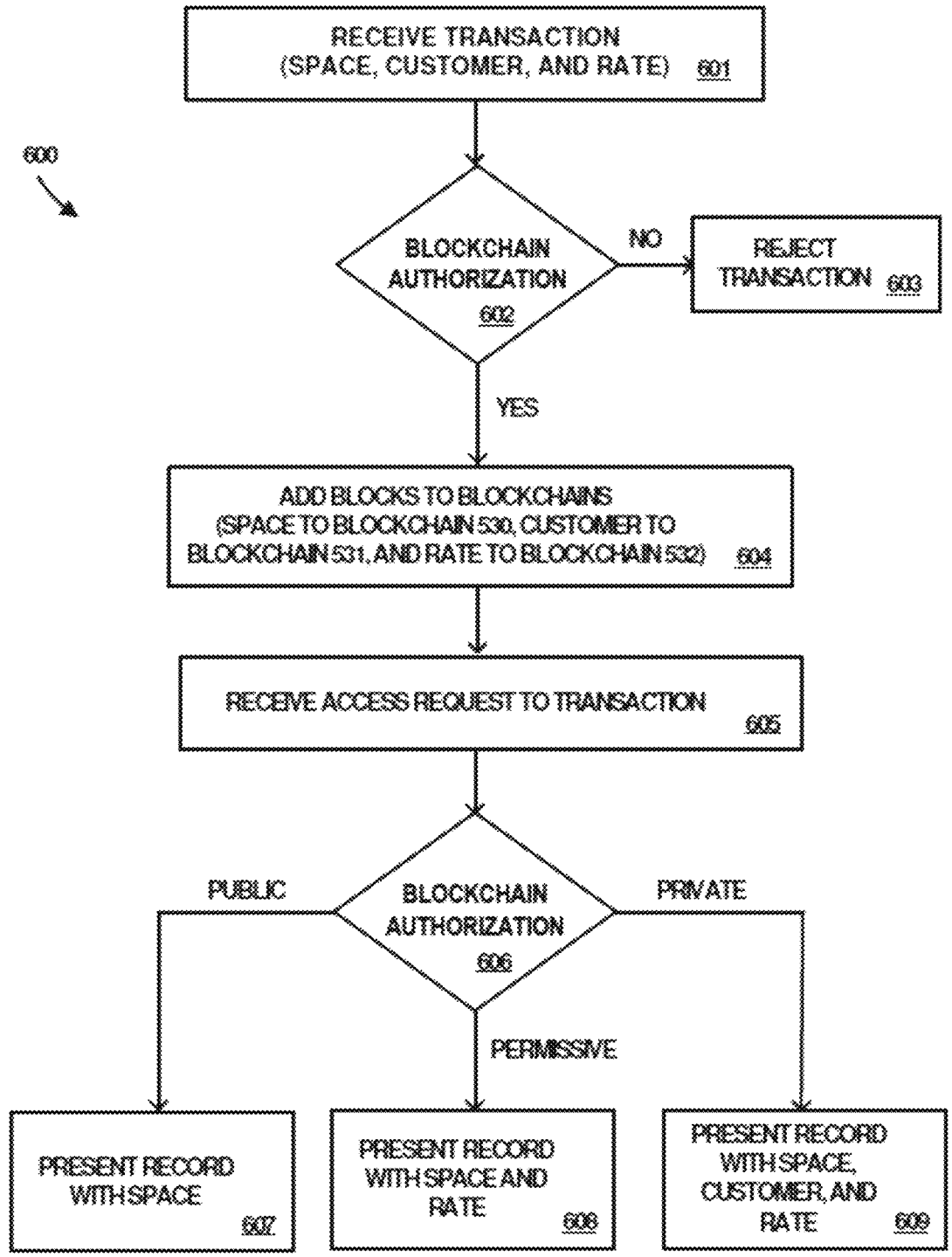
FIG. 6 illustrates a flow diagram in an implementation of an enhanced application to generate a customized view of restricted transactions recorded into a blockchain.

FIG. 6 illustrates a flow diagram in an implementation to generate a customized view of restricted transactions recorded into a blockchain for parking facility 400 business operations and customer usage. Some or all of the steps of view customization process 600 may be implemented in program instructions in the context of a component or components of the application used to carry out the customized view feature.

In operation, data platform 510 receives block entry 501 which is to be maintained in blocks of blockchains 530-532 (step 601). Block entry 501 is requested by a user from a user device in the distributed network of nodes and contains the data portions. Data platform 510 then authorizes the entry (e.g., miners validate the hash in the block) (step 602). If the block is not validated, the transaction (block entry 501) is rejected (step 603). However, if the block is accepted, each of the portions of data is evaluated for an access level and added to a block in each of blockchains 530-532 based on the identified access level (step 604).

In a next operation, data platform 510 receives a request to view one or more data portions of a block entry wherein the request comprises an access code associated with at least one access level (step 605). The access code may be associated with a public, permissive, or private access level. Data platform 510 then evaluates the access code in the request with each of blockchains 530-532 maintaining each of the separate block records for each of the data portions (step 606). If the access code associated with the requesting user is determined to be public, a customized view (e.g., record 502) will be generated for the requesting user indicating only Space from block entry 501 (step 607). If the access code associated with the requesting user is determined to be permissive, a customized view will be generated for the requesting user indicating Space and Rate from block entry 501 (step 608). If the access code associated with the requesting user is determined to be private, a customized view will be generated for the requesting user indicating all portions of the data from block entry 501 (i.e., Space, Customer, and Rate) (step 609).

In some embodiments, block entry 501 further records additional data related to the parking facility transaction such as locations from where the customer initiated the transaction and the involved parking facility 400, time and date stamps for transactions and vehicle entry and exit from facility 400, and photos and/or videos of the vehicle entering, exiting, and moving about the facility 400. In an example, in addition to being stored in block entry 501, such imaging may include live streaming to a security monitoring station positioned at or remote from parking facility 400. Additionally, or instead, cameras may monitor motion of vehicles in parking facility 400 as a security measure and store these data in block entry 501 and/or elsewhere as a security measure in a garage or parking facility/lot. These imaging systems for security purposes may be integrated in, or co-positioned with, sensors 418. For example, a motion monitoring and imaging security protocol may be initiated in cases where a parked vehicle exhibits motion outside of the expected timeframe of the parking facility 400 stay of the vehicle.

Figure 7:
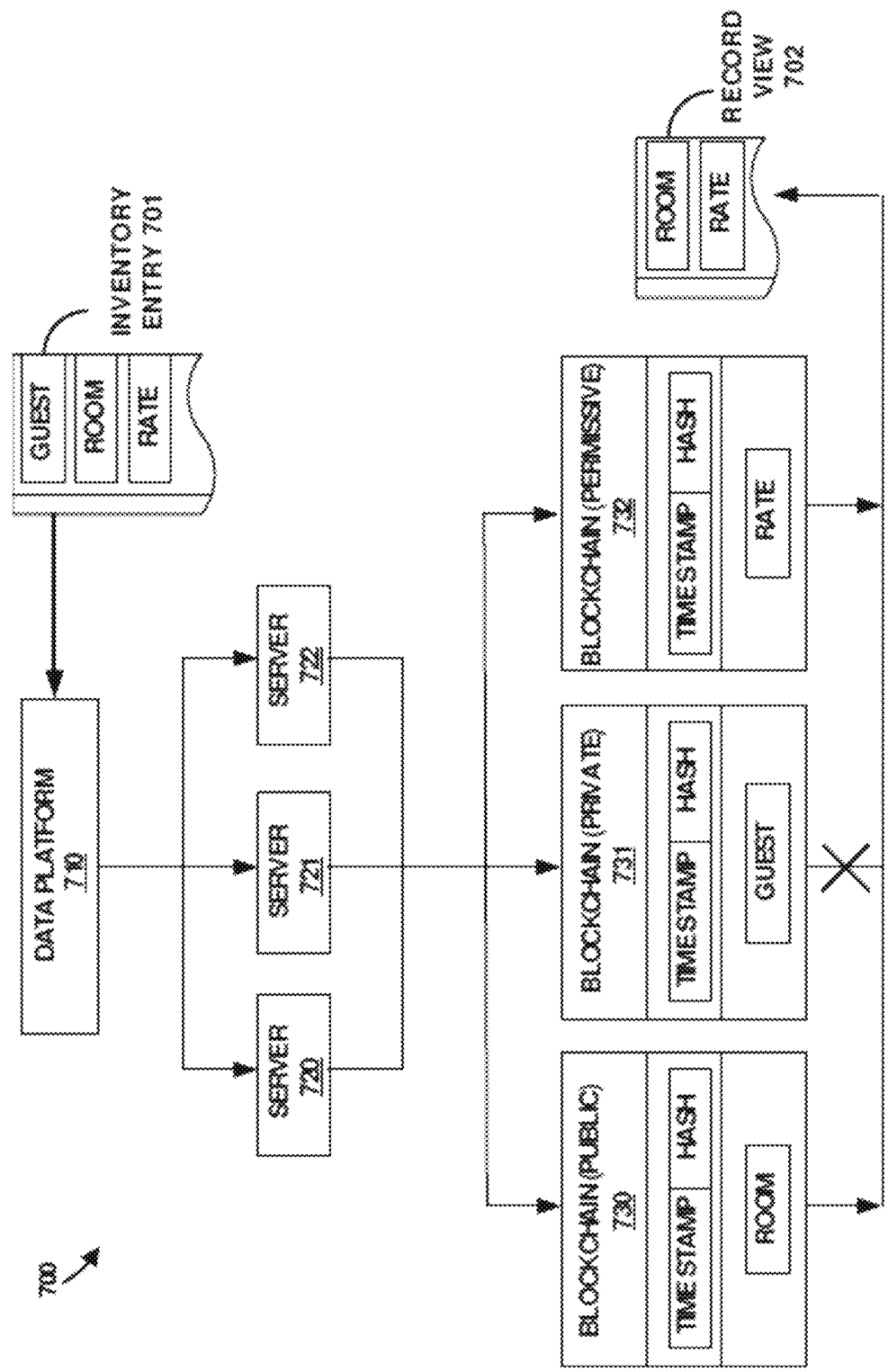
FIG. 7 illustrates a block diagram in an implementation of an enhanced application to generate a customized view of restricted transactions recorded into a blockchain.

FIG. 7 illustrates block diagram 700 in an implementation of an enhanced application to generate a customized view of restricted transactions recorded into a blockchain for hotel business operations and transactions including payment processing. Block diagram 700 includes inventory block entry 701, data platform 710, servers 720-722, blockchains 730-732, and record 702.

Block entry 701 is representative of any data transaction that will be permanently recorded into the blockchain, such as those data received and recorded from hotel guests, connected devices, hotel, operators and staff, and external sources (e.g., key card readers, loyalty cards, and the like). Block entry 701 is subsequently processed by miners and added to a block at the end of the blockchain by data platform 710. Block entry 701 further comprises portions of data which have been represented herein by Hotel Room, Hotel Guest, and Room Rate. Hotel Room maintains the inventory, and availability status, of hotel rooms in hotel. Hotel Guest includes data relating to the identifiers of the guest under whose name hotel room is registered and possibly also other guests associated with the registered guest, along with their account- and payment-related data. Room Rate includes data specifying the cost to staying in the hotel room, including on a nightly basis. It should be noted that while each of the data portions is represented separately, the portions of data are part of one transaction represented by block entry 701. Block entry 701 may comprise any transaction or contract which has been executed and recorded in a distributed ledger platform environment for purposes of conducting hotel operations. In this example, block entry 701 may comprise an order, reservation, or spontaneous purchase request by a guest for use of a hotel room or related goods and services in the hotel. In some embodiments, a token may alternatively or instead comprise one or more of an order, reservation, or spontaneous purchase request by a guest for use of a hotel room or related goods or services in the hotel.

Data platform 710 represents any computing system or systems capable of hosting a blockchain application, of which controller 2800 in FIG. 28 is representative. Data platform 710 provides a secure distributed ledger system for recording hotel transactions and room availability statuses into the blockchains. Data platform 710 may be implemented across a multitude of distributed network nodes which may be accessed by a variety of users, such as tax auditors, financial institutions, regulatory authorities, guests and other hotel customers, hotel employees, hotel owners, hotel auditors, management and staff, marketing companies, advertisers and the like.

Data platform 710 can also include servers 720-722. Servers 720-722 may be representative of any computing system or systems with which the distributed network nodes may communicate. Examples include other devices having corresponding applications or services installed thereon, such that an operating user of a user device may be able to transfer a transaction to be added to a blockchain and distributed amongst the network nodes of the distributed network. Examples include media servers, web servers, and other types of end-points that may transmit transaction data to or receive transaction data from user devices and network nodes using communication protocols including for example, and without limitation, 5G, WIFI, NFC, miracast, among others. Hotel room key card readers, loyalty card receivers, and other useful devices and subsystems including sensors and access control or payment processing devices and systems may automatically transfer transaction- or business operational data to the network nodes, as described above with reference to FIG. 3. In some embodiments, data platform 710 can dynamically select which servers 720-722 are authorized to store the data. For example, companies or governments may have geographical restrictions, encryption standards, network security standards, or other restrictions on the server nodes on which the blockchain is stored. Data platform 710 can therefore manage the logistics of dynamically selected servers based on these restrictions. For example, if a particular server is deemed to be under attack or hacked, then data platform 710 can dynamically remove that server from the blockchain network and consider adding one or more additional servers if needed. As such, each owner of the data can set selection criteria for where the data should be stored, and the minimum IT standards needed for that server group.

Block diagram 700 further includes blockchains 730-732. Blockchains 730-732 can contain a continuously growing list of records, called blocks, which are linked and secured using cryptography. Each of the block in blockchains 730-732 contains a timestamp and a hash. The hash includes both a cryptographic hash of the current block and a cryptographic hash of the previous block in the blockchain. Each block also contains data associated with a block entry. In this example scenario, each portion of data (Room, Guest, and Rate) have been separately recorded into a different block and in a separate blockchain 730-732.

Additionally, each of blockchains 730-732 is associated with a separate access level. For example, blockchain 730 is a public access blockchain which allows any user interacting with the distributed ledger to view the blocks and data portions stored within each block. A public user may be any user interested in viewing hotel rooms in one or more hotels that are available for the transaction in blockchain 730 and no privacy exists for this portion of data. Conversely, blockchain 731 is a private blockchain which data portions may only be accessed and viewed by authorized users, such as internal company personnel. In this example scenario, Guest has been separately stored on blockchain 731 and is private from all users interacting in the blockchain network except those with exclusive access to the data, such as managers within a company initiating the transaction. Blockchain 732 is a permissive blockchain meaning that a limited set of parties may view the data portions recorded in the block but not all users. Rate has been stored within blockchain 732 and may be view by parties who are allowed access to the data, such as auditors or controllers.

Record 702 is illustrative of what a user may view when requesting to view the transaction data stored in block entry 701. Record 702 may contain all or none of the data portions originally entered in block entry 701 and is generated based on the authorization provided by the requesting user and access level each portion of data is associated with.

Figure 8:
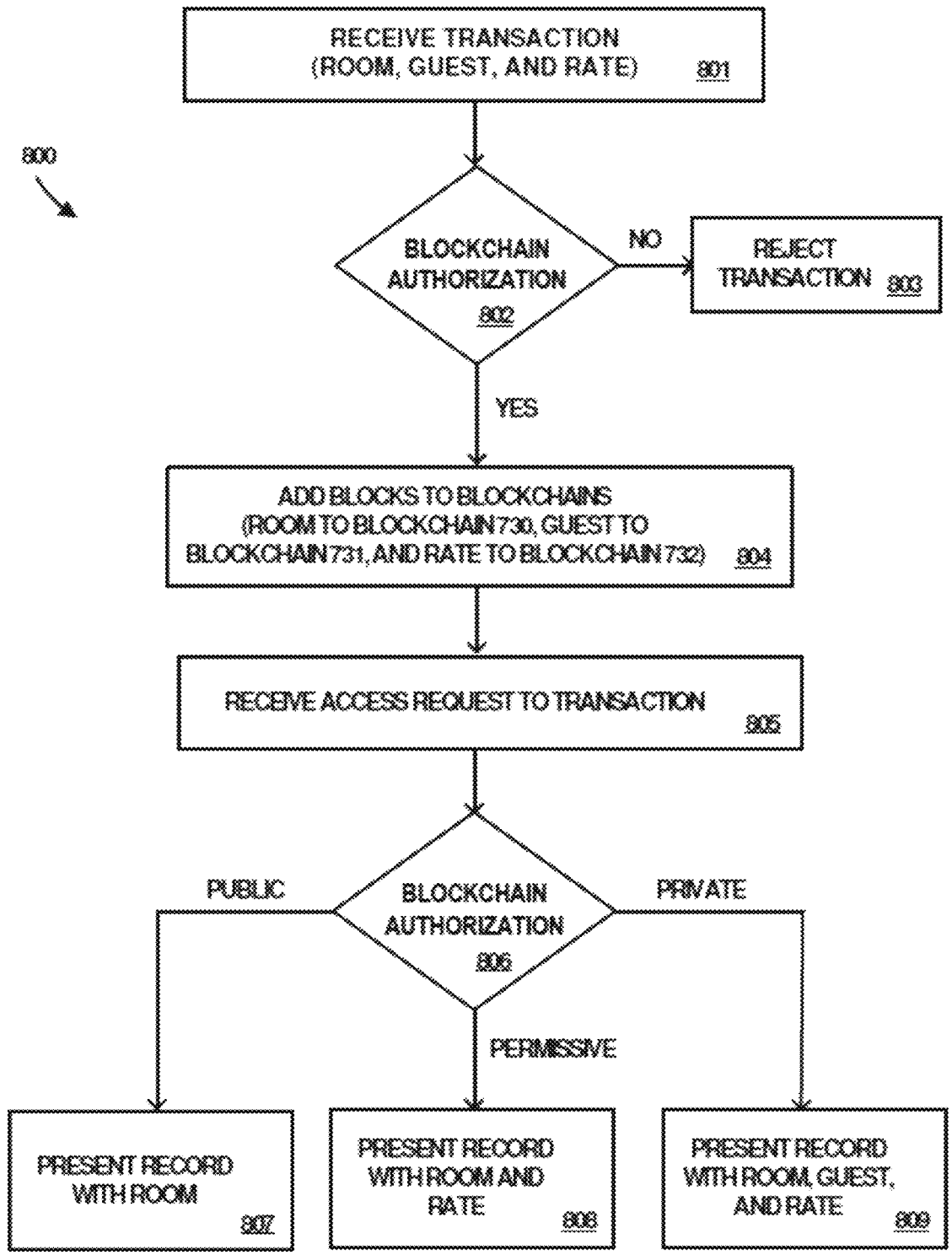
FIG. 8 illustrates a flow diagram in an implementation of an enhanced application to generate a customized view of restricted transactions recorded into a blockchain.

FIG. 8 illustrates a flow diagram in an implementation to generate a customized view of restricted transactions recorded into a blockchain for hotel business operations and guest usage. Some or all of the steps of view customization process 800 may be implemented in program instructions in the context of a component or components of the application used to carry out the customized view feature.

In operation, data platform 710 receives block entry 701 which is to be maintained in blocks of blockchains 730-732 (step 801). Block entry 701 is requested by a user from a user device in the distributed network of nodes and contains the data portions. Data platform 710 then authorizes the entry (e.g., miners validate the hash in the block) (step 802). If the block is not validated, the transaction (block entry 701) is rejected (step 803). However, if the block is accepted, each of the portions of data is evaluated for an access level and added to a block in each of blockchains 730-732 based on the identified access level (step 804).

In a next operation, data platform 710 receives a request to view one or more data portions of a block entry wherein the request comprises an access code associated with at least one access level (step 805). The access code may be associated with a public, permissive, or private access level. Data platform 710 then evaluates the access code in the request with each of blockchains 730-732 maintaining each of the separate block records for each of the data portions (step 806). If the access code associated with the requesting user is determined to be public, a customized view (e.g., record 702) will be generated for the requesting user indicating only Room from block entry 701 (step 807). If the access code associated with the requesting user is determined to be permissive, a customized view will be generated for the requesting user indicating Room and Rate from block entry 701 (step 808). If the access code associated with the requesting user is determined to be private, a customized view will be generated for the requesting user indicating all portions of the data from block entry 701 (i.e., Room, Guest, and Rate) (step 809).

In some embodiments, block entry 701 further records additional data related to the hotel room transaction such as locations from where the customer initiated the transaction and the involved hotel building, time and date stamps for transactions and guest(s) and/or their vehicle(s) entering and exiting hotel, and photos and/or videos of guest(s) and or their vehicle(s) entering, exiting, and moving about the hotel. In an example, in addition to being stored in block entry 701, such imaging may include live streaming to a security monitoring station positioned at or remote from the hotel building. Additionally, or instead, cameras may monitor motion of guest(s) and/or their vehicle(s) in and around hotel as a security measure and store these data in block entry 701 and/or elsewhere as a security measure for the benefit of guests and hotel staff members. These imaging systems for security purposes may be integrated in or co-positioned with devices such as room key readers and entry and exit ways of parking, pool, fitness, casino, and other facilities of the hotel. For example, a motion monitoring and imaging security protocol may be initiated in cases where a person other than a registered guest attempts to gain entry to a guest room or other area of hotel that is intended for use only by registered hotel guests.

Figure 9:
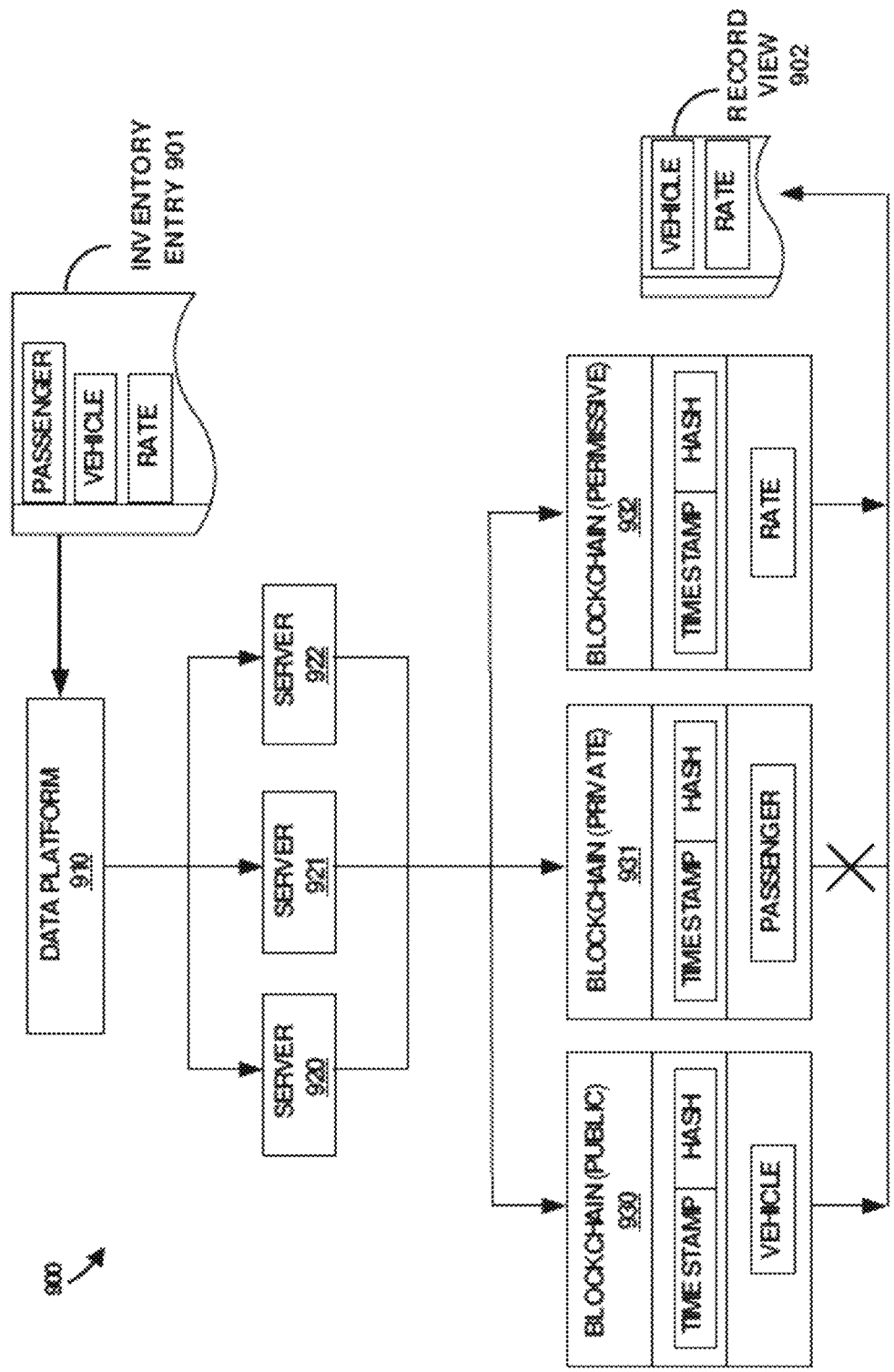
FIG. 9 illustrates a block diagram in an implementation of an enhanced application to generate a customized view of restricted transactions recorded into a blockchain.

FIG. 9 illustrates block diagram 900 in an implementation of an enhanced application to generate a customized view of restricted transactions recorded into a blockchain for autonomous vehicle fleet business operations and transactions including payment processing. Block diagram 900 includes inventory block entry 901, data platform 910, servers 920-922, blockchains 930-932, and record 902.

Block entry 901 is representative of any data transaction that will be permanently recorded into the blockchain, such as those data received and recorded from passengers requesting a ride, connected devices, autonomous vehicle fleet managers and staff, and external sources (e.g., GPS transceivers, key fobs, loyalty cards, and the like). Block entry 901 is subsequently processed by miners and added to a block at the end of the blockchain by data platform 910. Block entry 901 further comprises portions of data which have been represented herein by Vehicle ID, Passenger, and Ride Price or Rate. Vehicle ID maintains the inventory, and availability status, of autonomous vehicles in a geographical area. Passenger includes data relating to the identifiers of the passenger under whose name an identified autonomous vehicle is requested, along with their account- and payment-related data. In some embodiments, Passenger further includes data to identify the requested destination of the passenger. Rate includes data specifying the cost of utilizing the autonomous vehicle by the passenger. In some embodiments, the rate to be charged is based on the mileage from a current location of passenger to the requested destination. It should be noted that while each of the data portions is represented separately, the portions of data are part of one transaction represented by block entry 901. Block entry 901 may comprise any transaction or contract which has been executed and recorded in a distributed ledger platform environment for purposes of conducting autonomous vehicle fleet operations. In this example, block entry 901 may comprise an order, reservation, or spontaneous ride hailing request by a passenger for use of an autonomous vehicle or related services of the autonomous vehicle fleet operator. In some embodiments, a token may alternatively or instead comprise one or more of an order, reservation, or spontaneous ride hailing request by a passenger for use of an autonomous vehicle or related services of the autonomous vehicle fleet operator.

Data platform 910 represents any computing system or systems capable of hosting a blockchain application, of which controller 2800 in FIG. 28 is representative. Data platform 910 provides a secure distributed ledger system for recording autonomous vehicle fleet transactions along with autonomous vehicle locations and availability statuses into the blockchains. Data platform 910 may be implemented across a multitude of distributed network nodes which may be accessed by a variety of users, such as tax auditors, financial institutions, regulatory authorities, passengers and other autonomous vehicle fleet customers or service providers, fleet employees, fleet owners, fleet auditors, management and staff, marketing companies, advertisers and the like.

Data platform 910 can also include servers 920-922. Servers 920-922 may be representative of any computing system or systems with which the distributed network nodes may communicate. Examples include other devices having corresponding applications or services installed thereon, such that an operating user of a user device may be able to transfer a transaction to be added to a blockchain and distributed amongst the network nodes of the distributed network. Examples include media servers, web servers, and other types of end-points that may transmit transaction data to or receive transaction data from user devices and network nodes using communication protocols including for example, and without limitation, 5G, WIFI, NFC, miracast, among others. Vehicle key fobs, key card readers, loyalty card receivers, and other useful devices and subsystems including locational (e.g., GPS) sensors and access control or payment processing devices and systems may automatically transfer transaction- or business operational data to the network nodes, as described above with reference to FIG. 3.

In some embodiments, data platform 910 can dynamically select which servers 920-922 are authorized to store the data. For example, companies or governments may have geographical restrictions, encryption standards, network security standards, or other restrictions on the server nodes on which the blockchain is stored. Data platform 910 can therefore manage the logistics of dynamically selected servers based on these restrictions. For example, if a particular server is deemed to be under attack or hacked, then data platform 910 can dynamically remove that server from the blockchain network and consider adding one or more additional servers if needed. As such, each owner of the data can set selection criteria for where the data should be stored, and the minimum IT standards needed for that server group.

Block diagram 900 further includes blockchains 930-932. Blockchains 930-932 can contain a continuously growing list of records, called blocks, which are linked and secured using cryptography. Each of the block in blockchains 930-932 contains a timestamp and a hash. The hash includes both a cryptographic hash of the current block and a cryptographic hash of the previous block in the blockchain. Each block also contains data associated with a block entry. In this example scenario, each portion of data (Vehicle, Passenger, and Rate) have been separately recorded into a different block and in a separate blockchain 930-932.

Additionally, each of blockchains 930-932 is associated with a separate access level. For example, blockchain 930 is a public access blockchain which allows any user interacting with the distributed ledger to view the blocks and data portions stored within each block. For instance, a public user may be any user interested in viewing current locations of autonomous vehicles in the fleet currently available for ride hailing, along with any use restrictions particular vehicles may have at any point in time, that are available for the transaction in blockchain 930 and no privacy exists for this portion of data. Conversely, blockchain 931 is a private blockchain which data portions may only be accessed and viewed by authorized users, such as internal company personnel. In this example scenario, Passenger has been separately stored on blockchain 931 and is private from all users interacting in the blockchain network except those with exclusive access to the data, such as managers within a company initiating the transaction. Blockchain 932 is a permissive blockchain meaning that a limited set of parties may view the data portions recorded in the block but not all users. Rate has been stored within blockchain 932 and may be view by parties who are allowed access to the data, such as auditors or controllers.

Record 902 is illustrative of what a user may view when requesting to view the transaction data stored in block entry 901. Record 902 may contain all or none of the data portions originally entered in block entry 901 and is generated based on the authorization provided by the requesting user and access level each portion of data is associated with.

Figure 10:
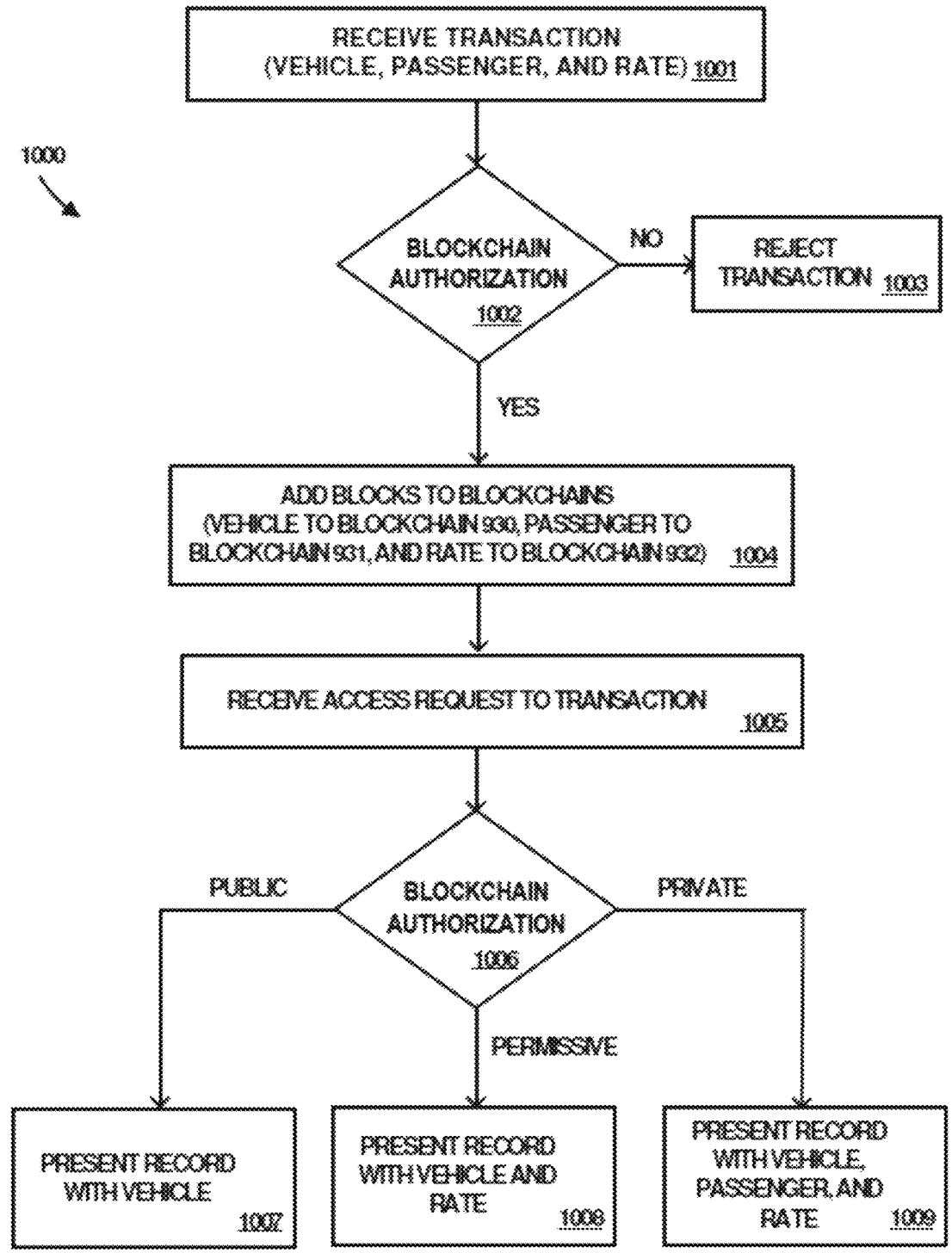
FIG. 10 illustrates a flow diagram in an implementation of an enhanced application to generate a customized view of restricted transactions recorded into a blockchain.

FIG. 10 illustrates a flow diagram in an implementation to generate a customized view of restricted transactions recorded into a blockchain for autonomous vehicle fleet business operations and guest usage. Some or all of the steps of view customization process 1000 may be implemented in program instructions in the context of a component or components of the application used to carry out the customized view feature.

In operation, data platform 910 receives block entry 901 which is to be maintained in blocks of blockchains 930-932 (step 1001). Block entry 901 is requested by a user from a user device in the distributed network of nodes and contains the data portions. Data platform 910 then authorizes the entry (e.g., miners validate the hash in the block) (step 1002). If the block is not validated, the transaction (block entry 901) is rejected (step 1003). However, if the block is accepted, each of the portions of data is evaluated for an access level and added to a block in each of blockchains 930-932 based on the identified access level (step 1004).

In a next operation, data platform 910 receives a request to view one or more data portions of a block entry wherein the request comprises an access code associated with at least one access level (step 1005). The access code may be associated with a public, permissive, or private access level. Data platform 910 then evaluates the access code in the request with each of blockchains 930-932 maintaining each of the separate block records for each of the data portions (step 1006). If the access code associated with the requesting user is determined to be public, a customized view (e.g., record 902) will be generated for the requesting user indicating only Vehicle from block entry 901 (step 1007). If the access code associated with the requesting user is determined to be permissive, a customized view will be generated for the requesting user indicating Vehicle and Rate from block entry 901 (step 1008). If the access code associated with the requesting user is determined to be private, a customized view will be generated for the requesting user indicating all portions of the data from block entry 901 (i.e., Vehicle, Passenger, and Rate) (step 1009).

In some embodiments, block entry 901 further records additional data related to the autonomous vehicle fleet transaction such as locations from where the passenger initiated the transaction and the involved vehicle, time and date stamps for transactions and passenger(s) and/or their assigned vehicle ID(s) entering and exiting the respective vehicle, and photos and/or videos of passenger(s) entering, exiting, and being transported by the assigned autonomous vehicle. In an example, in addition to being stored in block entry 901, such imaging may include live streaming to a security monitoring station positioned at or remote from a building or facility of the autonomous vehicle fleet. Additionally, or instead, cameras may monitor motion of the autonomous vehicles carrying passengers en-route to their destinations as a security measure and store these data in block entry 901 and/or elsewhere as a security measure for the benefit of passengers and fleet staff members. These imaging systems for security purposes may be useful in the case of vehicle accidents or other incidents that involve the passengers or the assigned autonomous vehicles. In such cases, the customized view may be provided to police or insurance company investigators to provide useful data for resolving post-incident issues.

Figure 11:
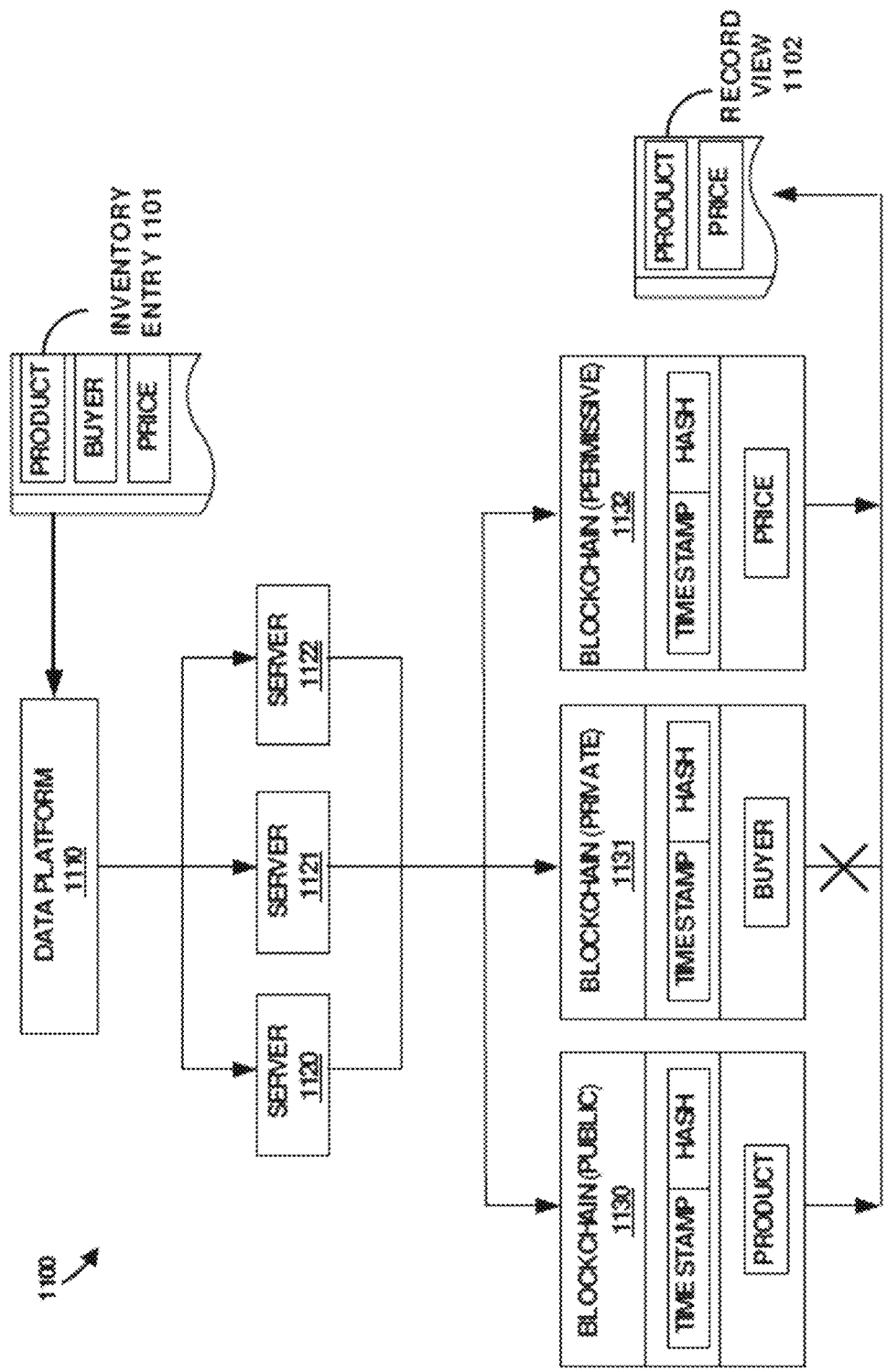
FIG. 11 illustrates a block diagram in an implementation of an enhanced application to generate a customized view of restricted transactions recorded into a blockchain.

FIG. 11 illustrates block diagram 1100 in an implementation of an enhanced application to generate a customized view of restricted transactions recorded into a blockchain. Block diagram 1100 includes inventory block entry 1101, data platform 1110, servers 1120-1122, blockchains 1130-1132, and record 1102.

Block entry 1101 is representative of any data transaction that will be permanently recorded into the blockchain. Block entry 1101 is subsequently processed by miners and added to a block at the end of the blockchain by data platform 1110. Block entry 1101 further comprises portions of data which have been represented herein by Product, Buyer, and Price. It should be noted that while each of the data portions is represented separately, the portions of data are part of one transaction represented by block entry 1101. Block entry 1101 may comprise any transaction or contract which has been executed and recorded in a distributed ledger platform environment. In this example, block entry 1101 may comprise a purchase order for inventory.

Data platform 1110 represents any computing system or systems capable of hosting a blockchain application, of which controller 2800 in FIG. 28 is representative. Data platform 1110 provides a secure distributed ledger system for recording transactions into the blockchains. Data platform 1110 may be implemented across a multitude of distributed network nodes which may be accessed by a variety of users, such as tax auditors, financial institutions, gaming regulation committees, customers, company employees, and the like.

Data platform 1110 can also include servers 1120-1122. Servers 1120-1122 may be representative of any computing system or systems with which the distributed network nodes may communicate. Examples include other devices having corresponding applications or services installed thereon, such that an operating user of a user device may be able to transfer a transaction to be added to a blockchain and distributed amongst the network nodes of the distributed network. Examples include media servers, web servers, and other types of end-points that may transmit transaction data to or receive transaction data from user devices and network nodes. In some embodiments, data platform can dynamically select which servers 1120-1122 are authorized to store the data. For example, companies or governments may have geographical restrictions, encryption standards, network security standards, or other restrictions on the server nodes on which the blockchain is stored. Data platform 1110 can therefore manage the logistics of dynamically selected servers based on these restrictions. For example, if a particular server is deemed to be under attack or hacked, then data platform 1110 can dynamically remove that server from the blockchain network and consider adding one or more additional servers if needed. As such, each owner of the data can set selection criteria for where the data should be stored and the minimum IT standards needed for that server group.

Block diagram 1100 further includes blockchains 1130-1132. Blockchains 1130-1132 can contain a continuously growing list of records, called blocks, which are linked and secured using cryptography. Each of the block in blockchains 1130-1132 contains a timestamp and a hash. The hash includes both a cryptographic hash of the current block and a cryptographic hash of the previous block in the blockchain. Each block also contains data associated with a block entry. In this example scenario, each portion of data (Product, Buyer, and Price) have been separately recorded into a different block and in a separate blockchain 1130-1132.

Additionally, each of blockchains 1130-1132 is associated with a separate access level. For example, blockchain 1130 is a public access blockchain which allows any user interacting with the distributed ledger to view the blocks and data portions stored within each block. A public user may be any user interested in viewing the transaction in blockchain 1130 and no privacy exists for this portion of data. Conversely, blockchain 1131 is a private blockchain which data portions may only be accessed and viewed by authorized users, such as internal company personnel. In this example scenario, Buyer has been separately stored on blockchain 1131 and is private from all users interacting in the blockchain network except those with exclusive access to the data, such as managers within a company initiating the transaction. Blockchain 1132 is a permissive blockchain meaning that a limited set of parties may view the data portions recorded in the block but not all users. Price has been stored within blockchain 1132 and may be view by parties who are allowed access to the data, such as auditors or controllers.

Record 1102 is illustrative of what a user may view when requesting to view the transaction data stored in from block entry 1101. Record 1102 may contain all or none of the data portions originally entered in block entry 1101 and is generated based on the authorization provided by the requesting user and access level each portion of data is associated with.

Figure 12:
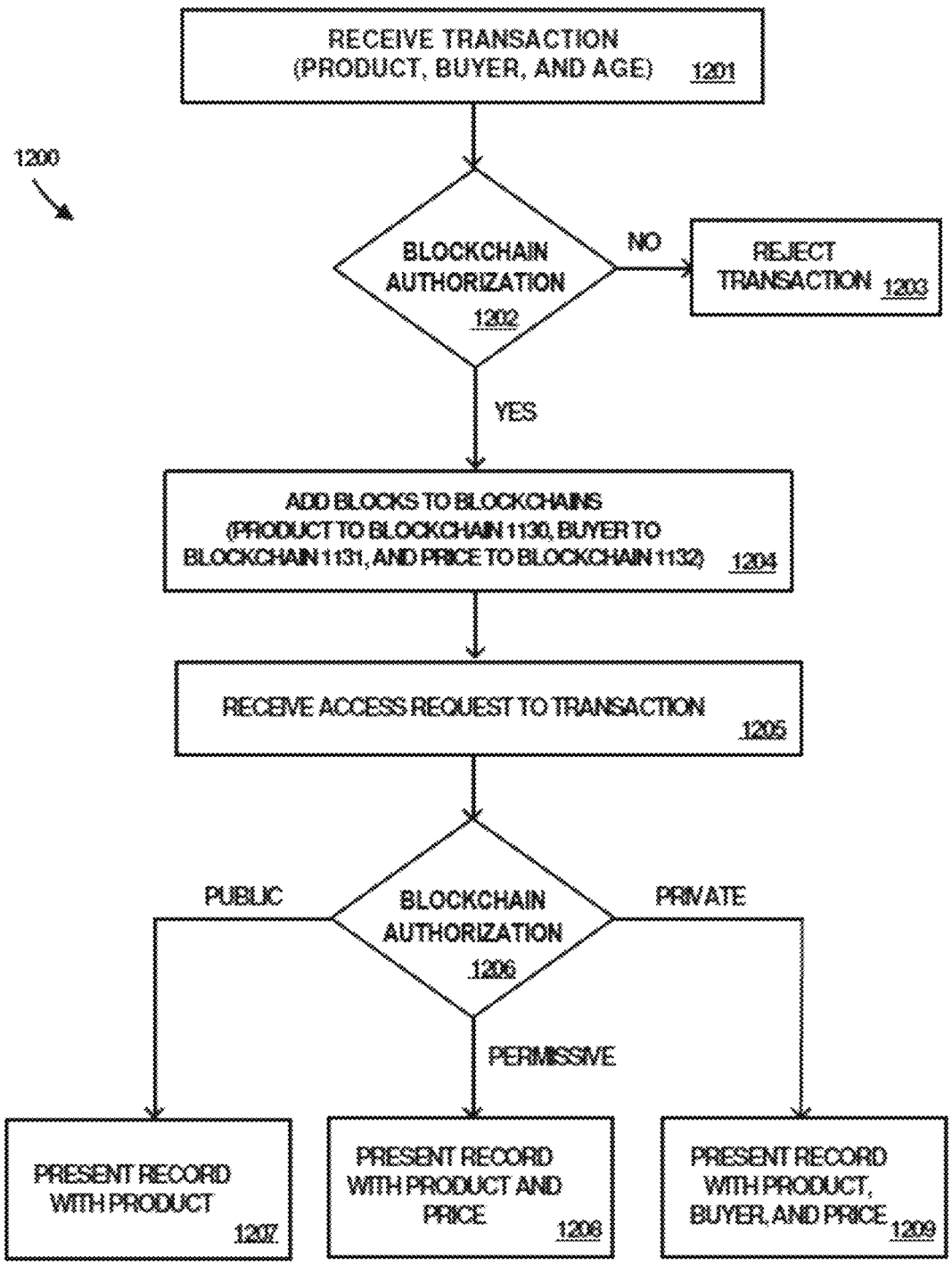
FIG. 12 illustrates a flow diagram in an implementation of an enhanced application to generate a customized view of restricted transactions recorded into a blockchain.

FIG. 12 illustrates a flow diagram in an implementation to generate a customized view of restricted transactions recorded into a blockchain. Some or all of the steps of view customization process 1200 may be implemented in program instructions in the context of a component or components of the application used to carry out the customized view feature.

In operation, data platform 1110 receives block entry 1101 which is to be maintained in blocks of blockchains 1130-1132 (step 1201). Block entry 1101 is requested by a user from a user device in the distributed network of nodes and contains the data portions. Data platform 1110 then authorizes the entry (e.g., miners validate the hash in the block) (step 1202). If the block is not validated, the transaction (block entry 1101) is rejected (step 1203). However, if the block is accepted, each of the portions of data is evaluated for an access level and added to a block in each of blockchains 1130-1132 based on the identified access level (step 1204).

In a next operation, data platform 1110 receives a request to view one or more data portions of a block entry wherein the request comprises an access code associated with at least one access level (step 1205). The access code may be associated with a public, permissive, or private access level. Data platform 1110 then evaluates the access code in the request with each of blockchains 1130-1132 maintaining each of the separate block records for each of the data portions (step 1206). If the access code associated with the requesting user is determined to be public, a customized view (e.g., record 1102) will be generated for the requesting user indicating only Product from block entry 1101 (step 1207). If the access code associated with the requesting user is determined to be permissive, a customized view will be generated for the requesting user indicating Product and Price from block entry 1101 (step 1208). If the access code associated with the requesting user is determined to be private, a customized view will be generated for the requesting user indicating all portions of the data from block entry 1101 (i.e., Product, Buyer, and Price) (step 1209).

Another implementation for flow diagram 1200 may be in the context of a gambling validation process. For example, a user placing a bet on a large threshold win may require approval from casino managers. In this example scenario, access to the user's data in a blockchain may be required when a payout of the bet occurs to ensure that the bet was approved for the user by the casino manager.

Figure 13:
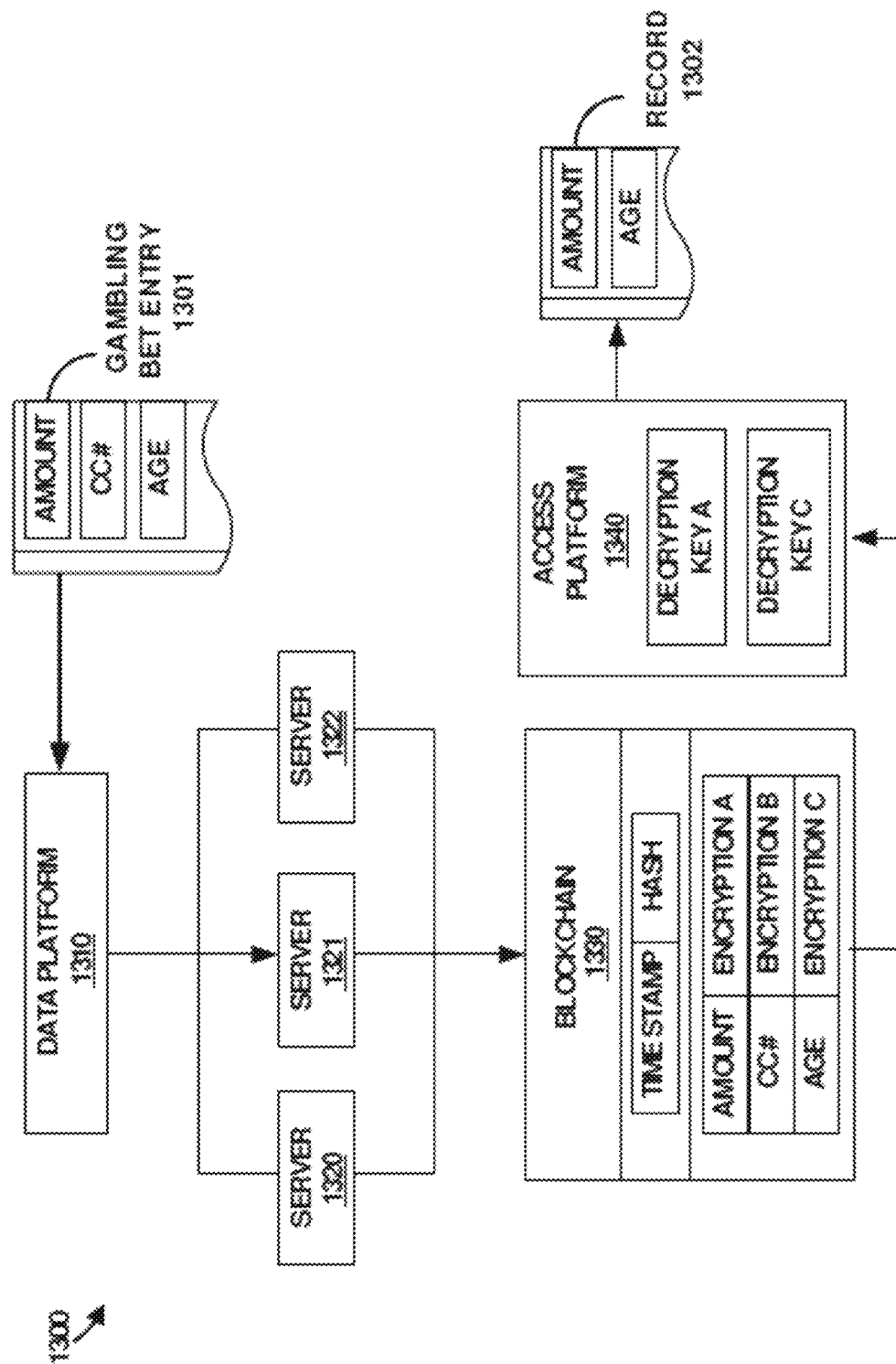
FIG. 13 illustrates a block diagram in an implementation of an enhanced application to generate a customized view of restricted transactions recorded into a blockchain.

FIG. 13 illustrates a block diagram in an alternative implementation of an enhanced application to generate a customized view of restricted transactions recorded into a blockchain. Block diagram 1300 includes gaming bet block entry 1301, data platform 1310, servers 1320-1322, blockchain 1330, access platform 1340, and record 1302.

Block entry 1301 is representative of any data transaction that will be permanently recorded into the blockchain. Block entry 1301 is subsequently processed by miners and added to a block at the end of the blockchain by data platform 1310. Block entry 1301 further comprises portions of data which have been represented herein by a Bet Amount, Credit Card Number, and Age. It should be noted that while each of the data portions is represented separately, the portions of data are part of one transaction represented by block entry 1301. Block entry 1301 may comprise any transaction or contract which has been executed and recorded in a distributed ledger platform environment. However, in this example, block entry 1301 comprises a gambling bet. It should also be noted that although requesting users, such as a third-party observer who is not a direct participant of the bet, may be able to view some data of blockchain 1330, an access code may be required to view block entry 1301. The access code may be in the form of a biometric validation.

Data platform 1310 represents any computing system or systems capable of hosting a blockchain application, of which controller 2800 in FIG. 28 is representative. Data platform 1310 provides a secure distributed ledger system for recording transactions into the blockchains. Data platform 1310 may be implemented across a multitude of distributed network nodes which may be accessed by a variety of users, such as auditors, financial institutions, gaming regulation committees, customers, company employees, and the like.

Data platform 1310 also includes servers 1320-1322. Servers 1320-1322 may be representative of any computing system or systems with which the distributed network nodes may communicate. Examples include other devices having corresponding applications or services installed thereon, such that an operating user of a user device may be able to transfer a transaction to be added to a blockchain and distributed amongst the network nodes of the distributed network. Examples include media servers, web servers, and other types of end-points that may transmit transaction data to or receive transaction data from user devices and network nodes.

Block diagram 1300 further includes blockchain 1330. Blockchain 1330 contains a continuously growing list of records, called blocks, which are linked and secured using cryptography. Each of the block in blockchain 1330 contains a timestamp and a hash. The hash includes both a cryptographic hash of the current block and a cryptographic hash of the previous block in the blockchain. Each block also contains data associated with a block entry. In this example scenario, each portion of data (Bet Amount, Credit Card Number, and Age) have been recorded into blockchain 1330 with a separate encryption code.

Additionally, each of the encryption codes associated with each of the data portions in blockchain 1330 is associated with a separate access level. For example, Bet Amount is associate with a public access encryption code which allows any user interacting with the distributed ledger to view the portion of data in the block. A public user may be any user interested in viewing the Bet Amount and no privacy exists for this portion of data. Conversely, Credit Card Number is associated with a private encryption code which may only be accessed and viewed by authorized users, such as the internal accounting department. Age is associated with a permissive encryption code which may be view by a limited set of parties but not all users. For example, Age may be required to be view by the gaming committee to ensure that all players are of a legal age to place the gambling bet. However, other players or observers of the bets may not be able to view the age of each player.

Access platform 1340 represents any computing system or systems capable of validating user request to access blockchain entry data, of which controller 2800 in FIG. 28 is representative. Access platform 1340 provides a secure encryption mediator between the portions of data recorded in blockchain 1330 and the generation of record 1302 for a requesting user. Access platform 1340 may be implemented across a multitude of distributed network nodes which may be accessed by a variety of users, such as tax auditors, financial institutions, gaming regulation committees, customers, company employees, and the like. Record 1302 is illustrative of what a user may view when requesting to view the transaction data stored in from block entry 1301. Record 1302 may contain all or none of the data portions originally entered in block entry 1301 and is generated based on the authorization provided by the requesting user and access level each portion of data is associated with.

Figure 14:
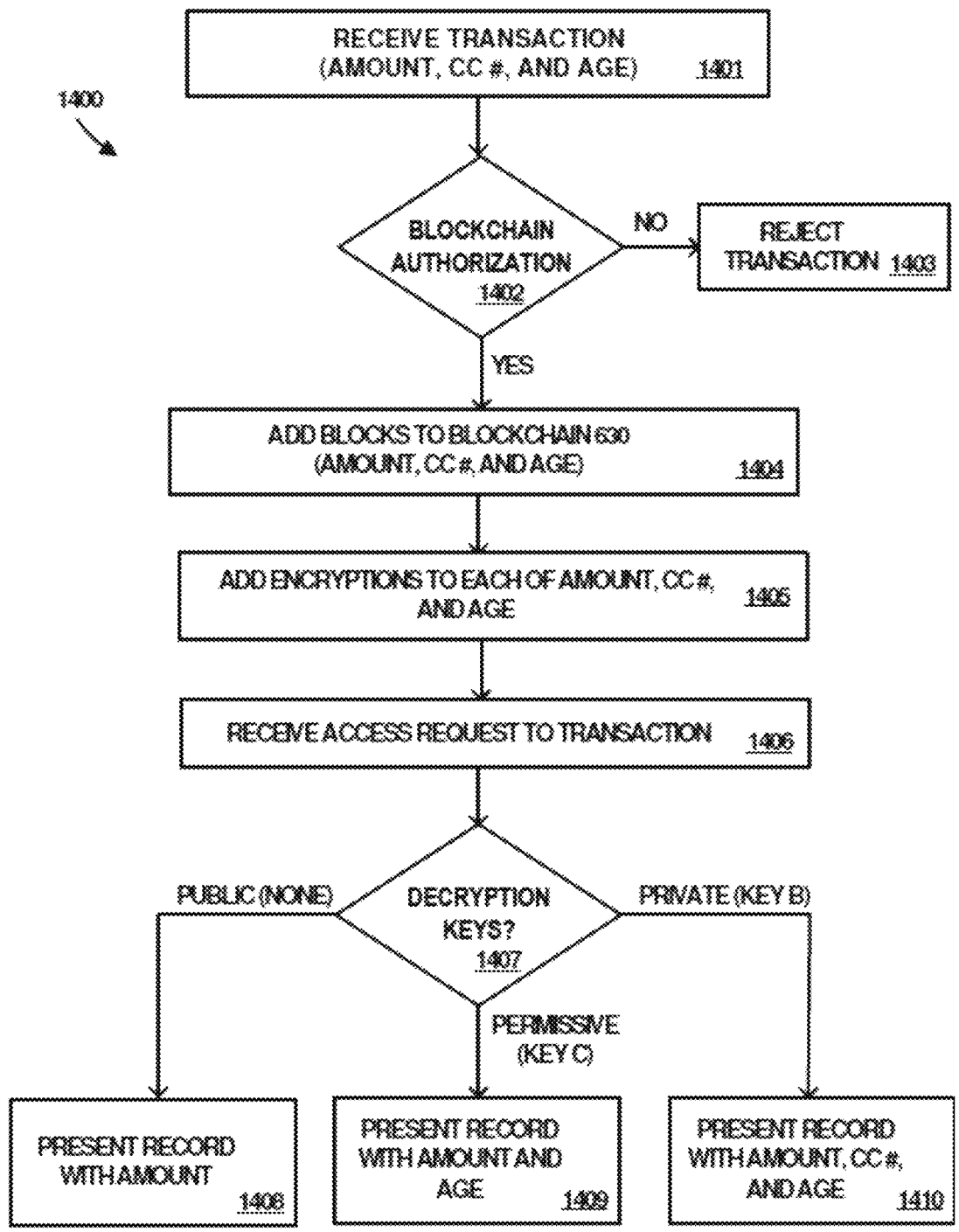
FIG. 14 illustrates a flow diagram in an implementation of an enhanced application to generate a customized view of restricted transactions recorded into a blockchain.

FIG. 14 illustrates a flow diagram in an implementation to generate a customized view of restricted transactions recorded into a blockchain. Some or all of the steps of view customization process 1400 may be implemented in program instructions in the context of a component or components of the application used to carry out the customized view feature.

In operation, data platform 1310 receives block entry 1301 which is to be maintained in blocks of blockchain 1330 (step 1401). Block entry 1301 is requested by a user from a user device in the distributed network of nodes and contains the data portions. Data platform 1310 then authorizes the entry (e.g., miners validate the hash in the block) (step 1402). If the block is not validated, the transaction (block entry 1301) is rejected (step 1403). However, if the block is accepted, each of the portions of data are evaluated for an access level and added to blockchain 1330 (step 1404) along with an encryption code based on the identified access level (step 1405).

In a next operation, access platform 1340 receives a request to view one or more data portions of a block entry wherein the request comprises an encryption code associated with at least one access level (step 1406). The encryption code may be associated with a public, permissive, or private access level. Access platform 1340 then evaluates the encryption code in the request with each of the portion of data in blockchain 1330 (step 1407). If the encryption code associated with the requesting user is determined to be public, a customized view (e.g., record 1302) will be generated for the requesting user indicating only Bet Amount from block entry 1301 (step 1408). If the encryption code associated with the requesting user is determined to be permissive, a customized view will be generated for the requesting user indicating Bet Amount and Age from block entry 1301 (step 1409). If the encryption code associated with the requesting user is determined to be private, a customized view will be generated for the requesting user indicating all portions of the data from block entry 1301 (i.e., Bet Amount, Credit Card Number, and Age) (step 1410).

Figure 15:
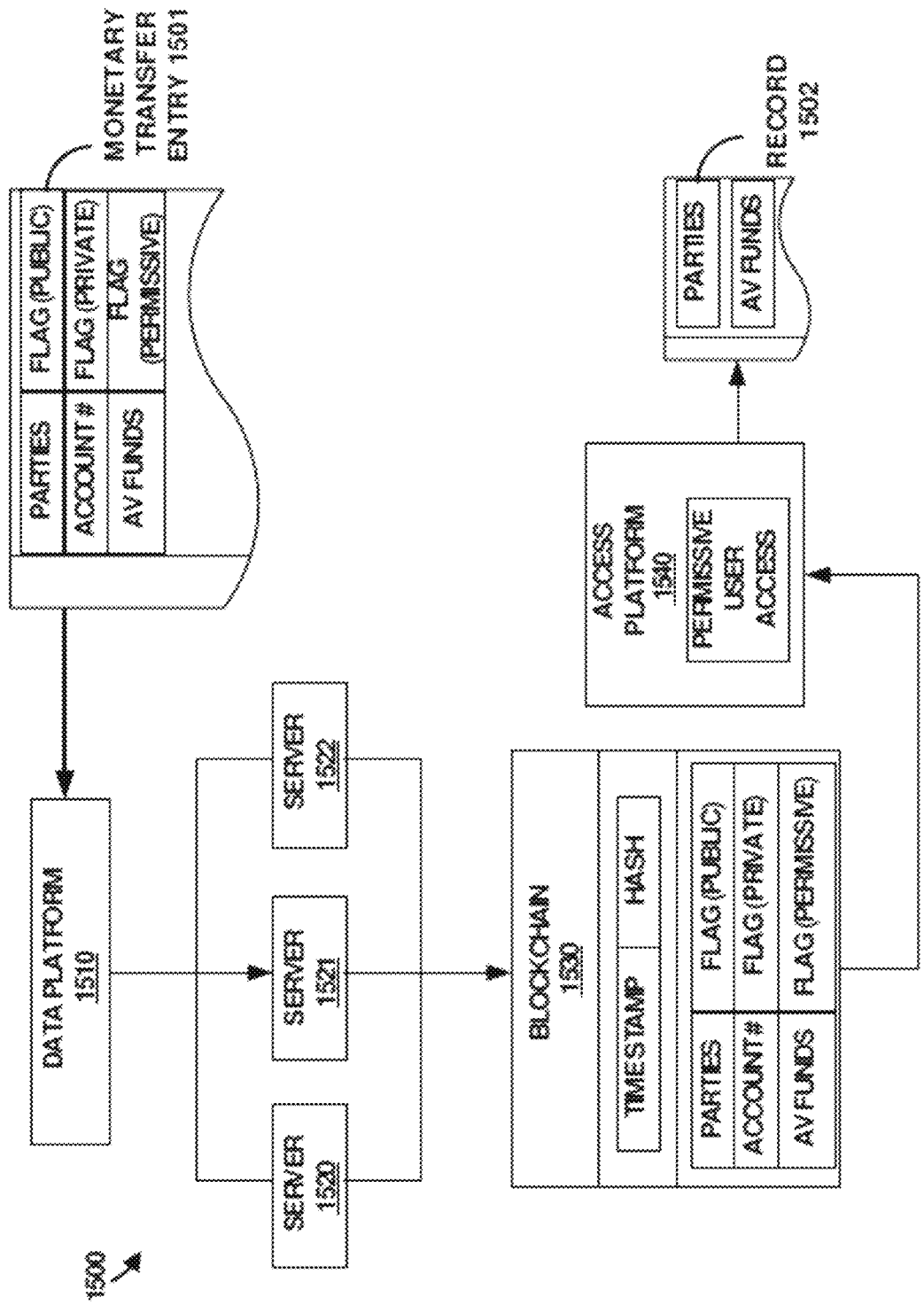
FIG. 15 illustrates a block diagram in an implementation of an enhanced application to generate a customized view of restricted transactions recorded into a blockchain.

FIG. 15 illustrates a block diagram in an alternative implementation of an enhanced application to generate a customized view of restricted transactions recorded into a blockchain. Block diagram 1500 includes monetary transfer block entry 1501, data platform 1500, servers 1520-1522, blockchain 1530, access platform 1540, and record 1502.

Block entry 1501 is representative of any data transaction that will be permanently recorded into the blockchain. Block entry 1501 is subsequently processed by miners and added to a block at the end of the blockchain by data platform 1510. Block entry 1501 further comprises portions of data which have been represented herein by Parties to the Transaction, Bank Account Number, and Available Funds. It should be noted that while each of the data portions is represented separately, the portions of data are part of one transaction represented by block entry 1501. Block entry 1501 may comprise any transaction or contract which has been executed and recorded in a distributed ledger platform environment. However, in this example, block entry 1501 comprises a banking transaction transferring money from one user's bank account to another user's bank account.

Data platform 1510 represents any computing system or systems capable of hosting a blockchain application, of which controller 2800 in FIG. 28 is representative. Data platform 1510 provides a secure distributed ledger system for recording transactions into the blockchains. Data platform 1510 may be implemented across a multitude of distributed network nodes which may be accessed by a variety of users, such as tax auditors, financial institutions, gaming regulation committees, customers, company employees, and the like.

Data platform 1510 also includes servers 1520-1522. Servers 1520-1522 may be representative of any computing system or systems with which the distributed network nodes may communicate. Examples include other devices having corresponding applications or services installed thereon, such that an operating user of a user device may be able to transfer a transaction to be added to a blockchain and distributed amongst the network nodes of the distributed network. Examples include media servers, web servers, and other types of end-points that may transmit transaction data to or receive transaction data from user devices and network nodes.

Block diagram 1500 further includes blockchain 1530. Blockchain 1530 contains a continuously growing list of records, called blocks, which are linked and secured using cryptography. Each of the block in blockchain 1530 contains a timestamp and a hash. The hash includes both a cryptographic hash of the current block and a cryptographic hash of the previous block in the blockchain. Each block also contains data associated with a block entry. In this example scenario, each portion of data (Parties, Account Number, and Available Funds) have been recorded into blockchain 1530 with a separate access level flag.

Additionally, each of the access level flags associated with each of the data portions in blockchain 1530 is associated with a separate access level. For example, Parties is associated with a public access flag which allows any user interacting with the distributed ledger to view the portion of data in the block. A public user may be any user interested in viewing the Parties to the Transaction and no privacy exists for this portion of data. Conversely, Account Number is associated with a private access flag which may only be accessed and viewed by authorized users, such as the transferring bank for each party. Available Funds is associated with a permissive access flag which may be view by a limited set of parties but not all users. For example, Available Funds may be required to be view by receiving bank to ensure that funds are available in the transferring account to complete the monetary transaction.

Access platform 1540 represents any computing system or systems capable of validating user request to access blockchain entry data, of which controller 2800 in FIG. 28 is representative. Access platform 1540 provides a secure access flag mediator between the portions of data recorded in blockchain 1530 and the generation of record 1502 for a requesting user. Access platform 1540 may be implemented across a multitude of distributed network nodes which may be accessed by a variety of users, such as tax auditors, financial institutions, gaming regulation committees, customers, company employees, and the like. Record 1502 is illustrative of what a user may view when requesting to view the transaction data stored in from block entry 1501. Record 1502 may contain all or none of the data portions originally entered in block entry 1501 and is generated based on the authorization provided by the requesting user and access level each portion of data is associated with.

Figure 16:
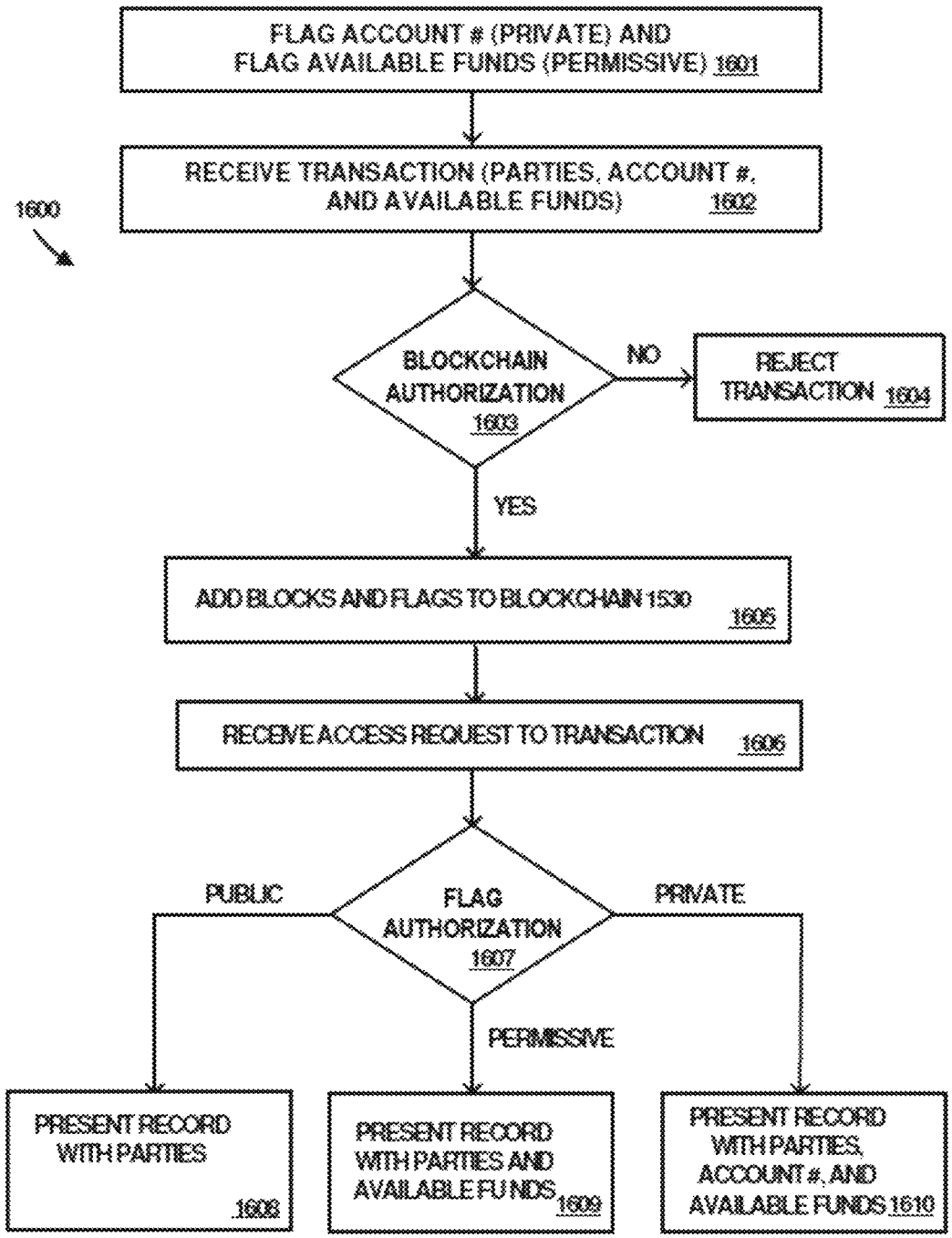
FIG. 16 illustrates a flow diagram in an implementation of an enhanced application to generate a customized view of restricted transactions recorded into a blockchain.

FIG. 16 illustrates a flow diagram in an implementation to generate a customized view of restricted transactions recorded into a blockchain. Some or all of the steps of view customization process 1600 may be implemented in program instructions in the context of a component or components of the application used to carry out the customized view feature.

In operation, data platform 1510 receives block entry 1501 which is to be maintained in blocks of blockchain 1530 (step 1601). Block entry 1501 is requested by a user from a user device in the distributed network of nodes and contains the data portions. Data platform 1510 then authorizes the entry (e.g., miners validate the hash in the block) (step 1602). If the block is not validated, the transaction (block entry 1501) is rejected (step 1603). However, if the block is accepted, each of the portions of data are evaluated for an access level and added to blockchain 1530 (step 1604) along with an access flag based on the identified access level (step 1605).

In a next operation, access platform 1540 receives a request to view one or more data portions of a block entry wherein the request comprises an access code associated with at least one access level (step 1606). The access code may be associated with a public, permissive, or private access level. Access platform 1540 then evaluates the access code in the request with each of the portion of data in blockchain 1530 (step 1607). If the access code associated with the requesting user is determined to be public, a customized view (e.g., record 1502) will be generated for the requesting user indicating only Parties from block entry 1501 (step 1608). If the access code associated with the requesting user is determined to be permissive, a customized view will be generated for the requesting user indicating Parties and Available Funds from block entry 1501 (step 1609). If the access code associated with the requesting user is determined to be private, a customized view will be generated for the requesting user indicating all portions of the data from block entry 1501 (i.e., Parties, Account Number, and Available Funds) (step 1610).

Figure 17:
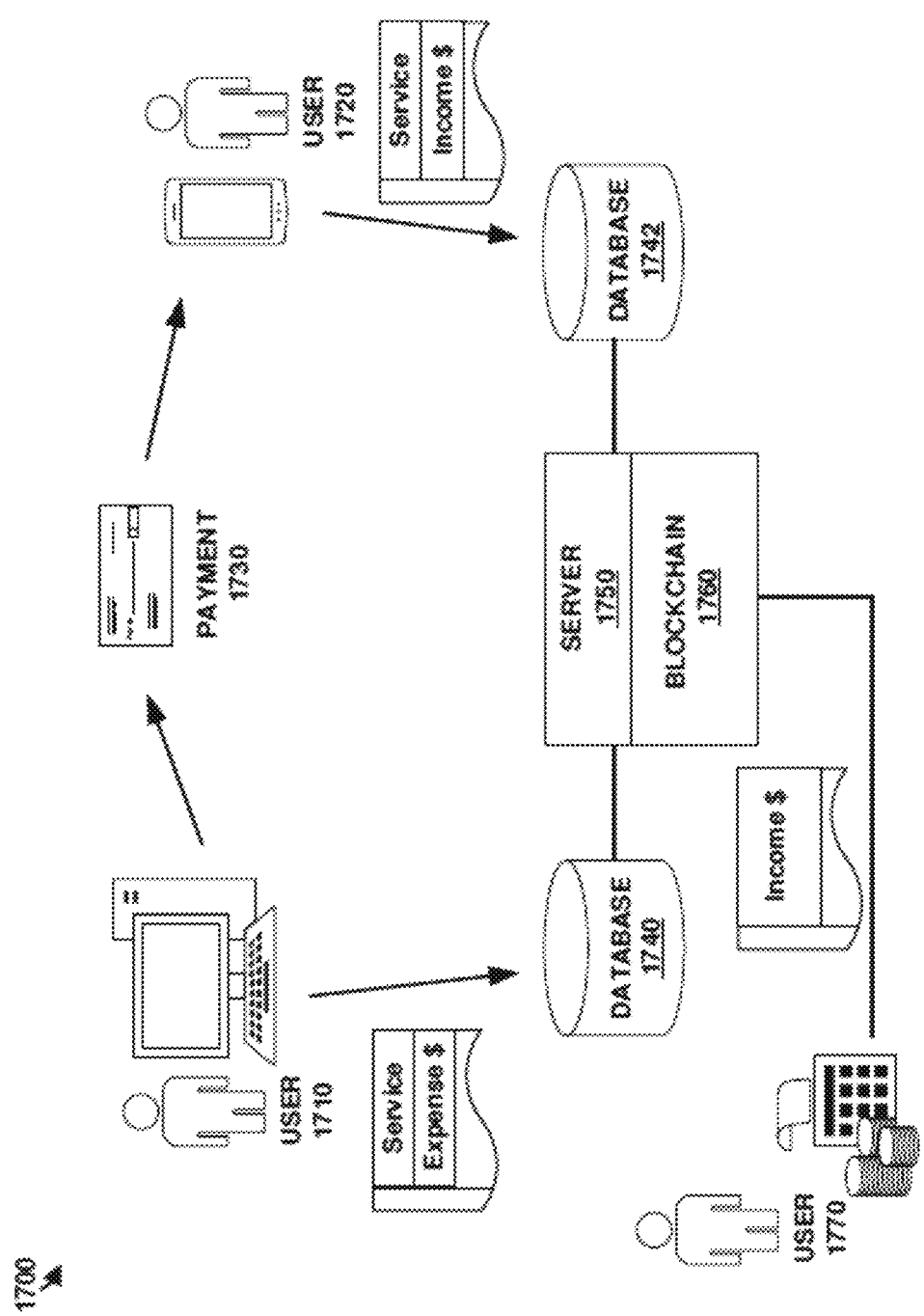
FIG. 17 illustrates an exemplary operational architecture in an implementation of a financial auditing scenario to generate a customized view of restricted transactions recorded into a blockchain.

FIG. 17 illustrates an exemplary operational architecture 1700 in an implementation of a financial auditing scenario to generate a customized view of restricted transactions recorded into a blockchain. In operation, user 1710 transfers paycheck 1730 to user 1720 in exchange for services. A record of the transaction is transferred from user 1710 to database 1740 indicating the name of the service and the expense cost. The record is then maintained in blockchain

1760 via server 1750. It should be noted that in this scenario, the transaction is also recorded on the receiving end by user 1720 where a record of the transaction indicating a profit and the service is transferred to database 1742 and maintained in blockchain 1760 via server 1750.

In a next operation, government tax auditor 1770 requests to view the profit recorded for user 1720. User 1770 may not be authorized to view the service recorded in the record or the expense from user 1710. Server 1750 may receive the request and process an access code indicating that, at this point in time, user 1770 is only authorized to view the profit for user 1720. A customized view of the record is then generated for user 1770 by server 1750 indicating only the profit for user 1720. Although user 1770 is unable to see the full record of the transaction, user 1770 is able to trust that the portion of the record indicating the profit of user 1720 is valid since it has been maintained in blockchain 1760.

Figure 18:
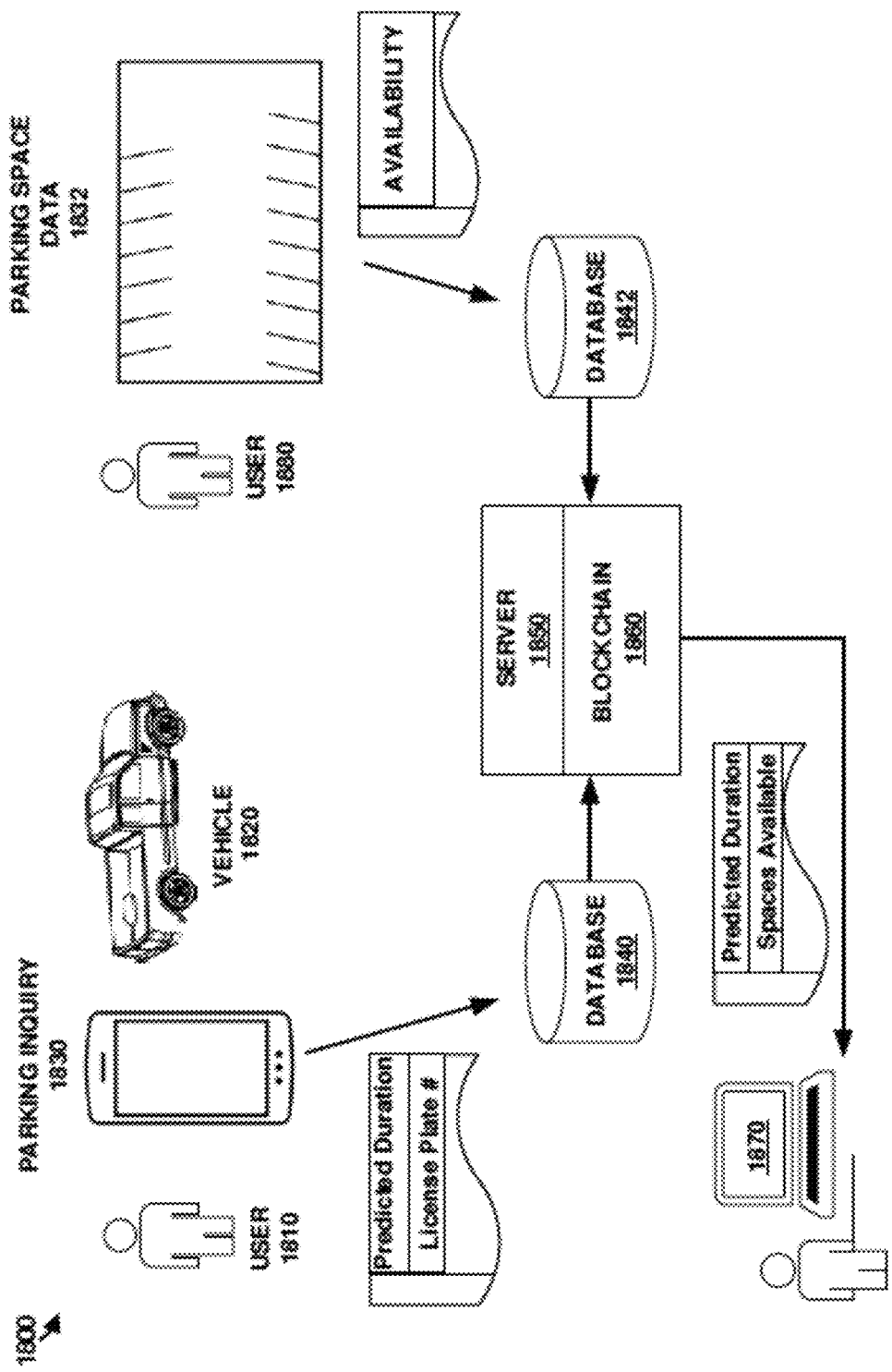
FIG. 18 illustrates an alternative operational architecture in an implementation of a parking facility business operation tracking scenario to generate a customized view of restricted transactions recorded into a blockchain.

FIG. 18 illustrates an alternative operational architecture 1800 in an implementation of a parking customer account and transaction tracking scenario to generate a customized view of restricted transactions recorded into a blockchain. In operation, user 1810 logged in to their account on a smartphone application submits an inquiry 1830 about whether spaces are available to park a vehicle 1820 in the parking facility 400 of FIG. 4. User 1810 enters their estimated time of arrival at the parking facility 400 entrance 402 and the estimated amount of time they will need to park their vehicle 1820. According to the customer's account data, for example, the application associates the vehicle 1820 with the license plate number. A record of the estimated time in and time out and the license plate number of vehicle 1820 is transferred from user 1810 to database 1840 indicating the predicted duration for the parking transaction. The record is then maintained in blockchain 1860 via server 1850. It should be noted that in this scenario, the arrival time transaction for the vehicle 1820 is also recorded on the receiving end by user 1880 where a record of the transaction indicating the estimate and the actual arrival time of vehicle 1820 is transferred to database 1842 and maintained in blockchain 1860 via server 1850. In some embodiments, where the actual vehicle 1820 arrival time occurs after the estimated vehicle 1820 arrival time by a predetermined threshold amount of time (e.g., 5 minutes), user 1810 must reinitiate the inquiry in order to be assigned any available parking space in the parking facility 400.

In a next operation, another parking customer, e.g., user 1870 requests to view the departure time and arrival time for the vehicle 1820 parked in a space preferred by user 1870. User 1870 may not be authorized to view the license plate number for the vehicle 1820. Server 1850 may receive the request and process an access code indicating that at this point in time, user 1870 is only authorized to view the predicted duration and available spaces recorded for vehicle 1820 and parking facility 400, respectively. A customized view of the record is then generated for user 1870 by server 1850 indicating only the predicted duration and the available spaces.

Figure 19:
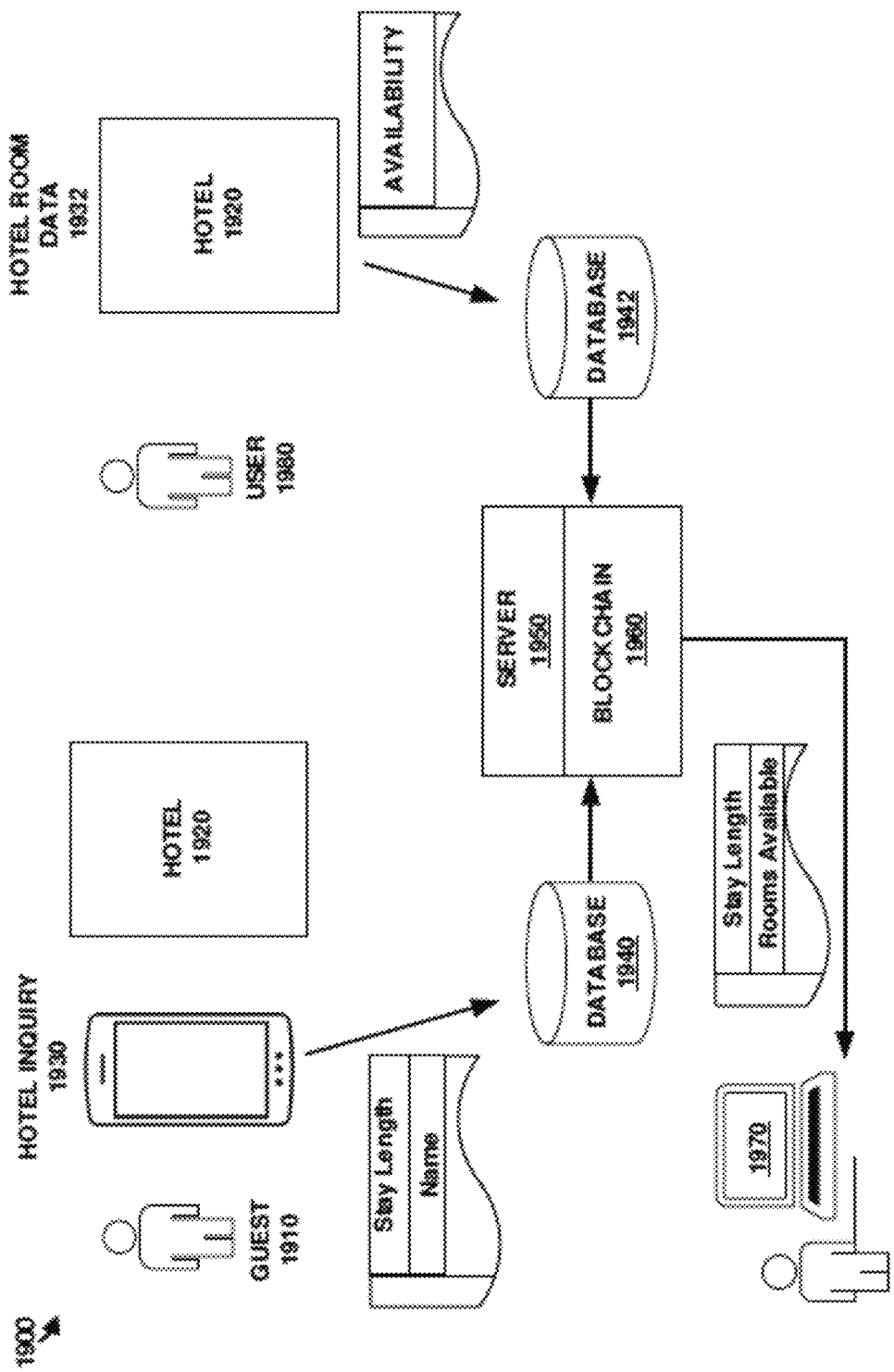
FIG. 19 illustrates an alternative operational architecture in an implementation of a hotel business operation tracking scenario to generate a customized view of restricted transactions recorded into a blockchain.

FIG. 19 illustrates an alternative operational architecture 1900 in an implementation of a hotel guest account and transaction tracking scenario to generate a customized view of restricted transactions recorded into a blockchain. In operation, guest 1910 logged in to their account on a smartphone application submits an inquiry 1930 about whether rooms are available for a stay at hotel 1920. Guest 1910 enters their desired check-in date at the hotel 1920 and the number of nights they will need to stay at hotel 1920. According to the customer's account data, for example, the application associates the stay length data with the name of the guest making inquiry 1930. A record of the check-in time and number of nights of the stay at hotel 1920 is transferred from guest 1910 to database 1940. The record is then maintained in blockchain 1960 via server 1950. It should be noted that in this scenario, the check-in time transaction for the hotel 1920 is also recorded on the receiving end by user 1980 where a record of the transaction indicating the estimate and the actual arrival time of guest 1910 at hotel 1920 is transferred to database 1942 and maintained in blockchain 1960 via server 1950. In some embodiments, where the actual hotel 1920 check-in time occurs after the estimated hotel 1920 arrival time by a predetermined threshold amount of time (e.g., 18 hours), guest 1910 must reinitiate the inquiry 1930 in order to be assigned any available hotel rooms in the hotel 1920.

Figure 20:
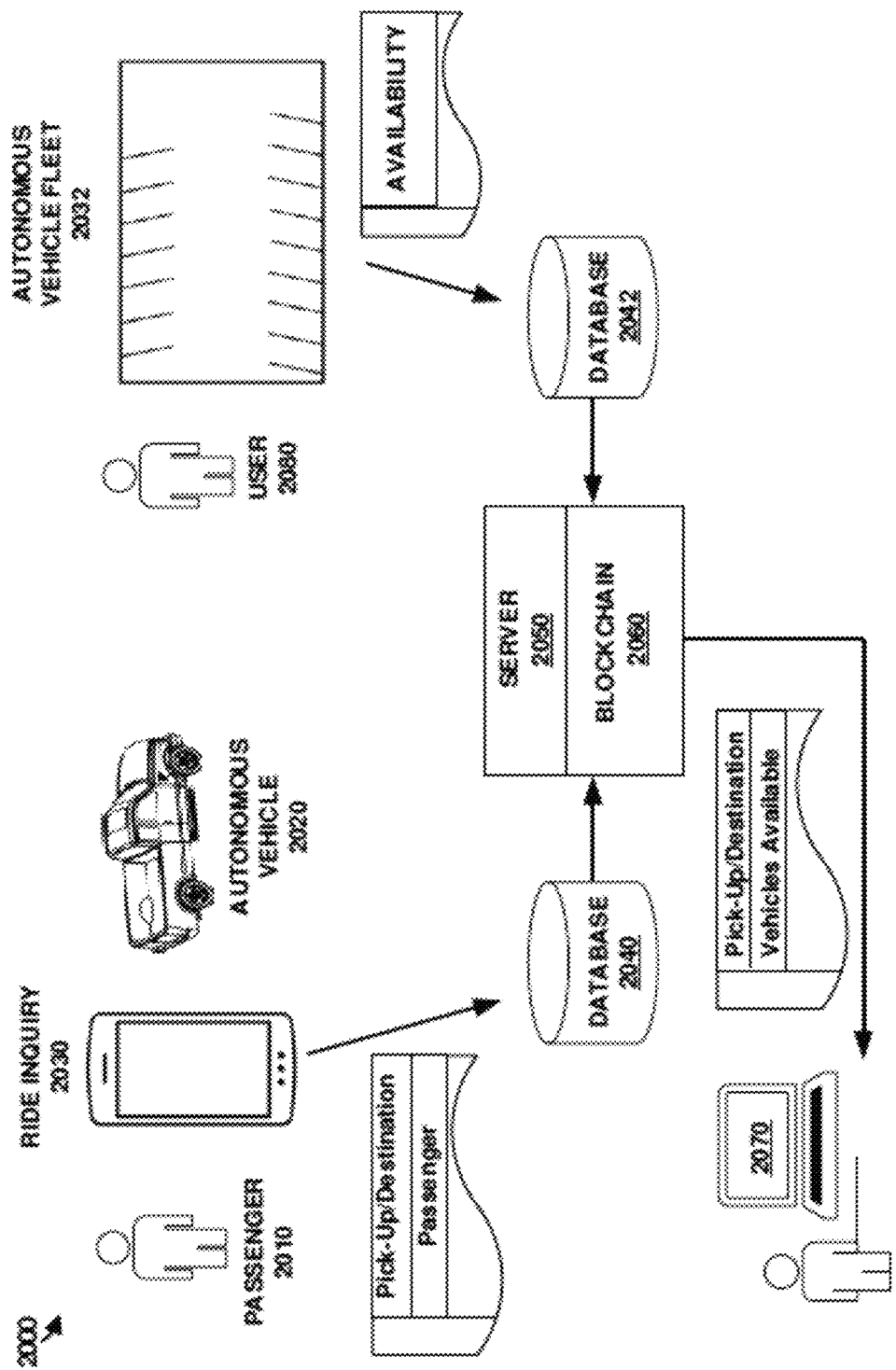
FIG. 20 illustrates an alternative operational architecture in an implementation of an autonomous vehicle fleet business operation tracking scenario to generate a customized view of restricted transactions recorded into a blockchain.

In a next operation, another hotel 1920 customer, e.g., guest 1970, requests to view the departure date and time for the hotel 1920 room presently occupied by guest 1910, but preferred by guest 1970. Guest 1970 may not be authorized to view the name of guest 1910. Server 1950 may receive the request and process an access code indicating that, at this point in time, guest 1970 is only authorized to view the predicted check-out date and time, along with other available rooms at hotel 1920. A customized view of the record is then generated for guest 1970 by server 1950 indicating only these data, but not the name of guest 1910.Figure 20 illustrates an alternative operational architecture 2000 in an implementation of an autonomous vehicle fleet passenger account and transaction tracking scenario to generate a customized view of restricted transactions recorded into a blockchain. In operation, passenger 2010 logged in to their account on a smartphone application submits an inquiry 2030 about whether an autonomous vehicle 2020 is available from fleet 2032 for a ride at a certain time and to a desired destination. Passenger 2010 enters their desired pick up date and time at a specified location that is served by an autonomous vehicle fleet 2032, along with their requested ride destination. According to the customer's account data, for example, the application associates the ride request-related data with the name of the passenger making inquiry 2030. A record of this ride request data is transferred from passenger 2010 to database 2040. The record is then maintained in blockchain 2060 via server 2050. It should be noted that in this scenario, the ride request data for the autonomous vehicle 2020 is also recorded on the fleet 2032 receiving end by user 2080, where a record of the transaction indicating the requested vehicle 2020, pick up time and location, and passenger 2010 destination is transferred to database 2042 and maintained in blockchain 2060 via server 2050. In some embodiments, where the passenger 2010 is not present at the pre-arranged pick up location and a predetermined period of time elapses (e.g., 10 minutes after the pre-arranged pick up time), passenger 2010 must reinitiate the inquiry 2030 in order to be assigned any available autonomous vehicles 2020 from fleet 2032.

In a next operation, another fleet 2032 customer, e.g., passenger 2070, requests to view the time and date when the autonomous vehicle 2020 presently in the service of passenger 2010, but preferred by passenger 2070, will be available again for hire. Passenger 2070 may not be authorized to view the name of passenger 2010. Server 2050 may receive the request and process an access code indicating that, at this point in time, passenger 2070 is only authorized to view the predicted vehicle 2020 availability date and time, along with other available vehicles of fleet 2032. A customized view of the record is then generated for passenger 2070 by server 2050 indicating only these data, but not the name of passenger 2010.

Figure 21:
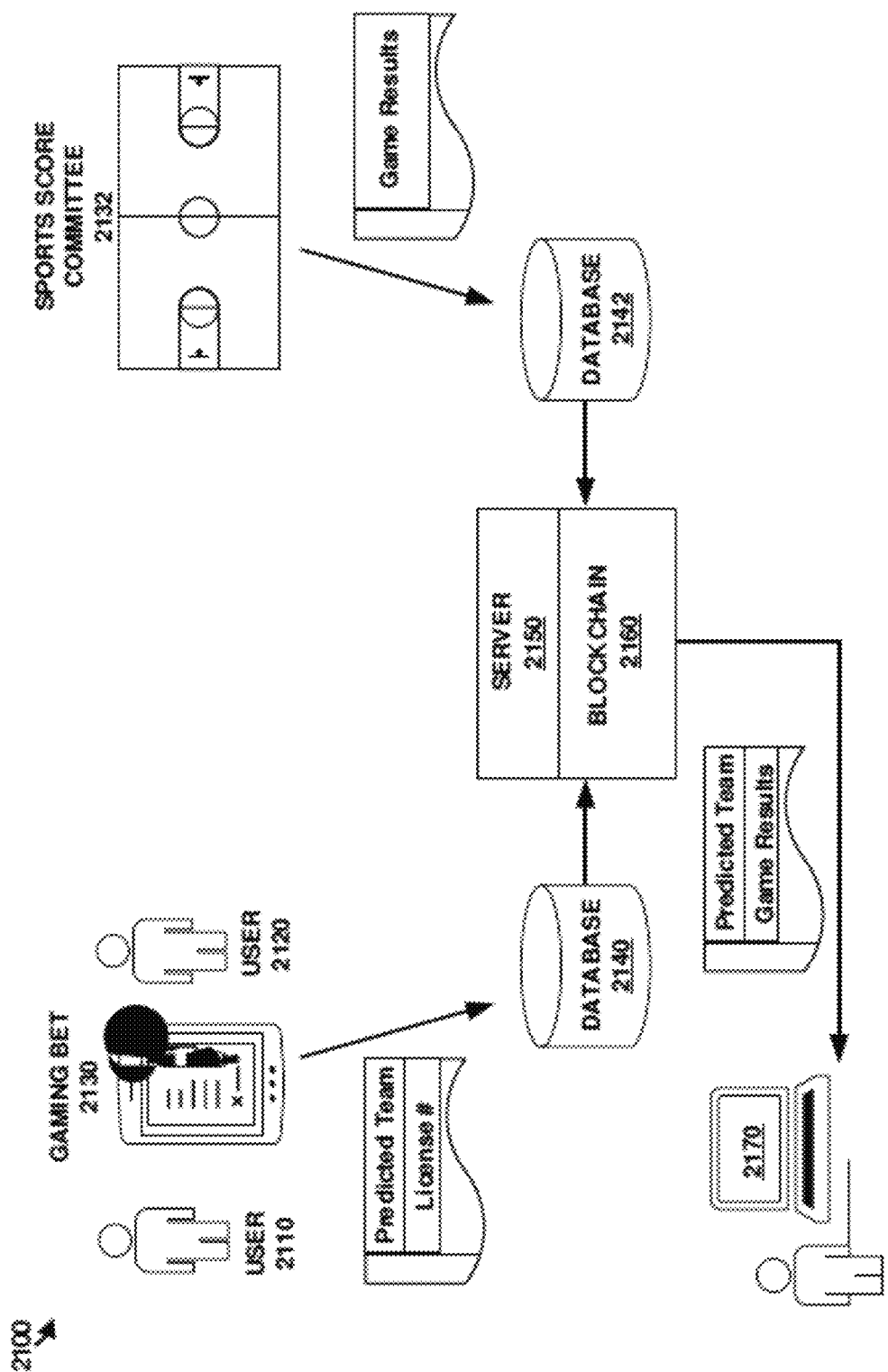
FIG. 21 illustrates an alternative operational architecture in an implementation of a gaming regulation scenario to generate a customized view of restricted transactions recorded into a blockchain.

FIG. 21 illustrates an alternative operational architecture 2100 in an implementation of a gaming regulation scenario to generate a customized view of restricted transactions recorded into a blockchain. In operation, user 2110 signs sports bet 2130 with user 2120. A record of sports bet 2130 is transferred from the users to database 2140 indicating the predicted teams and the driver's license number of users 2110-2120. The record is then maintained in blockchain 2160 via server 2150. It should be noted that in this scenario, the transaction also initiates a transfer from sports scoring committee 2132 to database 2142 indicating the official score of the game. The official score of the game is transferred to database 2142 and maintained in blockchain 2160 via server 2150.

In a next operation, sporting bet management user 2170 may request to see the predicted results along with the official score of the game from blockchain 2160. User 2170 may not be authorized to view the driver's licenses of each of users 2110-2120. Server 2150 may receive the request and process an access code indicating that at this point in time, user 2170 is only authorized to view the predicted results of each of users 2110-2120 and the official score. A customized view of the record is then generated by server 2150 indicating only the predicted results and the official score for user 2170. Although user 2170 is unable to see the full record of the transaction, user 2170 is able to trust that the portion of the record indicating that users 2110-2120 have a valid driver's license on file since this data has been maintained in blockchain 2160.

Figure 22:
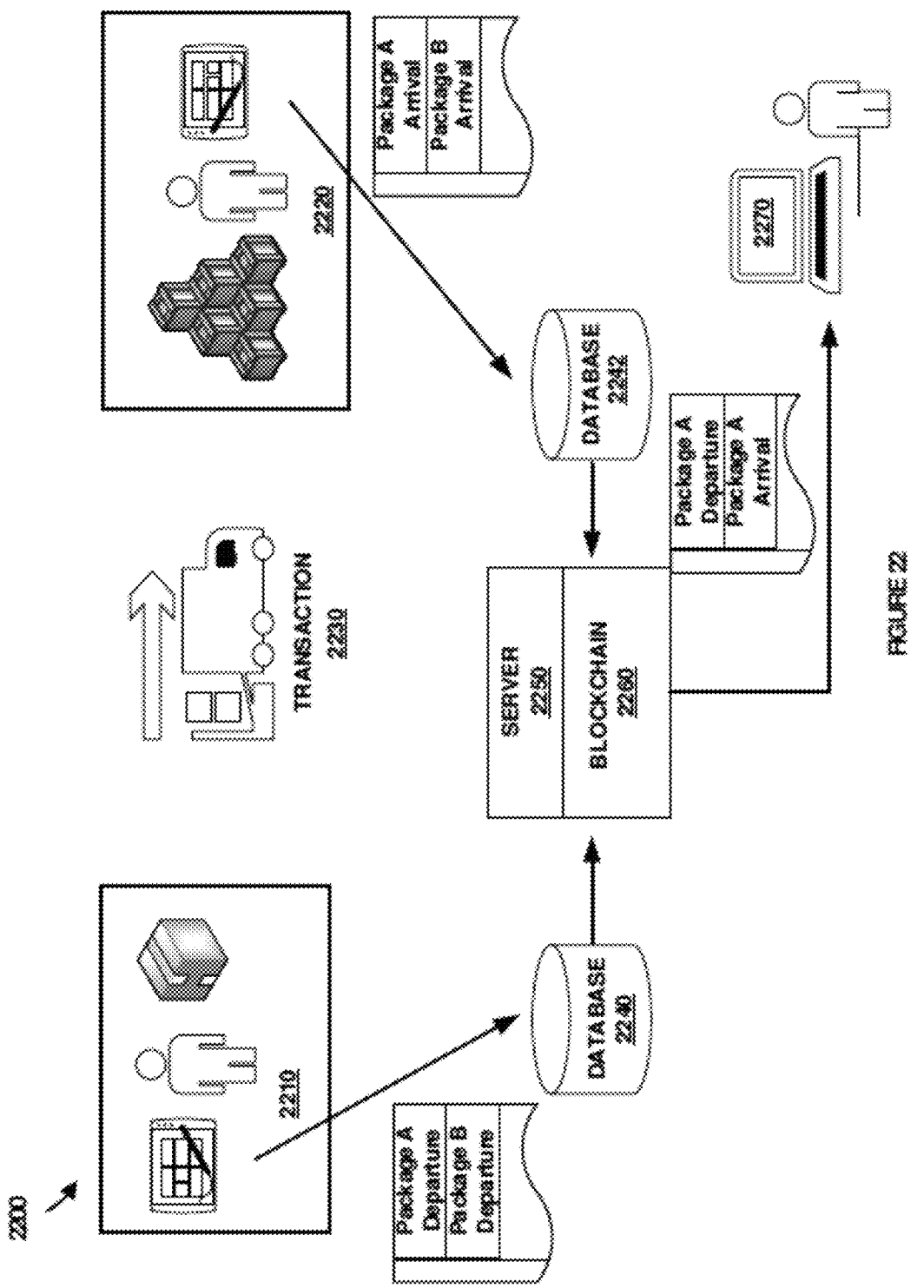
FIG. 22 illustrates an alternative operational architecture in an implementation of an inventory tracking scenario to generate a customized view of restricted transactions recorded into a blockchain.

FIG. 22 illustrates an alternative operational architecture 2200 in an implementation of an inventory tracking scenario to generate a customized view of restricted transactions recorded into a blockchain. In operation, user 2210 transfers cargo of packages 2230 to user 2220 to be delivered to various users, including user 2270 tracking Package A. A record of the departure time transaction for cargo of packages 2230 is transferred from user 2210 to database 2240 indicating the departure time of Package A and Package B. The record is then maintained in blockchain 2260 via server 2250. It should be noted that in this scenario, the arrival time transaction for cargo of packages 2230 is also recorded on the receiving end by user 2220 where a record of the transaction indicating the arrival time of Package A and Package B is transferred to database 2242 and maintained in blockchain 2260 via server 2250.

In a next operation, user tracking Package A 2270 requests to view the departure time and arrival time recorded for Package A. User 2270 may not be authorized to view the departure time and arrival time recorded for Package B. Server 2250 may receive the request and process an access code indicating that, at this point in time, user 2270 is only authorized to view the departure time and arrival time recorded for Package A. A customized view of the record is then generated for user 2270 by server 2250 indicating only departure time and arrival time recorded for Package A.

Referring again to FIG. 18, the inventory tracking scenario of FIG. 22 implements or otherwise makes use of the blockchain and the disclosed systems and methods in a similar fashion as the parking facility case. In the latter case, the product is a parking space in the parking facility and the inventory being tracked are the numbers and locations of available parking spaces. The blockchain may be utilized according to the disclosed systems and methods to improve the efficiencies and customer experiences for business operations where the timing of delivery of a product or service is important to customers and providers of the product or service. In the parking case presented in FIG. 18, for example, obtaining the predicted duration of the customer's parking request based on their anticipated time in and time out to and from the parking facility 400 enables the operator to meet their customers needs while effectively making the most of the parking space inventory to maximize revenues. In cases where an operator has more than one parking facility in a city, for instance, the inventory across the facilities may be leveraged to the same ends. Similarly, for the inventory tracking scenario of FIG. 22 (e.g., a retail store operation having multiple store locations in an area), the disclosed systems and methods, operators and their customers may have access to real time data regarding present locations and available quantities of particular products (including while they are in transit) and thereby enjoy heightened convenience and increased sales flowing therefrom.

Figure 23:
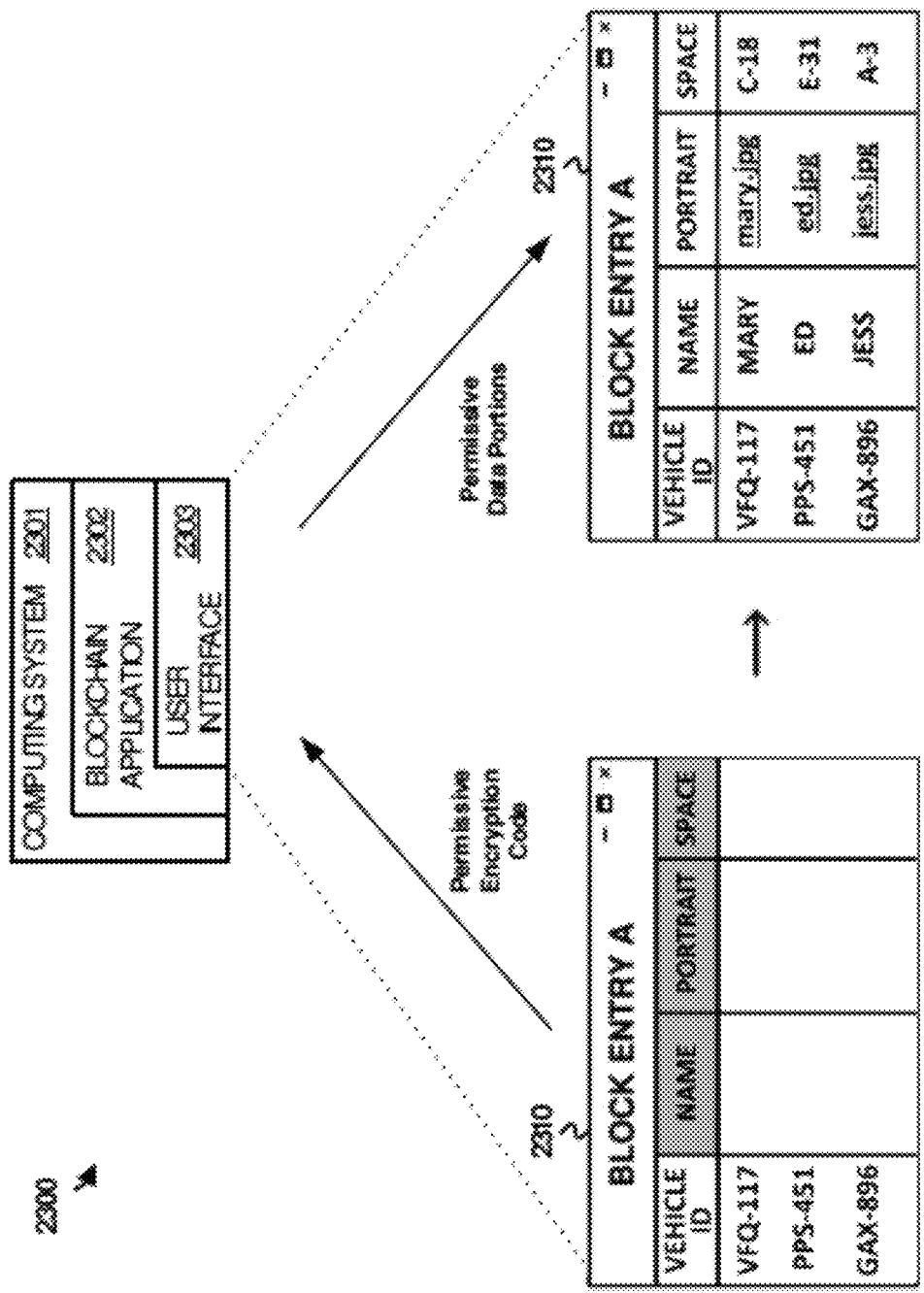
FIG. 23 illustrates an exemplary customized view of restricted transaction recorded into a blockchain.

FIG. 23 illustrates an exemplary customized view of restricted transaction recorded into a blockchain. FIG. 23 includes computing system 2301 comprises one or more devices capable of running a blockchain application natively or in the context of a web browser, streaming an application, or executing an application in any other manner. Computing system 2301 may include various hardware and software elements in a supporting architecture suitable for generating a customized view of a parking transaction record. One such representative architecture is illustrated in FIG. 28 with respect to controller 2800.

Computing system 2301 also includes blockchain application component 2302 capable of maintaining a complete record of the blockchain transactions in accordance with the processes described herein. User interface 2303 includes customized view 2310 which may be produced by blockchain application component. User interface 2303 may display in the customized view 2310 portions of data from a block entry which a user is authorized to view. The user may initially only have access to view public portions of the block entry, such as the license plate numbers a subset of vehicles parked or planning to park at the parking facility 400.

An encryption code may then be transferred in a request to view permissive portions of data. Once computing system 2301 verifies the encryption code, permissive portions of data may be added to customized view 2310. The permissive portions of data include the names and portrait images of each customer associate with the vehicles in the subset. However, the parking spaces currently occupied by each of the customers in the subset may remain private and therefore, the user will be unable to view the parking space data in customized view 2310.

Figure 24:
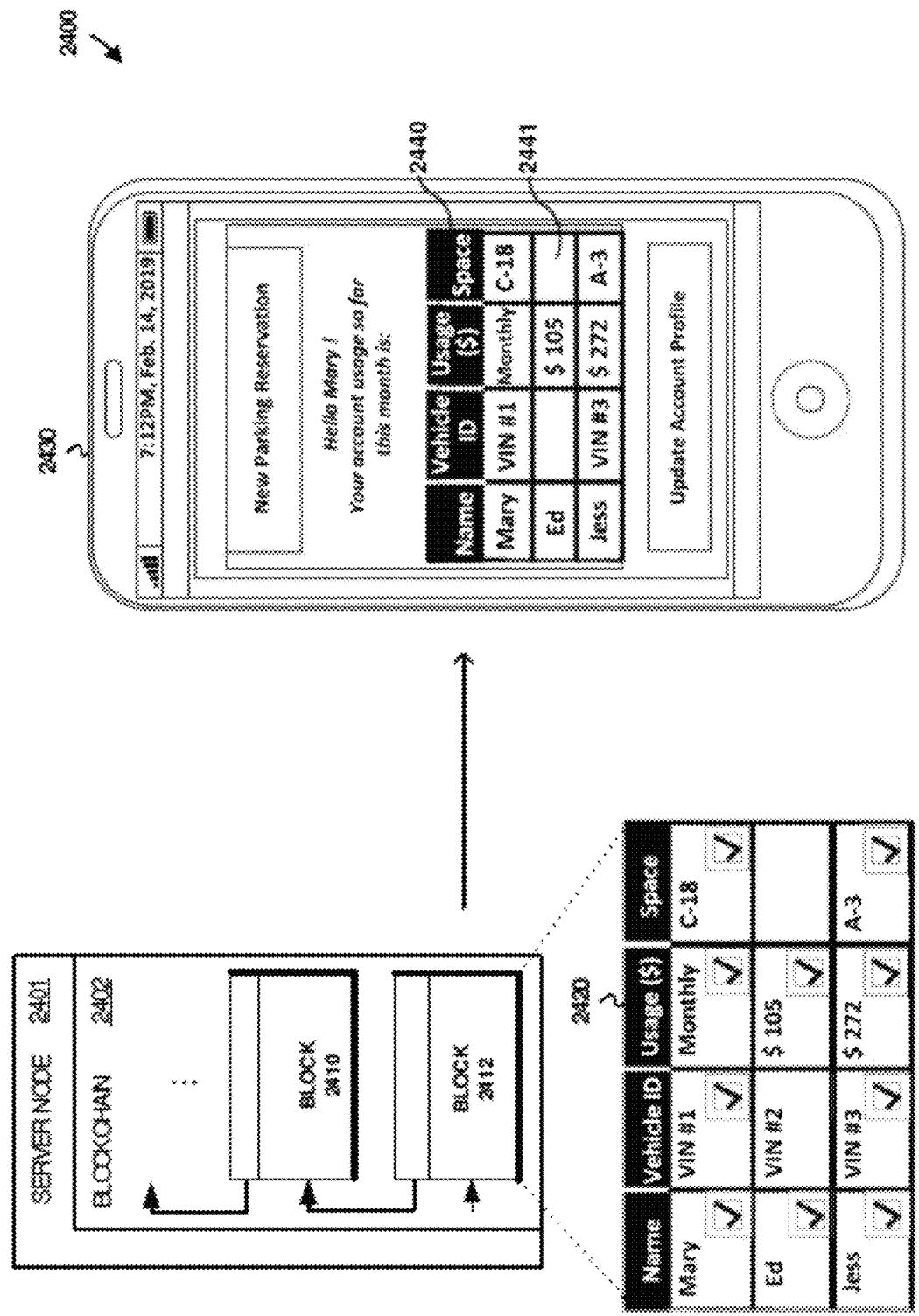
FIG. 24 illustrates an alternative exemplary customized view of restricted transaction recorded into a blockchain.

FIG. 24 illustrates an alternative exemplary customized view 2400 of restricted transaction recorded into a blockchain. FIG. 24 includes server node 2401 storing a copy of blockchain 2402. Blockchain 2402 stores blocks which have been chained using hash codes, such as blocks 2410 and 2412. Each block contains transactions which may be further broken down into portions of data. For example, block 2412 stores an up-to-date, real-time tally 2420 of parking transactions at the parking facility 400 of FIG. 4. Tally 2420 includes names of each of the customers, a license plate number for each customer's vehicle, a month-to-date amount of money spent (or an indication of a parking subscription plan held) by each customer on parking, and an identifier of a parking space in parking facility 400 in which the customer's vehicle is presently parked. It should be noted that additional data may also be included in block 2412, such as month-to-date ancillary services used, and an amount of money spent on such services at the parking facility 400.

In a use case corresponding to the example illustrated in FIG. 24, one of the customers in tally 2420 (e.g., Mary) is a parking account owner, and the remaining customers shown in tally 2420 are authorized users of Mary's account. In the use case, Mary and Ed are divorced ex-spouses and Mary is responsible for paying all of Ed's parking costs at the parking facility 400 for any reason whatsoever. Mary pays for her daughter Jess's parking costs for purposes of attending college classes near the parking facility 400. For each user accessing restricted parking records, a check mark is included to indicate which portions of data may be viewed by each of the users (e.g., Mary, Ed, and Jess). For example, Mary is accessing the month-to-date parking transaction history using mobile device 2430. In this example scenario, Mary is authorized to view each of the names of the authorized users (Ed and Jess) and the usage dollar amounts since Mary is responsible for paying those amounts to the parking facility 400. Mary is also allowed private access to her own, and Jess's, license plate numbers, usage amounts and occupied parking space IDs. However, according to Mary and Ed's divorce settlement, Mary may not have any ability to track Ed's whereabouts. Thus, Mary does not have access to Ed's license plate number or presently occupied parking space in parking facility 400. As can be seen in the customized view displayed on mobile device 2430, Mary views authorized data portions 2440 and is blocked from viewing unauthorized data portions 2441.

Figure 25:
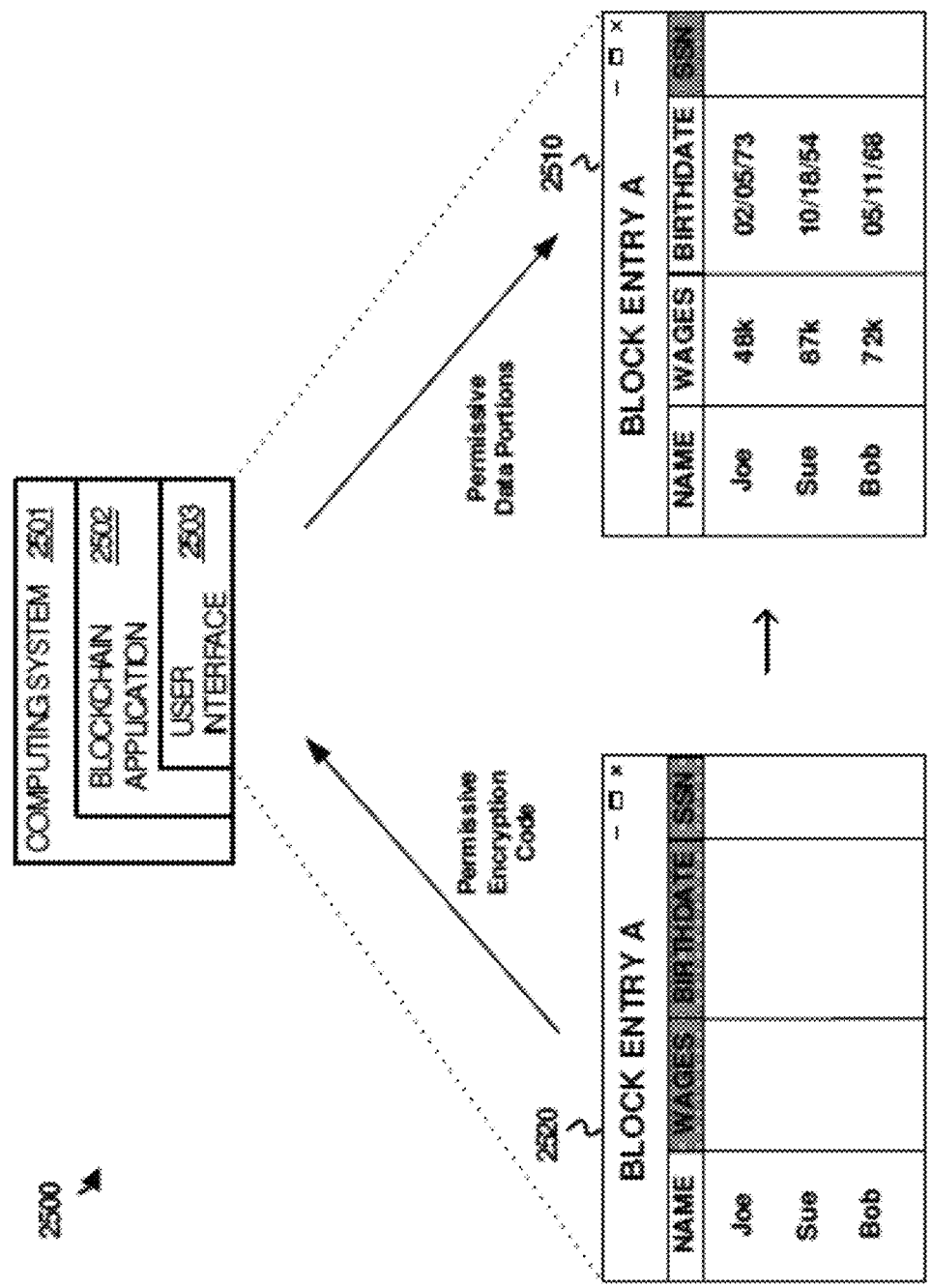
FIG. 25 illustrates an exemplary customized view of restricted transaction recorded into a blockchain.

FIG. 25 illustrates an exemplary customized view of restricted transaction recorded into a blockchain. FIG. 25 includes computing system 2501 comprises one or more devices capable of running a blockchain application natively or in the context of a web browser, streaming an application, or executing an application in any other manner. Computing system 2501 may include various hardware and software elements in a supporting architecture suitable for generating a customized view of a payroll transaction record. One such representative architecture is illustrated in FIG. 28 with respect to controller 2800.

Computing system 2501 also includes blockchain application component 2502 capable of maintaining a complete record of the blockchain transactions in accordance with the processes described herein. User interface 2503 includes customized view 2510 which may be produced by blockchain application component. User interface 2503 may display in the customized view 2510 portions of data from a block entry which a user is authorized to view. The user may initiate initially only have access to view public portions of the block entry, such as the name of each employee who is on the payroll.

An encryption code may then be transferred in a request to view permissive portions of data. Once computing system 2501 verifies the encryption code, permissive portions of data may be added to customized view 2510. The permissive portions of data include the wages and birthdates of each employees on the payroll transaction. However, the social security numbers of each of the employees may remain private and therefore, the user will be unable to view the social security data in customized view 2510.

Figure 26:
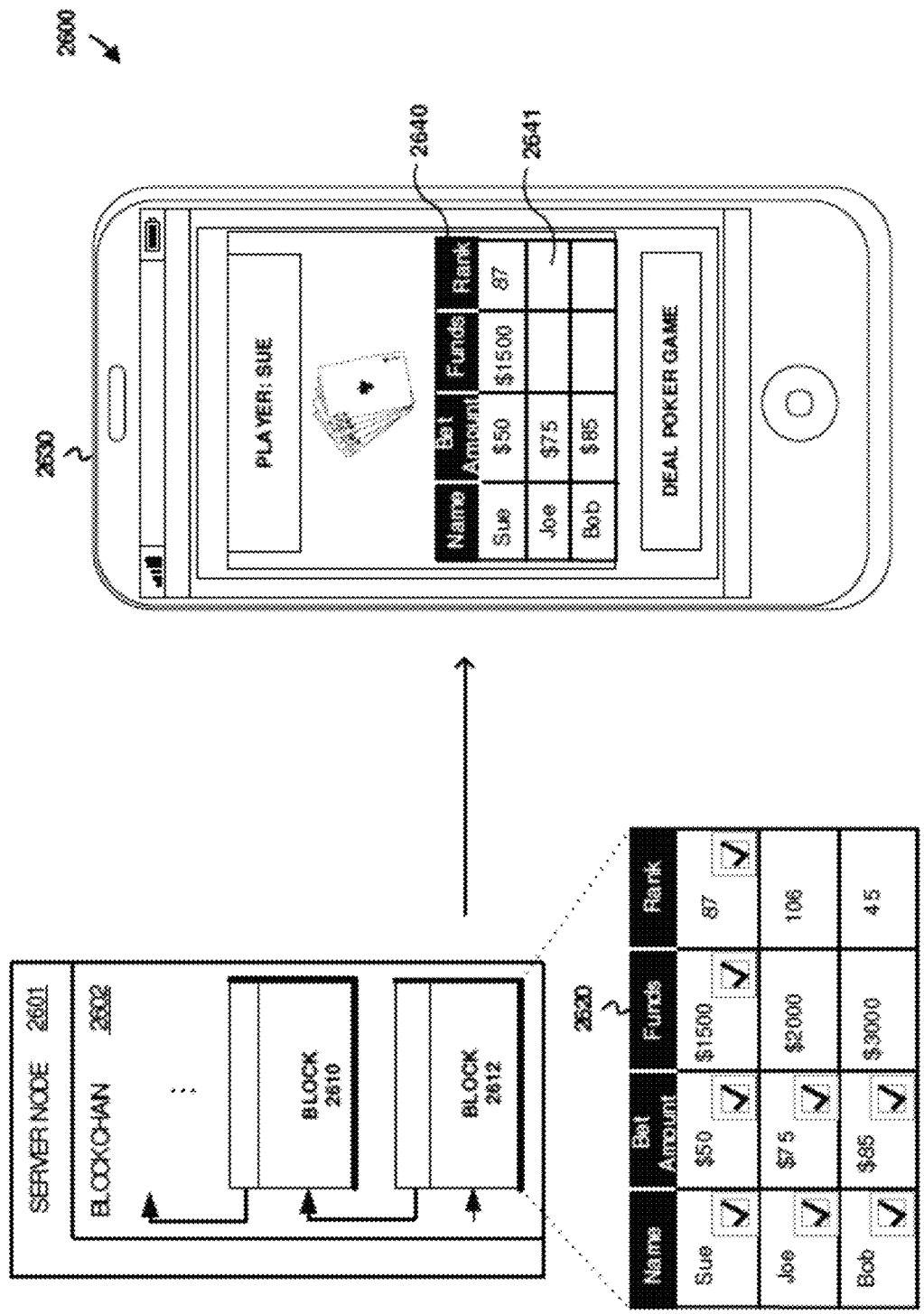
FIG. 26 illustrates an alternative exemplary customized view of restricted transaction recorded into a blockchain.

FIG. 26 illustrates an alternative exemplary customized view of restricted transaction recorded into a blockchain. FIG. 26 includes server node 2601 storing a copy of blockchain 2602. Blockchain 2602 stores blocks which have been chained using hash codes, such as blocks 2610 and 2612. Each block contains transactions which may be further broken down into portions of data. For example, block 2612 stores online poker game bet entry 2620. Bet entry 2620 includes names of each of the players, a bet amount for each of the players, an amount of funds each player has available to make the bet, and a player rank index. It should be noted that additional data may also be included in block 2612, such as game statistics, win/loss percentages, etc.

For each user access the bet entry, a check mark is included to indicate which portions of data may be viewed by each of the users. For example, Sue is accessing the poker game bet entry using mobile device 2630. In this example scenario, Sue is authorized to view each of the names of the players and the bet amounts since the names and bet amounts are accessible to the public. Sue is also allowed private access to her own funds amount and rank. However, Sue does not have access to the available funds and rank of the other players. As can be seen in the customized view displayed on mobile device 2630, Sue views authorized data portions 2640 and is blocked from viewing unauthorized data portions 2641.

Figure 27:
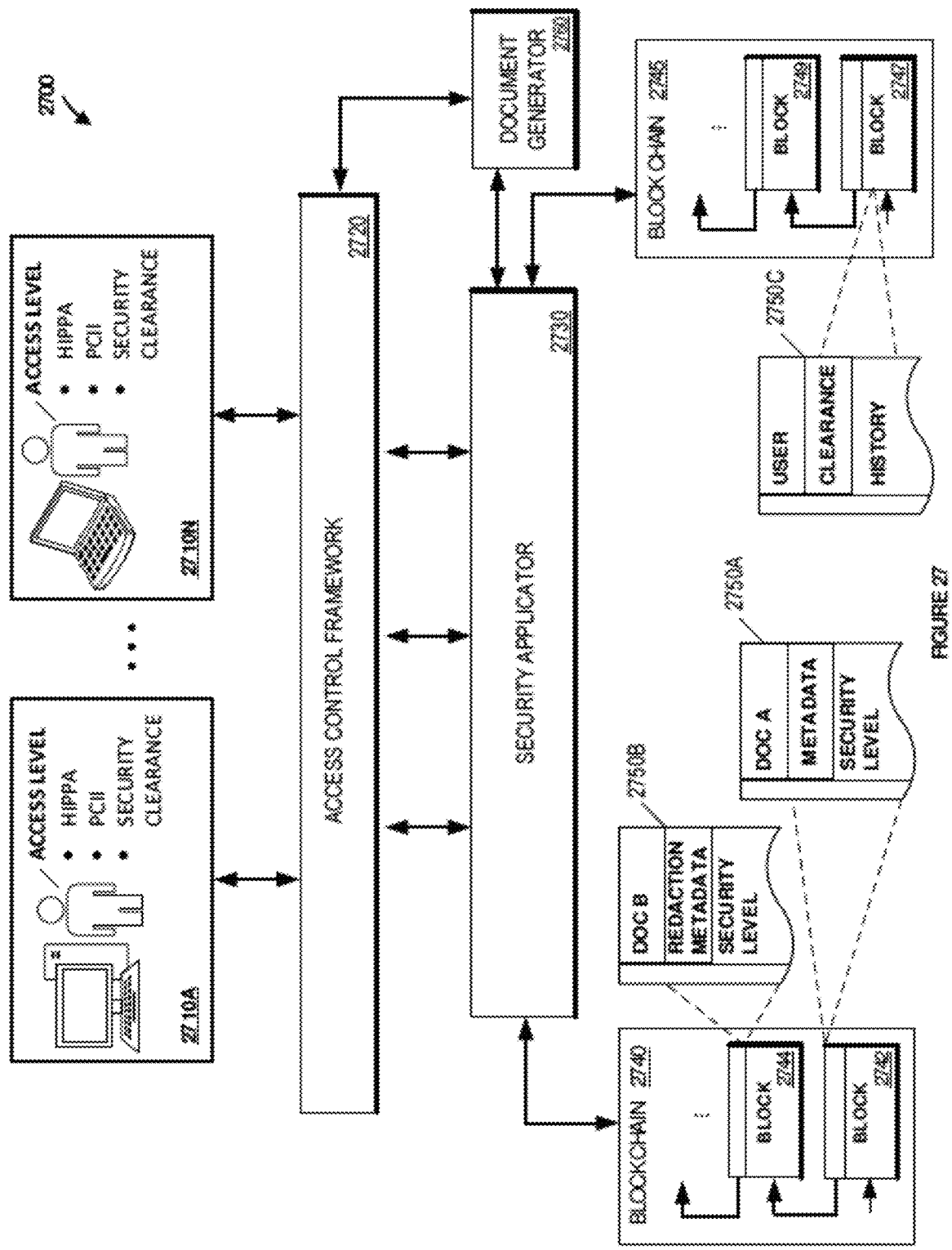
FIG. 27 illustrates an alternative operational architecture in an implementation of a data access system capable of providing a customized view of restricted or sensitive data recorded into a blockchain.

FIG. 27 illustrates an alternative operational architecture in an implementation of a data access system capable of providing a customized view of restricted or sensitive data recorded into a blockchain. As illustrated in FIG. 27, users 2710A-2710N can use various electronic devices to request access to a document, electronic record, physical location (e.g., safe, room, building, area, etc.), or information. For example, in accordance with various embodiments users 2710A-2710N may have difference access levels such as security clearance that grants the user access to classified information (e.g., state or organizational secrets) or to restricted areas. Typically, a security clearance (e.g., classified, secret, top secret, etc.) is not sufficient to gain access to all documents and/or data. Instead, the individual must also have a need to know the specific information.

The request can be submitted to access control framework 2720 which can translate and validate the requests from different systems (e.g., application, key card system, fingerprint readers, biometric devices, passwords, multi-factor authentication, and the like). Upon validation, the access control framework can submit the request to security applicator 2730 which can process the request using various security protocols. For example, the security level of the requests document or location may require additional multiple validations (e.g., password and hardware device, biometrics, location verification, PINs, passwords, etc.). Security application, in some embodiments, may pull this information from a field or metadata within a block on a blockchain associated with the data.

The document or data 2750A-2750B stored in blockchain 2740 may have different fields or portions that can be accessed by different individuals with differing "needs to know" or access levels (e.g., a compliance officer vs. a lower level employee of a company, individual with higher security clearance level vs. one with a lower security clearance level, etc.). For example, in some embodiments, various redaction mappings may be stored in the blockchain and applied by document generator 2760 before being presented to users 2710A-2710N. As such, two users requesting the same document or data may be presented with different results.

As an example, a freedom of information access request may yield redacted documents which have been deemed as available to the public while an individual with security clearance and a need to know will be presented with a different level of access. In accordance with various embodiments an initial request may be received from a user. The system can identify the information that is compliant with the request and set a timer period for responding to the request (e.g., 30 days) to the FOIA request. The system can then determine whether each piece of information compliant with the request has any classification restrictions. If any of the information is determined to be unrestricted (e.g., no classification levels), then the system can respond to the user who made the request with a response that includes information without inspection. This type of feature reduces the workload of governmental employees and ensures that the time period for response is met (e.g., by prioritizing and reassigning review among employees). In some embodiments, if enough time remains, the system may request a human review and approve the included information before sending.

When the system identifies confidential information, the system would next evaluate the access and clearance. If for example, the person requesting the data had a higher access/clearance than an administrator, then the information would be automatically sent. If redactions need to be made to comply with the security clearance, then document generator 2760 may apply any redactions needed and/or remove documents that should not be included in the response. While not illustrated in FIG. 27, some embodiments may include a machine learning/artificial intelligence component to review the data and/or metadata and identify portions that should not be included.

Other embodiments may have other types of individuals seeking varying information (e.g., people seeking information on a gambler, a banking client, regulators performing audits, etc.). Many such use cases exist. Also, some embodiments may use decentralized applications (Dapps) that have backend code running on a decentralized peer-to-peer network to submit the request, retrieve information from the blockchains, and communicate with other applications (e.g., other Dapps).

Security applicator 2730 may also review the status of the credentials or security level of the user. The record of the user may be stored on blockchain 2745. For example, information regarding background checks, bank account information, travel information, projects the user is associated with (past and present), family history, medical history, credentials, biometrics, passwords, signatures, and the like can be stored on in the user's record. Security applicator 2730 may retrieve that information and utilize the information in generating the customized view of the data or document.

FIG. 28 illustrates a block diagram illustrating an example machine representing the computer systemization of the host computer system. Controller 2800 may be in communication with entities including one or more users 2825 client/terminal devices 2820, user input devices 2805, peripheral devices 2810, optional co-processor device(s) (e.g., cryptographic processor devices) 2815, and networks 2830. Users may engage with controller 2800 via terminal devices 2820 over networks 2830. In some embodiments, all or a portion of the communications between terminal devices 2820 and controller 2800 can be encrypted. Various laws, standards, or best practices may require cryptography for storing, transmitting, and/or utilization of various types data, information, code, signaling, etc.

Computers may employ central processing units (CPUs) or processors to process information. Processors may include programmable general-purpose or special-purpose microprocessors, programmable controllers, application-specific integrated circuits (ASICs), programmable logic devices (PLDs), embedded components, a combination of such devices and the like. Processors execute program components in response to user and/or system-generated requests. One or more of these components may be implemented in software, hardware or both hardware and software. Processors pass instructions (e.g., operational and data instructions) to enable various operations.

Controller 2800 may include clock 2865, CPU 2870, memory such as read only memory (ROM) 2885 and random access memory (RAM) 2880 and co-processor 2875 among others. These controller components may be connected to a system bus 2860, and through the system bus 2860 to an interface bus 2835. Further, user input devices 2805, peripheral devices 2810, co-processor devices 2815, and the like, may be connected through the interface bus 2835 to the system bus 2860. The interface bus 2835 may be connected to a number of interface adapters such as processor interface 2840, input output interfaces (I/O) 2845, network interfaces 2850, storage interfaces 2855, and the like.

Processor interface 2840 may facilitate communication between co-processor devices 2815 and co-processor 2875. In one implementation, processor interface 2840 may expedite encryption and decryption of requests or data. Input output interfaces (I/O) 2845 facilitate communication between user input devices 2805, peripheral devices 2810, co-processor devices 2815, and/or the like and components of controller 2800 using protocols such as those for handling audio, data, video interface, wireless transceivers, or the like (e.g., Bluetooth®, IEEE 894a-b, serial, universal serial bus (USB), Digital Visual Interface (DVI), 802.11a/b/g/n/x, cellular, etc.). Network interfaces 2850 may be in communication with the network 2830. Through the network 2830, controller 2800 may be accessible to remote terminal devices 2820. Network interfaces 2850 may use various wired and wireless connection protocols such as, direct connect, Ethernet, wireless connection such as IEEE 802.11a-x, miracast and the like. Some components of the interactive gaming system may include various protocols or comply with various standards or certifications set forth by different associations or regulatory agencies. For example, some embodiments may use the slot accounting system (SAS) protocol or comply with the game to system (G2S) standard.

Examples of network 2830 include the Internet, Local Area Network (LAN), Metropolitan Area Network (MAN), a Wide Area Network (WAN), wireless network (e.g., using Wireless Application Protocol WAP), a secured custom connection, and the like. The network interfaces 2850 can include a firewall which can, in some aspects, govern and/or manage permission to access/proxy data in a computer network, and track varying levels of trust between different machines and/or applications. The firewall can be any number of modules having any combination of hardware and/or software components able to enforce a predetermined set of access rights between a particular set of machines and applications, machines and machines, and/or applications and applications, for example, to regulate the flow of traffic and resource sharing between these varying entities.

The firewall may additionally manage and/or have access to an access control list which details permissions including, for example, the access and operation rights of an object by an individual, a machine, and/or an application, and the circumstances under which the permission rights stand. Other network security functions performed or included in the functions of the firewall, can be, for example, but are not limited to, intrusion-prevention, intrusion detection, next-generation firewall, personal firewall, etc., without deviating from the novel art of this disclosure. It should be appreciated that controller 2800 may be capable of using network interfaces 2850 to transfer and receive payment amounts. The payment may be driven by an application executed by controller 2800, such as a National Fighting Club (NFC) application tap using Bluetooth® 2855 may be in communication with a number of storage devices such as, storage devices 2890, removable disc devices, and the like. The storage interfaces 2855 may use various connection protocols such as Serial Advanced Technology Attachment (SATA), IEEE 894, Ethernet, Fiber, Universal Serial Bus (USB), and the like.

User input devices 2805 and peripheral devices 2810 may be connected to I/O interface 2845 and potentially other interfaces, buses and/or components. User input devices 2805 may include card readers, fingerprint readers, joysticks, keyboards, microphones, mouse, remote controls, retina readers, touch screens, sensors, and/or the like. Peripheral devices 2810 may include antenna, audio devices (e.g., microphone, speakers, etc.), cameras, external processors, communication devices, radio frequency identifiers (RFIDs), scanners, printers, storage devices, transceivers, and/or the like. Co-processor devices 2815 may be connected to controller 2800 through interface bus 2835, and may include microcontrollers, processors, interfaces or other devices.

Computer executable instructions and data may be stored in memory (e.g., registers, cache memory, random access memory, flash, etc.) which is accessible by processors. These stored instruction codes (e.g., programs) may engage the processor components, motherboard and/or other system components to perform desired operations. Controller 2800 may employ various forms of memory including on-chip CPU memory (e.g., registers), RAM 2880, ROM 2885, and storage devices 2890. Storage devices 2890 may employ any number of tangible, non-transitory storage devices or systems such as fixed or removable magnetic disk drive, an optical drive, solid state memory devices and other processor-readable storage media. Computer-executable instructions stored in the memory may include an interactive gaming platform having one or more program modules such as routines, programs, objects, components, data structures, and so on that perform particular tasks or implement particular abstract data types. For example, the memory may contain operating system (OS) component 2895, modules and other components, database tables, and the like. These modules/components may be stored and accessed from the storage devices, including from external storage devices accessible through an interface bus 2835.

The database components can store programs executed by the processor to process the stored data. The database components may be implemented in the form of a database that is relational, scalable and secure. Examples of such database include DB2, MySQL, Oracle, Sybase, and the like. Alternatively, the database may be implemented using various standard data-structures, such as an array, hash, list, stack, structured text file (e.g., XML), table, and/or the like. Such data-structures may be stored in memory and/or in structured files.

Controller 2800 may be implemented in distributed computing environments, where tasks or modules are performed by remote processing devices, which are linked through a communications network, such as a Local Area Network ("LAN"), Wide Area Network ("WAN"), the Internet, and the like. In a distributed computing environment, program modules or subroutines may be located in both local and remote memory storage devices. Distributed computing may be employed to load balance and/or aggregate resources for processing. Alternatively, aspects of controller 2800 may be distributed electronically over the Internet or over other networks (including wireless networks). Those skilled in the relevant art(s) will recognize that portions of the interactive gaming system may reside on a server computer, while corresponding portions reside on a client computer. Data structures and transmission of data particular to aspects of controller 2800 are also encompassed within the scope of the disclosure.

Figure 29:
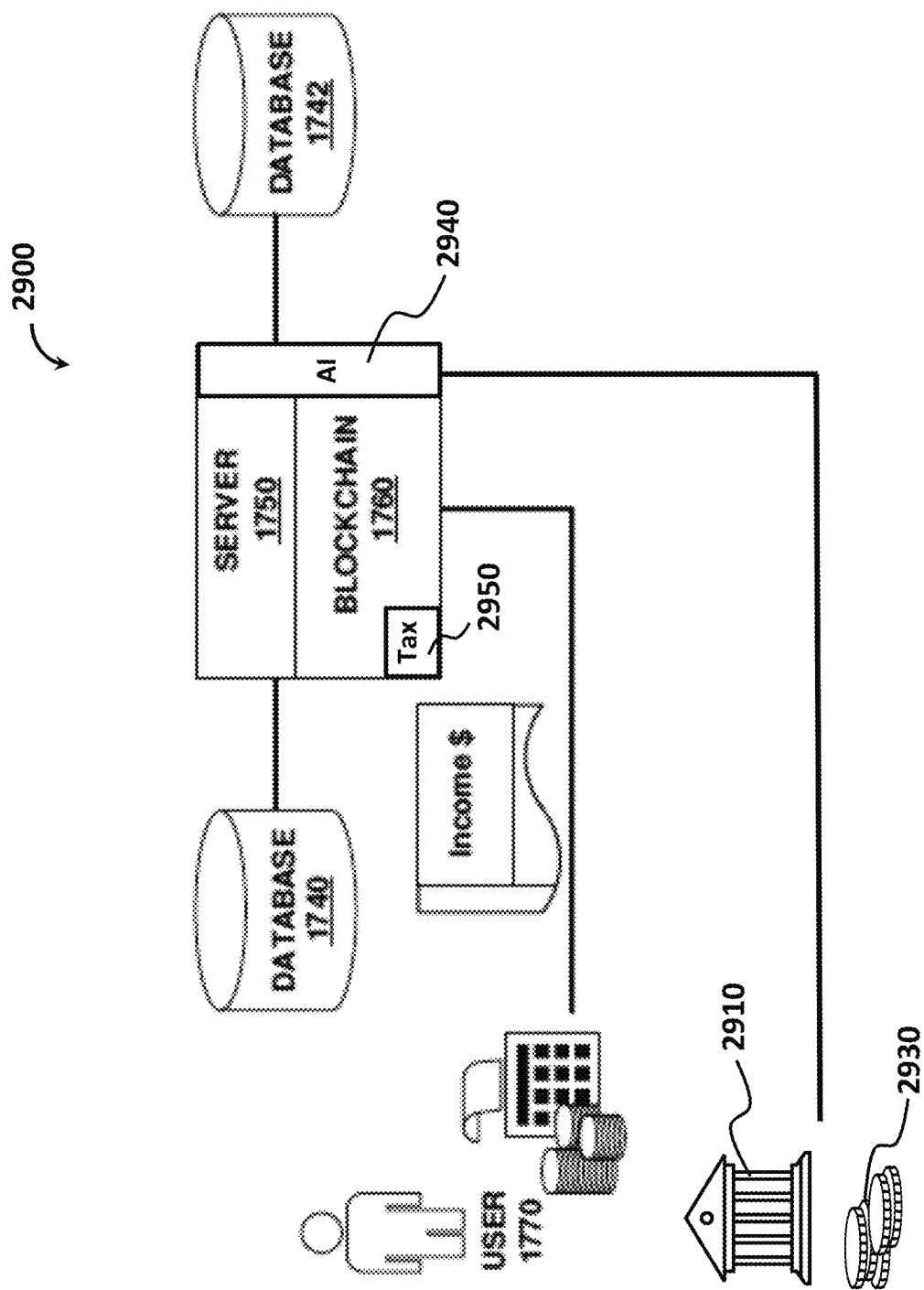
FIG. 29 illustrates an exemplary operational architecture in an implementation of a financial auditing scenario to generate a customized view of restricted transactions recorded into a blockchain that can be used as a basis to automatically or periodically fulfilling tax payment obligations to government entities.

FIG. 29 illustrates an exemplary operational architecture 2900 in an implementation of a financial auditing scenario to generate a customized view of restricted transactions recorded into a blockchain that can be used as a basis to automatically fulfilling tax payment obligations to government entities 2910. In operation, as discussed with respect to FIG. 17, records of transactions and earnings can be maintained as restricted transactions in blockchain 1760 via server 1750. It should be noted that in this scenario, financial aspects (i.e., earnings) associated with the transactions can be reported to an auditor 1770 from blockchain 1760. A government tax auditor 1770 can also request to view the profit recorded for income earning entities (e.g., parking, hotel, gaming, services) etc.

In addition to access of financial information by user 1770 (e.g., tax auditor) as previously described with respect to FIG. 17 and here, the blockchain 1760 can be programmed to automatically (e.g., in real time) or periodically (e.g., daily, weekly, bi-weekely, monthly, quarterly) pay taxes to government entities 2910 entitled to receive tax (e.g., federal, state, local government) based on an income earning entity's earnings. The desired payments schedule can depend on real time earning and tax determinations by a server and/or artificial intelligence engine that is then recorded into the blockchain. Real time earnings and tax determinations can also enable government entities with real time auditability of the financial aspects of transactions. Payment of taxes based on earning can be provided via fiat or by cryptocurrency such as a stable token 2930 designed for the payment of taxes. Payments of tax onto the government tax departments or authorities can be via a batch payments that are compiled and paid daily, bi-weekly, weekly or monthly. The desired payments schedule would depend on real time earning and tax determinations by the server 1750 that is then recorded into the blockchain 1760. Payments and payment scheduling can be enable on the blockchain via smart contracts. Real time earnings and tax determinations can also enable government entities with real time auditability of the financial aspects of transactions. An artificial intelligence engine 2940 can also be provided to review entries within the blockchain 1760, identify earnings information associated with the sales of the commercial inventory, determine tax based on earning information, and pay tax to government authorities 2910 based on earnings information. Earnings- and tax-related information can be segregated 2950 on the blockchain for government auditing purposes.

Certain inventive aspects may be appreciated from the foregoing disclosure, of which the following are various examples.

The functional block diagrams, operational scenarios and sequences, and flow diagrams provided in the Figures are representative of exemplary systems, environments, and methodologies for performing novel aspects of the disclosure. While, for purposes of simplicity of explanation, methods included herein may be in the form of a functional diagram, operational scenario or sequence, or flow diagram, and may be described as a series of acts, it is to be understood and appreciated that the methods are not limited by the order of acts, as some acts may, in accordance therewith, occur in a different order and/or concurrently with other acts from that shown and described herein. Those skilled in the art will understand and appreciate that a method could alternatively be represented as a series of interrelated states or events, such as in a state diagram. Moreover, not all acts illustrated in a methodology may be required for a novel implementation.

What is claimed is:

1. A system for tracking, management, and assuring fulfillment of tax payments to government entities based on earnings from commercial inventory, comprising:
 a network of nodes communicably coupled to endpoints in a distributed network,
  wherein the network of nodes maintains a distributed ledger with entries from one or more endpoints,
  wherein the entries include: entries from customers relating to commercial inventory offered by an inventory provider, entries from the commercial inventory provider regarding an availability status of the commercial inventory, and earnings from sales of the commercial inventory, and
  wherein a marker is associated with each entry identifying an access level needed to review the entry;
 a communications component supporting at least one of: receiving a request from a tax auditor to view earnings entries associated with sales of commercial inventory stored in the distributed ledger, wherein the request includes an access code associated with at least one access level associated with the tax auditor, or paying tax to government authorities;
 an access control layer to evaluate the access code in the request received via the communications component and to identify segments within the one or more entries stored on the distributed ledger that are accessible with the at least one access level provided in the request; and
 an access platform or decentralized application to generate a customized view of the segments within the one or more entries maintained in the distributed ledger.

2. The system of claim 1, further comprising a codex configured to obfuscate identifying information of a user making the request to view at least a portion of the one or more entries.

3. The system of claim 1, further comprising an artificial intelligence engine configured to review entries within the distributed ledger, identify earnings information associated with the sales of the commercial inventory, and assign an access level needed for a tax auditor to review each of the entries.

4. The system of claim 3, wherein the artificial intelligence engine classifies data within each of the entries into one or more categories.

5. The system of claim 4, wherein the access control layer then sets a different encryption level for each of the one or more categories of data classified by the artificial intelligence engine.

6. The system of claim 4, wherein the one or more categories include earnings information, sales information, e-mail addresses, account numbers, balances, parties of a transaction, mailing addresses, vehicle identification numbers, license plate numbers, biometrics, driver's license numbers, photographs, or social security numbers.

7. The system of claim 4, wherein the commercial inventory includes at least one of parking spaces in a parking facility, rooms in a hotel, package deliveries, game results, payments on gaming results, autonomous vehicles for hire, and a retail sale.

8. The system of claim 1, further comprising an artificial intelligence engine to review entries within the distributed ledger, identify earnings information associated with the sales of the commercial inventory, determine tax based on earning information, and pay tax to government authorities based on earnings information.

9. The system of claim 8, wherein the payment is made via at least one of fiat or cryptocurrency in the form of a stable coin.

10. The system of claim 1, wherein the access level associated with segments within the one or more entries includes at least one of a private access level, a permissive access level, or a public access level.

11. A method for tracking, management, and assuring fulfillment of tax payments to government entities based on earnings from commercial inventory, comprising:
 providing access to a network of nodes communicably coupled to endpoints in a distributed network,
  wherein the network of nodes maintains a distributed ledger with entries from one or more endpoints,
  wherein the entries include: entries from customers relating to commercial inventory offered by an inventory provider, entries from the commercial inventory provider regarding an availability status of the commercial inventory, and earnings from sales of the commercial inventory, and
  wherein a marker is associated with each entry identifying an access level needed to review the entry;
 providing an artificial intelligence engine to review entries within the distributed ledger, identify earnings information associated with the sales of the commercial inventory, determine tax based on earning information, and pay tax to government authorities based on earnings information;
 providing a communications component to support at least of: receiving a request from a tax auditor to view earnings entries associated with sales of commercial inventory stored in the distributed ledger, wherein the request includes an access code associated with at least one access level associated with the tax auditor, or paying tax to government authorities;
 providing an access control layer to evaluate the access code in the request received via the communications component and to identify segments within the one or more entries stored on the distributed ledger that are accessible with the at least one access level provided in the request; and
 providing an access platform or decentralized application to generate a customized view of the segments within the one or more entries maintained in the distributed ledger.

12. The method of claim 11, wherein evaluating the access code in the request with the blockchain of block entries includes processing an encrypted code to validate access to view the one or more data portions associated with the access level.

13. The method of claim 11, further comprising providing a codex configured to obfuscate identifying information of a user making the request to view at least a portion of the one or more entries.

14. The method of claim 11, further comprising:
 receiving data from one or more endpoints;
 segmenting the data from the one or more endpoints using the artificial intelligence engine; and automatically assigning at least one access level to each segment of the data.

15. The method of claim 11, wherein the artificial intelligence engine classifies data within each of the one or more entries into one or more categories.

16. The method of claim 15, wherein the one or more categories include earnings information, sales information, e-mail addresses, account numbers, balances, parties of a transaction, mailing addresses, vehicle identification numbers, license plate numbers, biometrics, driver's license numbers, photographs, or social security numbers.

17. The method of claim 11, wherein the commercial inventory includes at least one of parking spaces in a parking facility, rooms in a hotel, package deliveries, game results, payments on gaming results, autonomous vehicles for hire, and a retail sale.

18. The system of claim 8, wherein the payment is made via at least one of fiat or cryptocurrency in the form of a stable coin.

19. The method of claim 11, wherein the access level associated with the one or more data portions of the block entries comprises at least one of a private access level, a permissive access level, and a public access level.

20. A method for tracking, management, and assuring fulfillment of tax payments to government entities based on earnings from commercial inventory including at least one of parking spaces in a parking facility, rooms in a hotel, package deliveries, game results, payments on gaming results, autonomous vehicles for hire, and a retail sale, comprising:
  providing access to a network of nodes communicably coupled to endpoints in a distributed network,
    wherein the network of nodes maintains a distributed ledger with entries from one or more endpoints,
    wherein the entries include: entries from customers relating to commercial inventory offered by an inventory provider, entries from the commercial inventory provider regarding an availability status of the commercial inventory, and earnings from sales of the commercial inventory, and
    wherein a marker is associated with each entry identifying an access level needed to review the entry;
  providing an artificial intelligence engine to review entries within the distributed ledger, identify earnings information associated with the sales of the commercial inventory, determine tax based on earning information, and pay the tax via cryptocurrency to government authorities based on earnings information;
  providing a communications component to support at least of: receiving a request from a tax auditor to view earnings entries associated with sales of commercial inventory stored in the distributed ledger, wherein the request includes an access code associated with at least one access level associated with the tax auditor, or paying tax to government authorities;
  providing an access control layer to evaluate the access code in the request received via the communications component and to identify segments within the one or more entries stored on the distributed ledger that are accessible with the at least one access level provided in the request; and
  providing an access platform or decentralized application to generate a customized view of the segments within the one or more entries maintained in the distributed ledger.

\* \* \* \* \*